United States Patent
Lancaster, III et al.

(10) Patent No.: US 10,053,253 B2
(45) Date of Patent: Aug. 21, 2018

(54) GRAPHICAL DEPICTION OF WRAP PROFILE FOR LOAD WRAPPING APPARATUS

(71) Applicant: Lantech.com, LLC, Louisville, KY (US)

(72) Inventors: Patrick R. Lancaster, III, Louisville, KY (US); Michael P. Mitchell, Louisville, KY (US)

(73) Assignee: Lantech.com, LLC, Louisville, KY (US)

( * ) Notice: Subject to any disclaimer, the term of this patent is extended or adjusted under 35 U.S.C. 154(b) by 281 days.

(21) Appl. No.: 14/877,798

(22) Filed: Oct. 7, 2015

(65) Prior Publication Data
US 2016/0098171 A1    Apr. 7, 2016

Related U.S. Application Data

(60) Provisional application No. 62/060,784, filed on Oct. 7, 2014, provisional application No. 62/072,161, filed on Oct. 29, 2014.

(51) Int. Cl.
*G06F 3/048* (2013.01)
*B65B 57/04* (2006.01)
(Continued)

(52) U.S. Cl.
CPC ............ *B65B 57/04* (2013.01); *B65B 11/025* (2013.01); *B65B 11/045* (2013.01);
(Continued)

(58) Field of Classification Search
CPC .................................................... B65B 11/025
(Continued)

(56) References Cited

U.S. PATENT DOCUMENTS 2,076,617 A    4/1937 Cleaves
2,227,398 A    12/1940 Mohl
(Continued)

FOREIGN PATENT DOCUMENTS

DE    3140972 A1    6/1982
DE    3119038 A1    12/1982
(Continued)

OTHER PUBLICATIONS

"The Technology Behind a 'No-Tear', 'No-Rip' Film Carriage, and How to Explain it to your Customers," Jan. 21, 2010, downloaded from http://wulftecstretchwrapper.blogspt.com/2010_01_01archive.html on Jan. 7, 2011; 4 pages, Jan. 7, 2011.
(Continued)

*Primary Examiner* — William Titcomb
(74) *Attorney, Agent, or Firm* — Middleton Reutlinger

(57) ABSTRACT

A method, apparatus and program product utilize a graphical interface to facilitate operator interaction with a load wrapping apparatus, particularly in connection with setting up a wrap profile. The graphical interface may incorporate a graphical depiction of a load, along with graphical depictions of both the number of layers of packaging material and the wrap force associated with a given wrap profile, with the graphical depictions of each of the number of layers of packaging material and the wrap force being capable of being dynamically updated in response to changes made by an operator to a wrap profile. The graphical depictions therefore provide a visual interface to assist an operator who may have limited expertise in setting up a load wrapping apparatus.

31 Claims, 31 Drawing Sheets

(51) Int. Cl.
  *B65B 11/04* (2006.01)
  *B65B 41/12* (2006.01)
  *B65B 59/00* (2006.01)
  *B65B 57/16* (2006.01)
  *G06F 3/0481* (2013.01)
  *G06F 3/0482* (2013.01)
  *G06F 3/0484* (2013.01)
  *B65B 11/58* (2006.01)
  *B65B 57/12* (2006.01)
  *B65B 57/18* (2006.01)
  *B65B 11/02* (2006.01)

(52) U.S. Cl.
  CPC ............ *B65B 11/585* (2013.01); *B65B 41/12* (2013.01); *B65B 57/12* (2013.01); *B65B 57/16* (2013.01); *B65B 57/18* (2013.01); *B65B 59/00* (2013.01); *G06F 3/0482* (2013.01); *G06F 3/04817* (2013.01); *G06F 3/04842* (2013.01); *B65B 2210/16* (2013.01)

(58) Field of Classification Search
  USPC ........................................................ 715/835
  See application file for complete search history.

(56) References Cited

U.S. PATENT DOCUMENTS

| | | |
|---|---|---|
| 2,904,196 A | 9/1959 | Teixeira |
| 3,029,571 A | 4/1962 | Douthit |
| 3,707,658 A | 12/1972 | Hilsenbeck |
| 3,815,313 A | 6/1974 | Heisler |
| 3,867,806 A | 2/1975 | Lancaster, III |
| 3,910,005 A | 2/1975 | Thimon et al. |
| 4,077,179 A | 3/1978 | Lancaster et al. |
| 4,152,879 A | 5/1979 | Shulman |
| 4,216,640 A | 8/1980 | Kaufman |
| 4,235,062 A | 11/1980 | Lancaster, III et al. |
| 4,271,657 A | 6/1981 | Lancaster, III et al. |
| 4,300,326 A | 11/1981 | Stackhouse |
| 4,387,548 A | 6/1983 | Lancaster et al. |
| 4,395,255 A | 7/1983 | Branecky et al. |
| 4,418,510 A | 12/1983 | Lancaster, III et al. |
| 4,429,514 A | 2/1984 | Lancaster et al. |
| 4,432,185 A | 2/1984 | Geisinger |
| 4,458,467 A | 7/1984 | Shulman et al. |
| 4,497,159 A | 2/1985 | Lancaster, III |
| 4,501,105 A | 2/1985 | Rogers et al. |
| 4,503,658 A | 3/1985 | Mouser et al. |
| 4,505,092 A | 3/1985 | Bowers et al. |
| 4,514,955 A | 5/1985 | Mouser et al. |
| 4,524,568 A | 6/1985 | Lancaster et al. |
| 4,545,182 A | 10/1985 | McDowell, Jr. |
| 4,590,746 A | 5/1986 | Humphrey |
| 4,628,667 A | 12/1986 | Humphrey et al. |
| 4,631,898 A | 12/1986 | Brambilla |
| 4,676,048 A | 6/1987 | Lancaster et al. |
| 4,693,049 A | 9/1987 | Humphrey |
| 4,712,354 A | 12/1987 | Lancaster et al. |
| 4,754,594 A | 7/1988 | Lancaster |
| 4,736,567 A | 8/1988 | Pienta |
| 4,761,934 A | 8/1988 | Lancaster |
| 4,807,427 A | 2/1989 | Casteel et al. |
| 4,840,006 A | 6/1989 | Humphrey |
| 4,845,920 A | 7/1989 | Lancaster |
| 4,862,678 A | 9/1989 | Humphrey |
| 4,866,909 A | 9/1989 | Lancaster, III et al. |
| 4,905,451 A | 3/1990 | Jaconelli et al. |
| 4,938,008 A | 7/1990 | Salzsauer |
| 4,953,336 A | 9/1990 | Lancaster, III et al. |
| 4,991,381 A | 2/1991 | Simons |
| 5,027,579 A | 7/1991 | Keip |
| 5,040,356 A | 8/1991 | Thimon |
| 5,040,359 A | 8/1991 | Thimon |
| 5,054,263 A | 10/1991 | Maki-Rahkola et al. |
| 5,054,987 A | 10/1991 | Thornton |
| 5,077,956 A | 1/1992 | Thimon |
| 5,081,824 A | 1/1992 | Thimon et al. |
| 5,107,657 A | 4/1992 | Diehl et al. |
| 5,123,230 A | 6/1992 | Upmann |
| 5,138,817 A | 8/1992 | Mowry et al. |
| 5,163,264 A | 11/1992 | Hannen |
| 5,186,981 A | 2/1993 | Shellhamer et al. |
| 5,195,296 A | 3/1993 | Matsumoto |
| 5,195,297 A | 3/1993 | Lancaster et al. |
| 5,195,301 A | 3/1993 | Martin-Cocher et al. |
| 5,203,136 A | 4/1993 | Thimon et al. |
| 5,203,139 A | 4/1993 | Salsburg et al. |
| 5,216,871 A | 6/1993 | Hannen |
| 5,240,198 A | 8/1993 | Dorfel |
| 5,301,493 A | 4/1994 | Chen |
| 5,311,725 A | 5/1994 | Martin et al. |
| 5,315,809 A | 5/1994 | Gordon et al. |
| 5,369,416 A | 11/1994 | Haverty et al. |
| 5,414,979 A | 5/1995 | Moore et al. |
| 5,447,008 A | 9/1995 | Martin-Cocher |
| 5,450,711 A | 9/1995 | Martin-Cocher |
| 5,463,842 A | 11/1995 | Lancaster |
| 5,524,413 A | 6/1996 | Fukuda |
| 5,546,730 A | 8/1996 | Newell et al. |
| 5,572,855 A | 11/1996 | Reigrut et al. |
| 5,581,979 A | 12/1996 | Scherer |
| 5,595,042 A | 1/1997 | Cappi et al. |
| 5,610,344 A | 3/1997 | Ueda et al. |
| 5,634,321 A | 6/1997 | Martin-Cocher et al. |
| 5,653,093 A | 8/1997 | Delledonne |
| 5,671,593 A | 9/1997 | Ginestra et al. |
| 5,765,344 A | 6/1998 | Mandeville |
| 5,768,862 A | 6/1998 | Mauro et al. |
| 5,794,416 A | 9/1998 | Rahman |
| 5,799,471 A | 9/1998 | Chen |
| 5,836,140 A | 11/1998 | Lancaster, III |
| 5,875,617 A | 3/1999 | Scherer |
| 5,884,453 A | 3/1999 | Ramsey et al. |
| 5,885,453 A | 3/1999 | Chatelin et al. |
| 5,953,888 A | 9/1999 | Martin-Cocher et al. |
| 6,082,081 A | 7/2000 | Mucha |
| 6,195,968 B1 | 3/2001 | Marais et al. |
| 6,253,532 B1 | 7/2001 | Orpen |
| 6,293,074 B1 | 9/2001 | Lancaster, III et al. |
| 6,314,333 B1 | 11/2001 | Rajala et al. |
| 6,360,512 B1 | 3/2002 | Marois et al. |
| 6,370,839 B1 | 4/2002 | Nakagawa et al. |
| 6,453,643 B1 | 9/2002 | Buscherini et al. |
| 6,516,591 B1 | 2/2003 | Lancaster, III et al. |
| 6,684,612 B2 | 2/2004 | Trottet |
| 6,698,161 B1 | 3/2004 | Rossi |
| 6,748,718 B2 | 6/2004 | Lancaster, III et al. |
| 6,826,893 B2 | 12/2004 | Cere |
| 6,848,240 B2 | 2/2005 | Frey |
| 6,851,252 B2 | 2/2005 | Maki-Rahkola et al. |
| 6,918,229 B2 | 7/2005 | Lancaster, III et al. |
| 7,040,071 B2 | 5/2006 | Heikaus |
| 7,114,308 B2 | 10/2006 | Cox |
| 7,386,968 B2 | 6/2008 | Sperry et al. |
| 7,540,128 B2 | 6/2009 | Lancaster et al. |
| 7,568,327 B2 | 8/2009 | Lancaster, III et al. |
| 7,707,801 B2 | 5/2010 | Lancaster, III |
| 7,707,901 B2 | 5/2010 | Lancaster et al. |
| 7,779,607 B2 | 8/2010 | Lancaster, III |
| 8,001,745 B2 | 8/2011 | Carter et al. |
| 8,037,660 B2 | 10/2011 | Lancaster, III et al. |
| 8,276,346 B2 | 10/2012 | Lancaster, III et al. |
| 8,276,354 B2 | 10/2012 | Lancaster, III et al. |
| 8,739,502 B2 | 6/2014 | Lancaster, III et al. |
| 9,488,557 B2 | 11/2016 | Lancaster et al. |
| 9,493,262 B2 | 11/2016 | Lancaster et al. |
| 9,776,748 B2 | 10/2017 | Lancaster et al. |
| 2001/0015057 A1 | 8/2001 | Suolahti |
| 2003/0089081 A1 | 5/2003 | Platon |
| 2003/0110737 A1 | 6/2003 | Lancaster et al. |
| 2003/0145563 A1 | 8/2003 | Cere |
| 2003/0158684 A1 | 8/2003 | Livingston |
| 2003/0200731 A1 | 10/2003 | Maki-Rahkola et al. |

(56) References Cited

U.S. PATENT DOCUMENTS

| | | |
|---|---|---|
| 2003/0200732 A1 | 10/2003 | Maki-Rahkola et al. |
| 2004/0031238 A1 | 2/2004 | Cox |
| 2004/0040477 A1 | 3/2004 | Neumann |
| 2005/0044812 A1 | 3/2005 | Lancaster et al. |
| 2005/0115202 A1 | 6/2005 | Mertz et al. |
| 2006/0028969 A1 | 2/2006 | Kondo et al. |
| 2006/0213155 A1 | 9/2006 | Forni et al. |
| 2006/0248858 A1 | 11/2006 | Lancaster |
| 2006/0254225 A1 | 11/2006 | Lancaster et al. |
| 2006/0289691 A1 | 12/2006 | Forni |
| 2007/0169442 A1 | 7/2007 | Asiold |
| 2007/0204564 A1 | 9/2007 | Lancaster et al. |
| 2007/0204565 A1 | 9/2007 | Lancaster et al. |
| 2007/0209324 A1 | 9/2007 | Lancaster et al. |
| 2008/0216449 A1 | 9/2008 | Zimmerli |
| 2008/0295614 A1 | 12/2008 | Lancaster, III et al. |
| 2009/0178374 A1 | 7/2009 | Lancaster, III |
| 2009/0293425 A1 | 12/2009 | Carter et al. |
| 2010/0037562 A1 | 2/2010 | Forni et al. |
| 2010/0107653 A1 | 5/2010 | Paskevich et al. |
| 2010/0239403 A1 | 9/2010 | Lancaster, III et al. |
| 2010/0300049 A1 | 12/2010 | Schmidt et al. |
| 2010/0303526 A1 | 12/2010 | Hayase |
| 2010/0320305 A1 | 12/2010 | Lia |
| 2011/0131927 A1 | 6/2011 | Lancaster, III et al. |
| 2011/0146203 A1 | 6/2011 | Lancaster, III et al. |
| 2011/0168751 A1 | 7/2011 | Tsurumi |
| 2011/0179752 A1 | 7/2011 | Lancaster, III et al. |
| 2012/0031053 A1 | 2/2012 | Lancaster, III et al. |
| 2012/0102886 A1 | 5/2012 | Lancaster et al. |
| 2012/0102887 A1 | 5/2012 | Lancaster, III et al. |
| 2012/0124944 A1 | 5/2012 | Lancaster, III et al. |
| 2012/0181368 A1 | 7/2012 | Ekola |
| 2013/0061558 A1 | 3/2013 | Klear et al. |
| 2013/0076753 A1 | 3/2013 | Lancaster, III et al. |
| 2014/0053502 A1* | 2/2014 | Pecchenini ............ B65B 11/025 53/218 |
| 2014/0116006 A1 | 5/2014 | Lancaster, III et al. |
| 2014/0116007 A1 | 5/2014 | Lancaster, III et al. |
| 2014/0116008 A1 | 5/2014 | Lancaster, III et al. |
| 2014/0223863 A1 | 8/2014 | Lancaster, III |
| 2014/0223864 A1 | 8/2014 | Lancaster, III et al. |
| 2015/0096266 A1 | 4/2015 | Divine et al. |
| 2015/0197360 A1 | 7/2015 | Lancaster et al. |
| 2015/0353220 A1 | 12/2015 | Lancaster et al. |
| 2016/0096645 A1 | 4/2016 | Lancaster et al. |
| 2016/0096646 A1 | 4/2016 | Lancaster, III |
| 2017/0088301 A1 | 3/2017 | Riemenschneider |
| 2017/0327260 A1 | 11/2017 | Lancaster, III |
| 2018/0022488 A1 | 1/2018 | Lancaster, III |

FOREIGN PATENT DOCUMENTS

| | | |
|---|---|---|
| DE | 3634924 | 4/1988 |
| DE | 3901704 A1 | 8/1990 |
| DE | 4234604 | 4/1994 |
| DE | 19509649 A1 | 9/1996 |
| EP | 0096635 | 12/1983 |
| EP | 0144266 A2 | 6/1985 |
| EP | 0246659 A1 | 11/1987 |
| EP | 0466980 | 1/1992 |
| EP | 0653352 A1 | 5/1995 |
| EP | 0671324 | 9/1995 |
| EP | 0811554 | 12/1997 |
| EP | 0842850 A2 | 5/1998 |
| EP | 1083126 A1 | 3/2001 |
| EP | 1125841 | 8/2001 |
| EP | 1213223 | 6/2002 |
| EP | 1489004 | 12/2004 |
| EP | 1650573 A2 | 4/2006 |
| EP | 1705119 | 9/2006 |
| EP | 1717149 | 11/2006 |
| EP | 1736426 | 12/2006 |
| EP | 1736426 A3 | 10/2007 |
| GB | 1 546 523 A | 5/1979 |
| GB | 2059906 A | 4/1981 |
| GB | 2107668 | 5/1983 |
| GB | 2437359 A | 10/2007 |
| JP | S 57166252 A | 10/1982 |
| JP | S 63191707 A | 8/1988 |
| JP | H 0385209 A | 4/1991 |
| JP | H 06239311 A | 8/1994 |
| JP | H 085448 A | 1/1996 |
| JP | 09254913 A | 9/1997 |
| JP | 11165705 A | 6/1999 |
| JP | 2001048111 A | 2/2001 |
| JP | 2001072012 | 3/2001 |
| JP | 2002211503 A | 7/2002 |
| JP | 2002362879 A1 | 12/2002 |
| JP | 2004161344 | 6/2004 |
| JP | 3634993 B2 | 1/2005 |
| JP | 4350940 B2 | 10/2009 |
| WO | WO 9107341 A1 | 5/1991 |
| WO | 9420367 | 9/1994 |
| WO | 9700202 | 1/1997 |
| WO | 9822346 | 5/1998 |
| WO | 2004069659 | 8/2004 |
| WO | WO2006032065 A1 | 3/2006 |
| WO | 2006110596 | 10/2006 |
| WO | 2007071593 | 6/2007 |
| WO | 2007100596 | 9/2007 |
| WO | 2007100597 | 9/2007 |
| WO | 2008007189 | 1/2008 |
| WO | 2008115868 | 9/2008 |
| WO | 2008129432 | 10/2008 |
| WO | 2011057166 | 5/2011 |
| WO | 2012058549 | 5/2012 |
| WO | 2012058596 | 5/2012 |

OTHER PUBLICATIONS

European Patent Office; Search Report and Written Opinion in International Patent Application No. PCT/US2015/054563, 16 pages, dated Mar. 7, 2016.
European Patent Office; Search Report and Written Opinion in International Patent Application No. PCT/US2015/054564, 11 pages, dated Dec. 16, 2015.
European Patent Office; Search Report and Written Opinion in International Patent Application No. PCT/US2015/054566, 10 pages, dated Dec. 15, 2015.
List of Citations of Related US Patents and/or Patent Applications.
U.S. Patent Office; Non-Final Office Action issued in U.S. Appl. No. 14/877,792 dated Feb. 27, 2018.
Australian Patent Office; Examination Report issued in Application No. 2015330915 dated Jan. 18, 2018.
European Patent Office; Communication issued in Application No. 15784240.2 dated Feb. 15, 2018.
European Patent Office; Communication issued in Application No. 15790320.4 dated Feb. 8, 2018.
Australian Patent Office; Examination Report for Application No. 2015330916 dated Nov. 13, 2017.
Australian Patent Office; Examination Report for Application No. 2015330917 dated Dec. 20, 2017.
European Patent Office; Communication issued in Application No. 15784239.4 dated Jul. 9, 2018.
European Patent Office; Communication issued in Application No. 15790320.4 dated Jul. 9, 2018.

* cited by examiner

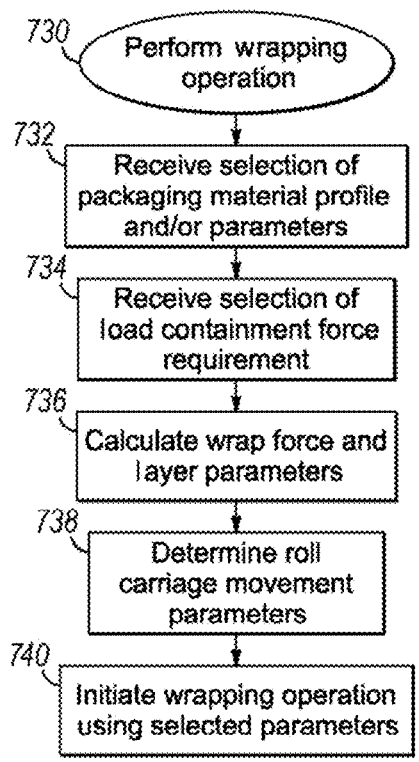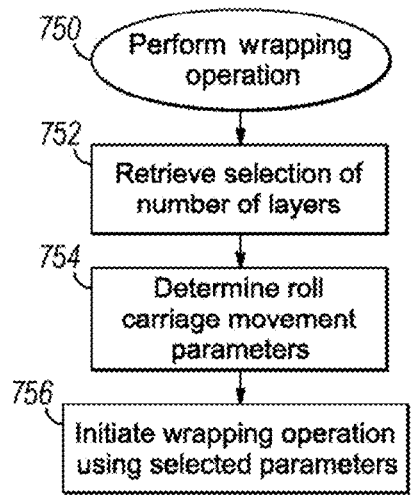
FIG. 11
FIG. 12

GRAPHICAL DEPICTION OF WRAP PROFILE FOR LOAD WRAPPING APPARATUS

CROSS-REFERENCE TO RELATED APPLICATIONS

This application claims the filing benefit of U.S. Provisional Patent Application Ser. No. 62/060,784 filed on Oct. 7, 2014 and U.S. Provisional Patent Application Ser. No. 62/072,161 filed on Oct. 29, 2014, each of which is incorporated by reference herein in its entirety.

FIELD OF THE INVENTION

The invention generally relates to wrapping loads with packaging material through relative rotation of loads and a packaging material dispenser, and in particular, to a control system therefor.

BACKGROUND OF THE INVENTION

Various packaging techniques have been used to build a load of unit products and subsequently wrap them for transportation, storage, containment and stabilization, protection and waterproofing. One system uses wrapping machines to stretch, dispense, and wrap packaging material around a load. The packaging material may be pre-stretched before it is applied to the load. Wrapping can be performed as an inline, automated packaging technique that dispenses and wraps packaging material in a stretch condition around a load on a pallet to cover and contain the load. Stretch wrapping, whether accomplished by a turntable, rotating arm, vertical rotating ring, or horizontal rotating ring, typically covers the four vertical sides of the load with a stretchable packaging material such as polyethylene packaging material. In each of these arrangements, relative rotation is provided between the load and the packaging material dispenser to wrap packaging material about the sides of the load.

A primary metric used in the shipping industry for gauging overall wrapping effectiveness is containment force, which is generally the cumulative force exerted on the load by the packaging material wrapped around the load. Containment force depends on a number of factors, including the number of layers of packaging material, the thickness, strength and other properties of the packaging material, the amount of pre-stretch applied to the packaging material, and the wrap force applied to the load while wrapping the load. The wrap force, however, is a force that fluctuates as packaging material is dispensed to the load due primarily to the irregular geometry of the load.

In particular, wrappers have historically suffered from packaging material breaks and limitations on the amount of wrap force applied to the load (as determined in part by the amount of pre-stretch used) due to erratic speed changes required to wrap loads. Were all loads perfectly cylindrical in shape and centered precisely at the center of rotation for the relative rotation, the rate at which packaging material would need to be dispensed would be constant throughout the rotation. Typical loads, however, are generally box-shaped, and have a square or rectangular cross-section in the plane of rotation, such that even in the case of square loads, the rate at which packaging material is dispensed varies throughout the rotation. In some instances, loosely wrapped loads result due to the supply of excess packaging material during portions of the wrapping cycle where the demand rate for packaging material by the load is exceeded by the rate at which the packaging material is supplied by the packaging material dispenser. In other instances, when the demand rate for packaging material by the load is greater than the supply rate of the packaging material by the packaging material dispenser, breakage of the packaging material may occur.

When wrapping a typical rectangular load, the demand for packaging material typically decreases as the packaging material approaches contact with a corner of the load and increases after contact with the corner of the load. In horizontal rotating rings, when wrapping a tall, narrow load or a short load, the variation in the demand rate is typically even greater than in a typical rectangular load. In vertical rotating rings, high speed rotating arms, and turntable apparatuses, the variation is caused by a difference between the length and the width of the load, while in a horizontal rotating ring apparatus, the variation is caused by a difference between the height of the load (distance above the conveyor) and the width of the load. Variations in demand may make it difficult to properly wrap the load, and the problem with variations may be exacerbated when wrapping a load having one or more dimensions that may differ from one or more corresponding dimensions of a preceding load. The problem may also be exacerbated when wrapping a load having one or more dimensions that vary at one or more locations of the load itself. Furthermore, whenever a load is not centered precisely at the center of rotation of the relative rotation, the variation in the demand rate is also typically greater, as the corners and sides of even a perfectly symmetric load will be different distances away from the packaging material dispenser as they rotate past the dispenser.

The amount of force, or pull, that the packaging material exhibits on the load determines in part how tightly and securely the load is wrapped. Conventionally, this wrap force is controlled by controlling the feed or supply rate of the packaging material dispensed by the packaging material dispenser. For example, the wrap force of many conventional stretch wrapping machines is controlled by attempting to alter the supply of packaging material such that a relatively constant packaging material wrap force is maintained. With powered pre-stretching devices, changes in the force or tension of the dispensed packaging material are monitored, e.g., by using feedback mechanisms typically linked to spring loaded dancer bars, electronic load cells, or torque control devices. The changing force or tension of the packaging material caused by rotating a rectangular shaped load is transmitted back through the packaging material to some type of sensing device, which attempts to vary the speed of the motor driven dispenser to minimize the change. The passage of the corner causes the force or tension of the packaging material to increase, and the increase is typically transmitted back to an electronic load cell, spring-loaded dancer interconnected with a sensor, or to a torque control device. As the corner approaches, the force or tension of the packaging material decreases, and the reduction is transmitted back to some device that in turn reduces the packaging material supply to attempt to maintain a relatively constant wrap force or tension.

With the ever faster wrapping rates demanded by the industry, however, rotation speeds have increased significantly to a point where the concept of sensing changes in force and altering supply speed in response often loses effectiveness. The delay of response has been observed to begin to move out of phase with rotation at approximately 20 RPM. Given that a packaging dispenser is required to shift between accelerating and decelerating eight times per revolution in order to accommodate the four corners of the load, at 20 RPM the shift between acceleration and deceleration occurs at a rate of more than every once every half of a second. Given also that the rotating mass of a packaging material roll and rollers in a packaging material dispenser may be 100 pounds or more, maintaining an ideal dispense rate throughout the relative rotation can be a challenge.

Also significant is the need in many applications to minimize acceleration and deceleration times for faster cycles. Initial acceleration must pull against clamped packaging material, which typically cannot stand a high force, and especially the high force of rapid acceleration, which typically cannot be maintained by the feedback mechanisms described above. As a result of these challenges, the use of high speed wrapping has often been limited to relatively lower wrap forces and pre-stretch levels where the loss of control at high speeds does not produce undesirable packaging material breaks.

In addition, due to environmental, cost and weight concerns, an ongoing desire exists to reduce the amount of packaging material used to wrap loads, typically through the use of thinner, and thus relatively weaker packaging materials and/or through the application of fewer layers of packaging material. As such, maintaining adequate containment forces in the presence of such concerns, particularly in high speed applications, can be a challenge.

Another difficulty associated with conventional wrapping machines is based on the difficulty in selecting appropriate control parameters to ensure that an adequate containment force is applied to a load. In many wrapping machines, the width of the packaging material is significantly less than the height of the load, and a lift mechanism is used to move a roll carriage in a direction generally parallel to the axis of rotation of the wrapping machine as the load is being wrapped, which results in the packaging material being wrapped in a generally spiral manner around the load. Conventionally, an operator is able to control a number of wraps around the bottom of the load, a number of wraps around the top of the load, and a speed of the roll carriage as it traverses between the top and bottom of the load to manage the amount of overlap between successive wraps of the packaging material. In some instances, control parameters may also be provided to control an amount of overlap (e.g., in inches) between successive wraps of packaging material.

The control of the roll carriage in this manner, when coupled with the control of the wrap force applied during wrapping, may result in some loads that are wrapped with insufficient containment force throughout, or that consume excessive packaging material (which also has the side effect of increasing the amount of time required to wrap each load). In part, this may be due in some instances to an uneven distribution of packaging material, as it has been found that the overall integrity of a wrapped load is based on the integrity of the weakest portion of the wrapped load. Thus, if the packaging material is wrapped in an uneven fashion around a load such that certain portions of the load have fewer layers of overlapping packaging material and/or packaging material applied with a lower wrap force, the wrapped load may lack the desired integrity regardless of how well it is wrapped in other portions.

Ensuring even and consistent containment force throughout a load, however, has been found to be challenging, particularly for less experienced operators. Traditional control parameters such as wrap force, roll carriage speed, etc. frequently result in significant variances in number of packaging material layers and containment forces applied to loads from top to bottom. Furthermore, many operators lack sufficient knowledge of packaging material characteristics and comparative performance between different brands, thicknesses, materials, etc., so the use of different packaging materials often further complicates the ability to provide even and consistent wrapped loads.

As an example, many operators will react to excessive film breaks by simply reducing wrap force, which leads to inadvertent lowering of cumulative containment forces below desired levels. The effects of insufficient containment forces, however, may not be discovered until much later, when wrapped loads are loaded into trucks, ships, airplanes or trains and subjected to typical transit forces and conditions. Failures of wrapped loads may lead to damaged goods during transit, loading and/or unloading, increasing costs as well as inconveniencing customers, manufacturers and shippers alike.

Another approach may be to simply lower the speed of a roll carriage and increase the amount of packaging material applied in response to loads being found to lack adequate containment force; however, such an approach may consume an excessive amount of packaging material, thereby increasing costs and decreasing the throughput of a wrapping machine.

Therefore, a significant need continues to exist in the art for an improved manner of reliably and efficiently controlling the containment force applied to a wrapped load.

SUMMARY OF THE INVENTION

The invention addresses these and other problems associated with the art by providing in one aspect a method, apparatus and program product that utilize a graphical interface to facilitate operator interaction with a load wrapping apparatus, particularly in connection with setting up a wrap profile. The graphical interface may incorporate a graphical depiction of a load, along with graphical depictions of both the number of layers of packaging material (or another layer parameter) and the wrap force associated with a given wrap profile, with the graphical depictions of each of the number of layers of packaging material and the wrap force being capable of being dynamically updated in response to changes made by an operator to a wrap profile. The graphical depictions therefore provide a visual interface to assist an operator who may have limited expertise in setting up a load wrapping apparatus.

Therefore, consistent with one aspect of the invention, a wrap profile may be set up prior to wrapping a load on a load support with packaging material dispensed from a packaging material dispenser through relative rotation between the packaging material dispenser and the load support by causing a graphical depiction of at least a portion of a load to be wrapped to be displayed on an operator interface, causing a number of layers of packaging material specified by the wrap profile to be displayed graphically in the graphical depiction, and modifying the graphical depiction in response to user input that modifies the wrap profile.

In some embodiments, causing the number of layers of packaging material to be displayed graphically includes displaying a number of parallel bars corresponding to the number of layers of packaging material to be displayed adjacent to the graphical depiction of the load, where modifying the graphical depiction includes changing the number of parallel bars displayed adjacent to the graphical depiction of the load in response to modifying the number of layers of packaging material specified by the wrap profile. Further, in some embodiments, the parallel bars extend substantially along a height of the graphical depiction of the load, and the method further includes, in response to user input to add a band to the wrap profile, modifying the graphical depiction of the load to display a parallel bar corresponding to the band adjacent the number of parallel bars and disposed at an elevation associated with the band.

Some embodiments further include causing a wrap force specified by the wrap profile to be displayed graphically in the graphical depiction, and in some embodiments, causing the wrap force to be displayed graphically includes controlling a display characteristic of the load in the graphical depiction based upon the wrap force specified by the wrap profile, where modifying the graphical depiction includes varying the display characteristic of the load in response to modifying the wrap force specified by the wrap profile. In some embodiments, the display characteristic includes one or more of a color, a shading, or a pattern, and some embodiments further include, in response to user input to vary a wrap force proximate a top or bottom of the load, modifying the graphical depiction of the load by varying the display characteristic in a top or bottom portion of the load in the graphical depiction.

Some embodiments also include causing a legend to be displayed, where the legend displays a plurality of values of the display characteristic corresponding respectively to a plurality of wrap forces, and in some embodiments, modifying the graphical depiction in response to user input that modifies the wrap profile includes, in response to user input that modifies the wrap force specified by the wrap profile, modifying the number of layers of packaging material specified by the wrap profile, and modifying the display of the number of layers of packaging material in response to modifying the number of layers specified by the wrap profile. In some embodiments, modifying the number of layers includes determining the modified number of layers based upon a load containment force requirement specified in the wrap profile and the modified wrap force.

Further, in some embodiments, modifying the graphical depiction in response to user input that modifies the wrap profile includes, in response to user input that modifies the number of layers specified by the wrap profile, modifying the wrap force specified by the wrap profile, and modifying the display of the wrap force in response to modifying the wrap force specified by the wrap profile. In some embodiments, modifying the wrap force includes determining the modified wrap force based upon a load containment force requirement specified in the wrap profile and the modified number of layers. Some embodiments further include, after modifying the graphical depiction, initiating a wrapping operation to wrap the load with packaging material based upon the wrap profile.

Consistent with another aspect of the invention, an apparatus may include a processor, and program code configured upon execution by the processor to control a load wrapping apparatus of the type configured to wrap a load on a load support with packaging material dispensed from a packaging material dispenser through relative rotation between the packaging material dispenser and the load support by causing a graphical depiction of at least a portion of a load to be wrapped to be displayed on an operator interface, causing a number of layers of packaging material specified by the wrap profile to be displayed graphically in the graphical depiction, and modifying the graphical depiction in response to user input that modifies the wrap profile. In some embodiments, the processor is in a controller of the load wrapping apparatus, and the apparatus further includes a packaging material dispenser for dispensing packaging material to the load. In addition, in some embodiments, the processor is in a device external to the load wrapping apparatus, and in some embodiments, the device is a mobile device, a single-user computer or a multi-user computer.

Consistent with another aspect of the invention, a program product may include a non-transitory computer readable medium, and program code stored on the non-transitory computer readable medium and configured to control a load wrapping apparatus of the type configured to wrap a load on a load support with packaging material dispensed from a packaging material dispenser through relative rotation between the packaging material dispenser and the load support, wherein the program code is configured to control the load wrapping apparatus by causing a graphical depiction of at least a portion of a load to be wrapped to be displayed on an operator interface, causing a number of layers of packaging material specified by the wrap profile to be displayed graphically in the graphical depiction, and modifying the graphical depiction in response to user input that modifies the wrap profile.

Consistent with a further aspect of the invention a wrap profile may be configured prior to wrapping a load on a load support with packaging material dispensed from a packaging material dispenser through relative rotation between the packaging material dispenser and the load support by causing a graphical depiction of at least a portion of a load to be wrapped to be displayed on an operator interface, causing a combined thickness of packaging material specified by the wrap profile to be displayed graphically in the graphical depiction, and modifying the graphical depiction in response to user input that modifies the wrap profile. In some embodiments, the combined thickness is specified in the wrap profile as a minimum number of layers of packaging material to apply throughout a contiguous region of the load.

Consistent with yet another aspect of the invention, an apparatus may include a processor, and program code configured upon execution by the processor to control a load wrapping apparatus of the type configured to wrap a load on a load support with packaging material dispensed from a packaging material dispenser through relative rotation between the packaging material dispenser and the load support. The program code may be configured to cause a graphical depiction of at least a portion of a load to be wrapped to be displayed on an operator interface, cause a combined thickness of packaging material specified by the wrap profile to be displayed graphically in the graphical depiction, and modify the graphical depiction in response to user input that modifies the wrap profile. In some embodiments, the combined thickness is specified in the wrap profile as a minimum number of layers of packaging material to apply throughout a contiguous region of the load, and in some embodiments, the program code is configured to cause the number of layers of packaging material to be displayed graphically by displaying a number of parallel bars corresponding to the number of layers of packaging material to be displayed adjacent to the graphical depiction of the load, where the program code is configured to modify the graphical depiction by changing the number of parallel bars displayed adjacent to the graphical depiction of the load in response to modifying the number of layers of packaging material specified by the wrap profile.

In some embodiments, the parallel bars extend substantially along a height of the graphical depiction of the load, and the program code is further configured to, in response to user input to add a band to the wrap profile, modify the graphical depiction of the load to display a parallel bar corresponding to the band adjacent the number of parallel bars and disposed at an elevation associated with the band.

In addition, in some embodiments, the program code is further configured to cause a wrap force specified by the wrap profile to be displayed graphically in the graphical depiction by controlling a display characteristic of the load in the graphical depiction based upon the wrap force specified by the wrap profile, and the program code is configured to modify the graphical depiction by varying the display characteristic of the load in response to modifying the wrap force specified by the wrap profile. Also, in some embodiments the program code is further configured to, in response to user input to vary a wrap force proximate a top or bottom of the load, modify the graphical depiction of the load by varying the display characteristic in a top or bottom portion of the load in the graphical depiction, and in some embodiments, the program code is configured to modify the graphical depiction in response to user input that modifies the wrap profile by, in response to user input that modifies the wrap force specified by the wrap profile, modifying the number of layers of packaging material specified by the wrap profile, and modifying the display of the number of layers of packaging material in response to modifying the number of layers specified by the wrap profile. In some embodiments, the program code is configured to modify the number of layers by determining the modified number of layers based upon a load containment force requirement specified in the wrap profile and the modified wrap force.

In addition, in some embodiments, the program code is configured to modify the graphical depiction in response to user input that modifies the wrap profile by, in response to user input that modifies the number of layers specified by the wrap profile, modifying the wrap force specified by the wrap profile, and modifying the display of the wrap force in response to modifying the wrap force specified by the wrap profile. In some embodiments, the program code is configured to modify the wrap force by determining the modified wrap force based upon a load containment force requirement specified in the wrap profile and the modified number of layers, and in some embodiments, the program code is further configured to, after modifying the graphical depiction, initiate a wrapping operation to wrap the load with packaging material based upon the wrap profile.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 11 is a flowchart illustrating a sequence of steps in an example routine for performing another wrapping operation in the control system of FIG. 8, but based upon operator input of a load containment force requirement.

FIG. 12 is a flowchart illustrating a sequence of steps in an example routine for performing another wrapping operation in the control system of FIG. 8, but based upon operator input of a number of layers of packaging material to apply to a load.

DETAILED DESCRIPTION

Figure 1:
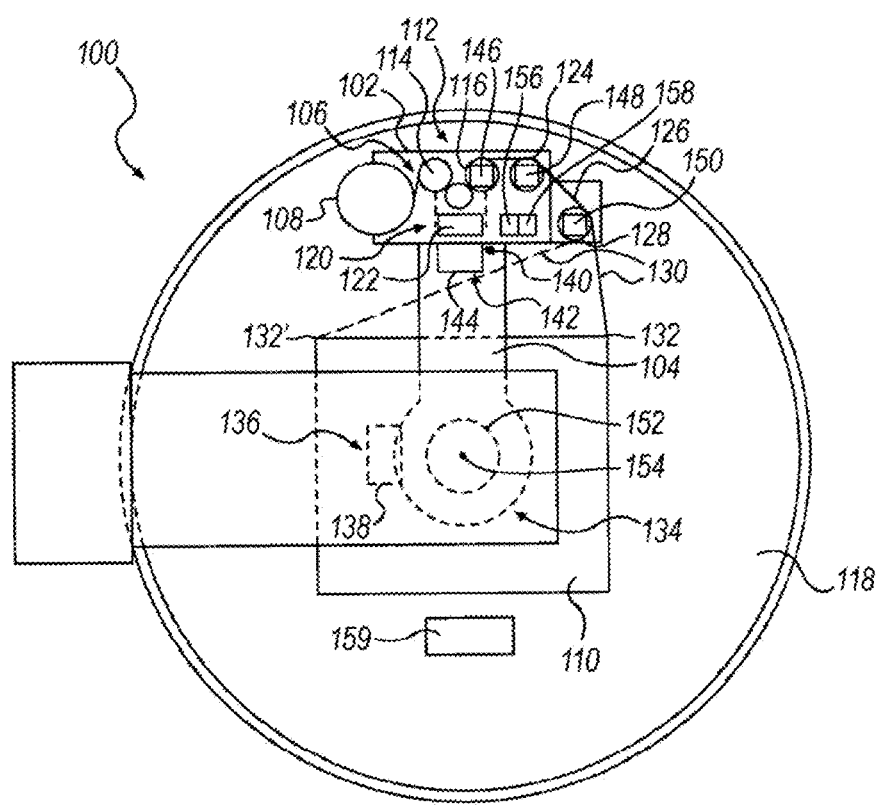
FIG. 1 shows a top view of a rotating arm-type wrapping apparatus consistent with the invention.

Embodiments consistent with the invention utilize a graphical interface to facilitate operator interaction with a load wrapping apparatus, particularly in connection with setting up a wrap profile. Prior to a discussion of the aforementioned concepts, however, a brief discussion of various types of wrapping apparatus within which the various techniques disclosed herein may be implemented is provided.

In addition, the disclosures of each of U.S. Pat. No. 4,418,510, entitled "STRETCH WRAPPING APPARATUS AND PROCESS," and filed Apr. 17, 1981; U.S. Pat. No. 4,953,336, entitled "HIGH TENSILE WRAPPING APPARATUS," and filed Aug. 17, 1989; U.S. Pat. No. 4,503,658, entitled "FEEDBACK CONTROLLED STRETCH WRAPPING APPARATUS AND PROCESS," and filed Mar. 28, 1983; U.S. Pat. No. 4,676,048, entitled "SUPPLY CONTROL ROTATING STRETCH WRAPPING APPARATUS AND PROCESS," and filed May 20, 1986; U.S. Pat. No. 4,514,955, entitled "FEEDBACK CONTROLLED STRETCH WRAPPING APPARATUS AND PROCESS," and filed Apr. 6, 1981; U.S. Pat. No. 6,748,718, entitled "METHOD AND APPARATUS FOR WRAPPING A LOAD," and filed Oct. 31, 2002; U.S. Pat. No. 7,707,801, entitled "METHOD AND APPARATUS FOR DISPENSING A PREDETERMINED FIXED AMOUNT OF PRE-STRETCHED FILM RELATIVE TO LOAD GIRTH," filed Apr. 6, 2006; U.S. Pat. No. 8,037,660, entitled "METHOD AND APPARATUS FOR SECURING A LOAD TO A PALLET WITH A ROPED FILM WEB," and filed Feb. 23, 2007; U.S. Patent Application Publication No. 2007/0204565, entitled "METHOD AND APPARATUS FOR METERED PRE-STRETCH FILM DELIVERY," and filed Sep. 6, 2007; U.S. Pat. No. 7,779,607, entitled "WRAPPING APPARATUS INCLUDING METERED PRE-STRETCH FILM DELIVERY ASSEMBLY AND METHOD OF USING," and filed Feb. 23, 2007; U.S. Patent Application Publication No. 2009/0178374, entitled "ELECTRONIC CONTROL OF METERED FILM DISPENSING IN A WRAPPING APPARATUS," and filed Jan. 7, 2009; U.S. Patent Application Publication No. 2011/0131927, entitled "DEMAND BASED WRAPPING," and filed Nov. 6, 2010; U.S. Patent Application Publication No. 2012/0102886, entitled "METHODS AND APPARATUS FOR EVALUATING PACKAGING MATERIALS AND DETERMINING WRAP SETTINGS FOR WRAPPING MACHINES," and filed Oct. 28, 2011; U.S. Patent Application Publication No. 2012/0102887, entitled "MACHINE GENERATED WRAP DATA," and filed Oct. 28, 2011; U.S. provisional patent application Ser. 61/718,429, entitled "ROTATION ANGLE-BASED WRAPPING," and filed Oct. 25, 2012; U.S. provisional patent application Ser. 61/718,433, entitled "EFFECTIVE CIRCUMFERENCE-BASED WRAPPING," and filed Oct. 25, 2012; U.S. patent application Ser. No. 14/052,929, entitled "ROTATION ANGLE-BASED WRAPPING," and filed Oct. 25, 2013; U.S. patent application Ser. No. 14/052,930, entitled "EFFECTIVE CIRCUMFERENCE-BASED WRAPPING," and filed Oct. 25, 2013; U.S. patent application Ser. No. 14/052,931, entitled "CORNER GEOMETRY-BASED WRAPPING," and filed Oct. 25, 2013; U.S. provisional patent application Ser. 61/764,107, entitled "CONTAINMENT FORCE-BASED WRAPPING," and filed Feb. 13, 2013; U.S. Patent Application Publication No. 2014/0223,863, entitled "PACKAGING MATERIAL PROFILING FOR CONTAINMENT FORCE-BASED WRAPPING," and filed Feb. 13, 2014; and U.S. Patent Application Publication No. 2014/0223,864, entitled "CONTAINMENT FORCE-BASED WRAPPING," and filed Feb. 13, 2014, are incorporated herein by reference in their entirety.

Wrapping Apparatus Configurations

FIG. 1, for example, illustrates a rotating arm-type wrapping apparatus 100, which includes a roll carriage 102 mounted on a rotating arm 104. Roll carriage 102 may include a packaging material dispenser 106. Packaging material dispenser 106 may be configured to dispense packaging material 108 as rotating arm 104 rotates relative to a load 110 to be wrapped. In an example embodiment, packaging material dispenser 106 may be configured to dispense stretch wrap packaging material. As used herein, stretch wrap packaging material is defined as material having a high yield coefficient to allow the material a large amount of stretch during wrapping. However, it is possible that the apparatuses and methods disclosed herein may be practiced with packaging material that will not be pre-stretched prior to application to the load. Examples of such packaging material include netting, strapping, banding, tape, etc. The invention is therefore not limited to use with stretch wrap packaging material. In addition, as used herein, the terms "packaging material," "web," "film," "film web," and "packaging material web" may be used interchangeably.

Packaging material dispenser 106 may include a pre-stretch assembly 112 configured to pre-stretch packaging material before it is applied to load 110 if pre-stretching is desired, or to dispense packaging material to load 110 without pre-stretching. Pre-stretch assembly 112 may include at least one packaging material dispensing roller, including, for example, an upstream dispensing roller 114 and a downstream dispensing roller 116. It is contemplated that pre-stretch assembly 112 may include various configurations and numbers of pre-stretch rollers, drive or driven roller and idle rollers without departing from the spirit and scope of the invention.

The terms "upstream" and "downstream," as used in this application, are intended to define positions and movement relative to the direction of flow of packaging material 108 as it moves from packaging material dispenser 106 to load 110. Movement of an object toward packaging material dispenser 106, away from load 110, and thus, against the direction of flow of packaging material 108, may be defined as "upstream." Similarly, movement of an object away from packaging material dispenser 106, toward load 110, and thus, with the flow of packaging material 108, may be defined as "downstream." Also, positions relative to load 110 (or a load support surface 118) and packaging material dispenser 106 may be described relative to the direction of packaging material flow. For example, when two pre-stretch rollers are present, the pre-stretch roller closer to packaging material dispenser 106 may be characterized as the "upstream" roller and the pre-stretch roller closer to load 110 (or load support 118) and further from packaging material dispenser 106 may be characterized as the "downstream" roller.

A packaging material drive system 120, including, for example, an electric motor 122, may be used to drive dispensing rollers 114 and 116. For example, electric motor 122 may rotate downstream dispensing roller 116. Downstream dispensing roller 116 may be operatively coupled to upstream dispensing roller 114 by a chain and sprocket assembly, such that upstream dispensing roller 114 may be driven in rotation by downstream dispensing roller 116. Other connections may be used to drive upstream roller 114 or, alternatively, a separate drive (not shown) may be provided to drive upstream roller 114.

Downstream of downstream dispensing roller 116 may be provided one or more idle rollers 124, 126 that redirect the web of packaging material, with the most downstream idle roller 126 effectively providing an exit point 128 from packaging material dispenser 102, such that a portion 130 of packaging material 108 extends between exit point 128 and a contact point 132 where the packaging material engages load 110 (or alternatively contact point 132' if load 110 is rotated in a counter-clockwise direction).

Wrapping apparatus 100 also includes a relative rotation assembly 134 configured to rotate rotating arm 104, and thus, packaging material dispenser 106 mounted thereon, relative to load 110 as load 110 is supported on load support surface 118. Relative rotation assembly 134 may include a rotational drive system 136, including, for example, an electric motor 138. It is contemplated that rotational drive system 136 and packaging material drive system 120 may run independently of one another. Thus, rotation of dispensing rollers 114 and 116 may be independent of the relative rotation of packaging material dispenser 106 relative to load 110. This independence allows a length of packaging material 108 to be dispensed per a portion of relative revolution that is neither predetermined nor constant. Rather, the length may be adjusted periodically or continuously based on changing conditions.

Wrapping apparatus 100 may further include a lift assembly 140. Lift assembly 140 may be powered by a lift drive system 142, including, for example, an electric motor 144, that may be configured to move roll carriage 102 vertically relative to load 110. Lift drive system 142 may drive roll carriage 102, and thus packaging material dispenser 106, upwards and downwards vertically on rotating arm 104 while roll carriage 102 and packaging material dispenser 106 are rotated about load 110 by rotational drive system 136, to wrap packaging material spirally about load 110.

One or more of downstream dispensing roller 116, idle roller 124 and idle roller 126 may include a corresponding sensor 146, 148, 150 to monitor rotation of the respective roller. In particular, rollers 116, 124 and/or 126, and/or packaging material 108 dispensed thereby, may be used to monitor a dispense rate of packaging material dispenser 106, e.g., by monitoring the rotational speed of rollers 116, 124 and/or 126, the number of rotations undergone by such rollers, the amount and/or speed of packaging material dispensed by such rollers, and/or one or more performance parameters indicative of the operating state of packaging material drive system 120, including, for example, a speed of packaging material drive system 120. The monitored characteristics may also provide an indication of the amount of packaging material 108 being dispensed and wrapped onto load 110. In addition, in some embodiments a sensor, e.g., sensor 148 or 150, may be used to detect a break in the packaging material.

Wrapping apparatus also includes an angle sensor 152 for determining an angular relationship between load 110 and packaging material dispenser 106 about a center of rotation 154 (through which projects an axis of rotation that is perpendicular to the view illustrated in FIG. 1). Angle sensor 152 may be implemented, for example, as a rotary encoder, or alternatively, using any number of alternate sensors or sensor arrays capable of providing an indication of the angular relationship and distinguishing from among multiple angles throughout the relative rotation, e.g., an array of proximity switches, optical encoders, magnetic encoders, electrical sensors, mechanical sensors, photodetectors, motion sensors, etc. The angular relationship may be represented in some embodiments in terms of degrees or fractions of degrees, while in other embodiments a lower resolution may be adequate. It will also be appreciated that an angle sensor consistent with the invention may also be disposed in other locations on wrapping apparatus 100, e.g., about the periphery or mounted on arm 104 or roll carriage 102. In addition, in some embodiments angular relationship may be represented and/or measured in units of time, based upon a known rotational speed of the load relative to the packaging material dispenser, from which a time to complete a full revolution may be derived such that segments of the revolution time would correspond to particular angular relationships.

Additional sensors, such as a load distance sensor 156 and/or a film angle sensor 158, may also be provided on wrapping apparatus 100. Load distance sensor 156 may be used to measure a distance from a reference point to a surface of load 110 as the load rotates relative to packaging material dispenser 106 and thereby determine a cross-sectional dimension of the load at a predetermined angular position relative to the packaging material dispenser. In one embodiment, load distance sensor 156 measures distance along a radial from center of rotation 154, and based on the known, fixed distance between the sensor and the center of rotation, the dimension of the load may be determined by subtracting the sensed distance from this fixed distance. Sensor 156 may be implemented using various types of distance sensors, e.g., a photoeye, proximity detector, laser distance measurer, ultrasonic distance measurer, electronic rangefinder, and/or any other suitable distance measuring device. Exemplary distance measuring devices may include, for example, an IFM Effector 01D100 and a Sick UM30-213118 (6036923).

Film angle sensor 158 may be used to determine a film angle for portion 130 of packaging material 108, which may be relative, for example, to a radial (not shown in FIG. 1) extending from center of rotation 154 to exit point 128 (although other reference lines may be used in the alternative).

In one embodiment, film angle sensor 158 may be implemented using a distance sensor, e.g., a photoeye, proximity detector, laser distance measurer, ultrasonic distance measurer, electronic rangefinder, and/or any other suitable distance measuring device. In one embodiment, an IFM Effector 01D100 and a Sick UM30-213118 (6036923) may be used for film angle sensor 158. In other embodiments, film angle sensor 158 may be implemented mechanically, e.g., using a cantilevered or rockered follower arm having a free end that rides along the surface of portion 130 of packaging material 108 such that movement of the follower arm tracks movement of the packaging material. In still other embodiments, a film angle sensor may be implemented by a force sensor that senses force changes resulting from movement of portion 130 through a range of film angles, or a sensor array (e.g., an image sensor) that is positioned above or below the plane of portion 130 to sense an edge of the packaging material. Wrapping apparatus 100 may also include additional components used in connection with other aspects of a wrapping operation. For example, a clamping device 159 may be used to grip the leading end of packaging material 108 between cycles. In addition, a conveyor (not shown) may be used to convey loads to and from wrapping apparatus 100. Other components commonly used on a wrapping apparatus will be appreciated by one of ordinary skill in the art having the benefit of the instant disclosure.

Figure 2:
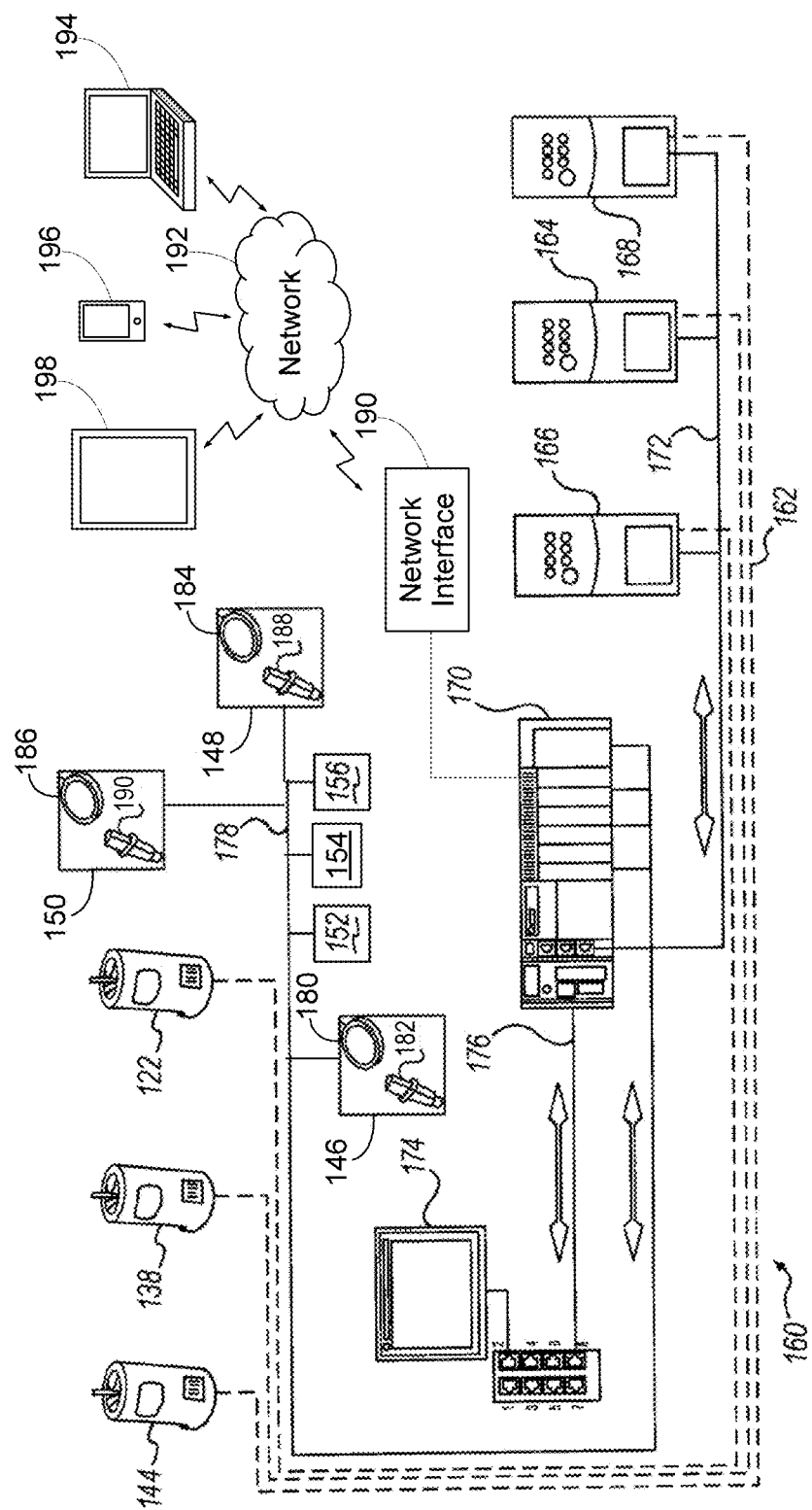
FIG. 2 is a schematic view of an exemplary control system for use in the apparatus of FIG. 1.

An example schematic of a control system 160 for wrapping apparatus 100 is shown in FIG. 2. Motor 122 of packaging material drive system 120, motor 138 of rotational drive system 136, and motor 144 of lift drive system 142 may communicate through one or more data links 162 with a rotational drive variable frequency drive ("VFD") 164, a packaging material drive VFD 166, and a lift drive VFD 168, respectively. Rotational drive VFD 164, packaging material drive VFD 166, and lift drive VFD 168 may communicate with controller 170 through a data link 172. It should be understood that rotational drive VFD 164, packaging material drive VFD 166, and lift drive VFD 168 may produce outputs to controller 170 that controller 170 may use as indicators of rotational movement. For example, packaging material drive VFD 166 may provide controller 170 with signals similar to signals provided by sensor 146, and thus, sensor 146 may be omitted to cut down on manufacturing costs.

Controller 170 in the embodiment illustrated in FIG. 2 is a local controller that is physically co-located with the packaging material drive system 120, rotational drive system 136 and lift drive system 142. Controller 170 may include hardware components and/or software program code that allow it to receive, process, and transmit data. It is contemplated that controller 170 may be implemented as a programmable logic controller (PLC), or may otherwise operate similar to a processor in a computer system. Controller 170 may communicate with an operator interface 174 via a data link 176. Operator interface 174 may include a display or screen and controls that provide an operator with a way to monitor, program, and operate wrapping apparatus 100. For example, an operator may use operator interface 174 to enter or change predetermined and/or desired settings and values, or to start, stop, or pause the wrapping cycle. Controller 170 may also communicate with one or more sensors, e.g., sensors 146, 148, 150, 152, 154 and 156, as well as others not illustrated in FIG. 2, through a data link 178, thus allowing controller 170 to receive performance related data during wrapping. It is contemplated that data links 162, 172, 176, and 178 may include any suitable wired and/or wireless communications media known in the art.

As noted above, sensors 146, 148, 150, 152 may be configured in a number of manners consistent with the invention. In one embodiment, for example, sensor 146 may be configured to sense rotation of downstream dispensing roller 116, and may include one or more magnetic transducers 180 mounted on downstream dispensing roller 116, and a sensing device 182 configured to generate a pulse when the one or more magnetic transducers 180 are brought into proximity of sensing device 182. Alternatively, sensor assembly 146 may include an encoder configured to monitor rotational movement, and capable of producing, for example, 360 or 720 signals per revolution of downstream dispensing roller 116 to provide an indication of the speed or other characteristic of rotation of downstream dispensing roller 116. The encoder may be mounted on a shaft of downstream dispensing roller 116, on electric motor 122, and/or any other suitable area. One example of a sensor assembly that may be used is an Encoder Products Company model 15H optical encoder. Other suitable sensors and/or encoders may be used for monitoring, such as, for example, optical encoders, magnetic encoders, electrical sensors, mechanical sensors, photodetectors, and/or motion sensors.

Likewise, for sensors 148 and 150, magnetic transducers 184, 186 and sensing devices 188, 190 may be used to monitor rotational movement, while for sensor 152, a rotary encoder may be used to determine the angular relationship between the load and packaging material dispenser. Any of the aforementioned alternative sensor configurations may be used for any of sensors 146, 148, 150, 152, 154 and 156 in other embodiments, and as noted above, one or more of such sensors may be omitted in some embodiments. Additional sensors capable of monitoring other aspects of the wrapping operation may also be coupled to controller 170 in other embodiments.

For the purposes of the invention, controller 170 may represent practically any type of computer, computer system, controller, logic controller, or other programmable electronic device, and may in some embodiments be implemented using one or more networked computers or other electronic devices, whether located locally or remotely with respect to the various drive systems 120, 136 and 142 of wrapping apparatus 100.

Controller 170 typically includes a central processing unit including at least one microprocessor coupled to a memory, which may represent the random access memory (RAM) devices comprising the main storage of controller 170, as well as any supplemental levels of memory, e.g., cache memories, non-volatile or backup memories (e.g., programmable or flash memories), read-only memories, etc. In addition, the memory may be considered to include memory storage physically located elsewhere in controller 170, e.g., any cache memory in a processor in CPU 52, as well as any storage capacity used as a virtual memory, e.g., as stored on a mass storage device or on another computer or electronic device coupled to controller 170. Controller 170 may also include one or more mass storage devices, e.g., a floppy or other removable disk drive, a hard disk drive, a direct access storage device (DASD), an optical drive (e.g., a CD drive, a DVD drive, etc.), and/or a tape drive, among others. Furthermore, controller 170 may include an interface 190 with one or more networks 192 (e.g., a LAN, a WAN, a wireless network, and/or the Internet, among others) to permit the communication of information to the components in wrapping apparatus 100 as well as with other computers and electronic devices, e.g. computers such as a single-user desktop computer or laptop computer 194, mobile devices such as a mobile phone 196 or tablet 198, multi-user computers such as servers or cloud resources, etc. Controller 170 operates under the control of an operating system, kernel and/or firmware and executes or otherwise relies upon various computer software applications, components, programs, objects, modules, data structures, etc. Moreover, various applications, components, programs, objects, modules, etc. may also execute on one or more processors in another computer coupled to controller 170, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning controllers, computers and computer systems, those skilled in the art will appreciate that the various embodiments of the invention are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks ($DV_D$), or other optical storage, magnetic cassettes, magnetic tape, magnetic disk storage or other magnetic storage devices, or any other medium that can be used to store the desired information and which can be accessed by controller 170. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

In the discussion hereinafter, the hardware and software used to control wrapping apparatus 100 is assumed to be incorporated wholly within components that are local to wrapping apparatus 100 illustrated in FIGS. 1-2, e.g., within components 162-178 described above. It will be appreciated, however, that in other embodiments, at least a portion of the functionality incorporated into a wrapping apparatus may be implemented in hardware and/or software that is external to the aforementioned components. For example, in some embodiments, some user interaction may be performed using a networked computer or mobile device, with the networked computer or mobile device converting user input into control variables that are used to control a wrapping operation. In other embodiments, user interaction may be implemented using a web-type interface, and the conversion of user input may be performed by a server or a local controller for the wrapping apparatus, and thus external to a networked computer or mobile device. In still other embodiments, a central server may be coupled to multiple wrapping stations to control the wrapping of loads at the different stations. As such, the operations of receiving user input, converting the user input into control variables for controlling a wrap operation, initiating and implementing a wrap operation based upon the control variables, providing feedback to a user, etc., may be implemented by various local and/or remote components and combinations thereof in different embodiments. In this regard, a controller or processor incorporated therein may be configured to interact with an operator interface that is either local to or remote from the controller/processor. In some embodiments, for example, a processor may be implemented within a local controller for a wrapping apparatus, and may cause an operator interface of the wrapping apparatus to display information by directly controlling the local display. In other embodiments, a processor may be implemented within a device that is external to a load wrapping apparatus such as a single-user computer or a mobile device, and may cause an operator interface of the external device to display information by directly controlling the external device display. In still other embodiments, a processor may be implemented within a local controller for a wrapping apparatus or a multi-user computer such as a web server, and may cause an operator interface of a remote device to display information by sending information that is decoded locally on the external device, e.g., through the communication of a web page to a web browser on the external device, or through the communication of information to an application running on the external device. Further, it will be appreciated that in some instances, a processor that determines wrap profiles and/or various wrap parameters may be remote from a wrapping apparatus, and may, for example, communicate such information to a wrapping apparatus and/or to a database for later retrieval by a wrapping apparatus. Additional variations may be contemplated, and as such, the invention is not limited to the particular allocations of functionality described herein.

Figure 3:
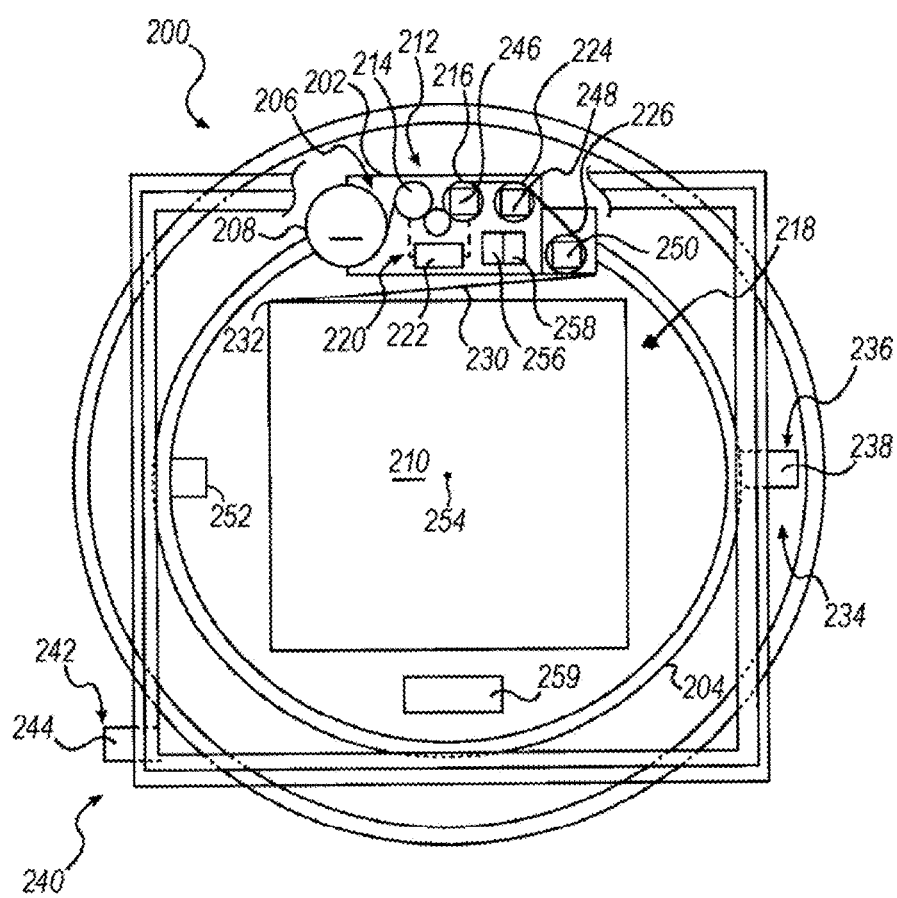
FIG. 3 shows a top view of a rotating ring-type wrapping apparatus consistent with the invention.

Now turning to FIG. 3, a rotating ring-type wrapping apparatus 200 is illustrated. Wrapping apparatus 200 may include elements similar to those shown in relation to wrapping apparatus 100 of FIG. 1, including, for example, a roll carriage 202 including a packaging material dispenser 206 configured to dispense packaging material 208 during relative rotation between roll carriage 202 and a load 210 disposed on a load support 218. However, a rotating ring 204 is used in wrapping apparatus 200 in place of rotating arm 104 of wrapping apparatus 100. In many other respects, however, wrapping apparatus 200 may operate in a manner similar to that described above with respect to wrapping apparatus 100.

Packaging material dispenser 206 may include a pre-stretch assembly 212 including an upstream dispensing roller 214 and a downstream dispensing roller 216, and a packaging material drive system 220, including, for example, an electric motor 222, may be used to drive dispensing rollers 214 and 216. Downstream of downstream dispensing roller 216 may be provided one or more idle rollers 224, 226, with the most downstream idle roller 226 effectively providing an exit point 228 from packaging material dispenser 206, such that a portion 230 of packaging material 208 extends between exit point 228 and a contact point 232 where the packaging material engages load 210.

Wrapping apparatus 200 also includes a relative rotation assembly 234 configured to rotate rotating ring 204, and thus, packaging material dispenser 206 mounted thereon, relative to load 210 as load 210 is supported on load support surface 218. Relative rotation assembly 234 may include a rotational drive system 236, including, for example, an electric motor 238. Wrapping apparatus 200 may further include a lift assembly 240, which may be powered by a lift drive system 242, including, for example, an electric motor 244, that may be configured to move rotating ring 204 and roll carriage 202 vertically relative to load 210.

In addition, similar to wrapping apparatus 100, wrapping apparatus 200 may include sensors 246, 248, 250 on one or more of downstream dispensing roller 216, idle roller 224 and idle roller 226. Furthermore, an angle sensor 252 may be provided for determining an angular relationship between load 210 and packaging material dispenser 206 about a center of rotation 254 (through which projects an axis of rotation that is perpendicular to the view illustrated in FIG. 3), and in some embodiments, one or both of a load distance sensor 256 and a film angle sensor 258 may also be provided. Sensor 252 may be positioned proximate center of rotation 254, or alternatively, may be positioned at other locations, such as proximate rotating ring 204. Wrapping apparatus 200 may also include additional components used in connection with other aspects of a wrapping operation, e.g., a clamping device 259 may be used to grip the leading end of packaging material 208 between cycles.

Figure 4:
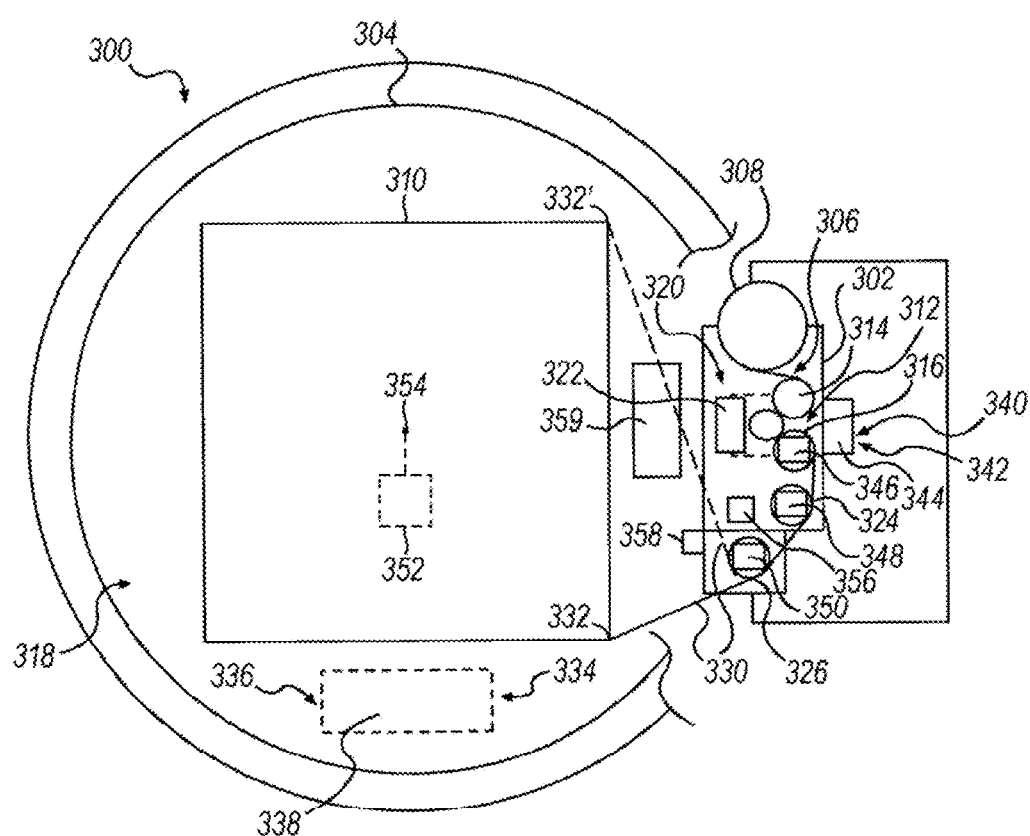
FIG. 4 shows a top view of a turntable-type wrapping apparatus consistent with the invention.

FIG. 4 likewise shows a turntable-type wrapping apparatus 300, which may also include elements similar to those shown in relation to wrapping apparatus 100 of FIG. 1. However, instead of a roll carriage 102 that rotates around a fixed load 110 using a rotating arm 104, as in FIG. 1, wrapping apparatus 300 includes a rotating turntable 304 functioning as a load support 318 and configured to rotate load 310 about a center of rotation 354 (through which projects an axis of rotation that is perpendicular to the view illustrated in FIG. 4) while a packaging material dispenser 306 disposed on a dispenser support 302 remains in a fixed location about center of rotation 354 while dispensing packaging material 308. In many other respects, however, wrapping apparatus 300 may operate in a manner similar to that described above with respect to wrapping apparatus 100.

Packaging material dispenser 306 may include a prestretch assembly 312 including an upstream dispensing roller 314 and a downstream dispensing roller 316, and a packaging material drive system 320, including, for example, an electric motor 322, may be used to drive dispensing rollers 314 and 316, and downstream of downstream dispensing roller 316 may be provided one or more idle rollers 324, 326, with the most downstream idle roller 326 effectively providing an exit point 328 from packaging material dispenser 306, such that a portion 330 of packaging material 308 extends between exit point 328 and a contact point 332 (or alternatively contact point 332' if load 310 is rotated in a counter-clockwise direction) where the packaging material engages load 310.

Wrapping apparatus 300 also includes a relative rotation assembly 334 configured to rotate turntable 304, and thus, load 310 supported thereon, relative to packaging material dispenser 306. Relative rotation assembly 334 may include a rotational drive system 336, including, for example, an electric motor 338. Wrapping apparatus 300 may further include a lift assembly 340, which may be powered by a lift drive system 342, including, for example, an electric motor 344, that may be configured to move dispenser support 302 and packaging material dispenser 306 vertically relative to load 310.

In addition, similar to wrapping apparatus 100, wrapping apparatus 300 may include sensors 346, 348, 350 on one or more of downstream dispensing roller 316, idle roller 324 and idle roller 326. Furthermore, an angle sensor 352 may be provided for determining an angular relationship between load 310 and packaging material dispenser 306 about a center of rotation 354, and in some embodiments, one or both of a load distance sensor 356 and a film angle sensor 358 may also be provided. Sensor 352 may be positioned proximate center of rotation 354, or alternatively, may be positioned at other locations, such as proximate the edge of turntable 304. Wrapping apparatus 300 may also include additional components used in connection with other aspects of a wrapping operation, e.g., a clamping device 359 may be used to grip the leading end of packaging material 308 between cycles.

Each of wrapping apparatus 200 of FIG. 3 and wrapping apparatus 300 of FIG. 4 may also include a controller (not shown) similar to controller 170 of FIG. 2, and receive signals from one or more of the aforementioned sensors and control packaging material drive system 220, 320 during relative rotation between load 210, 310 and packaging material dispenser 206, 306.

Those skilled in the art will recognize that the example environments illustrated in FIGS. 1-4 are not intended to limit the present invention. Indeed, those skilled in the art will recognize that other alternative environments may be used without departing from the scope of the invention.

Wrapping Operation

During a typical wrapping operation, a clamping device, e.g., as known in the art, is used to position a leading edge of the packaging material on the load such that when relative rotation between the load and the packaging material dispenser is initiated, the packaging material will be dispensed from the packaging material dispenser and wrapped around the load. In addition, where prestretching is used, the packaging material is stretched prior to being conveyed to the load. The dispense rate of the packaging material is controlled during the relative rotation between the load and the packaging material, and a lift assembly controls the position, e.g., the height, of the web of packaging material engaging the load so that the packaging material is wrapped in a spiral manner around the load from the base or bottom of the load to the top. Multiple layers of packaging material may be wrapped around the load over multiple passes to increase overall containment force, and once the desired amount of packaging material is dispensed, the packaging material is severed to complete the wrap.

In the illustrated embodiments, to control the overall containment force of the packaging material applied to the load, both the wrap force and the position of the web of packaging material are both controlled to provide the load with a desired overall containment force. The mechanisms by which each of these aspects of a wrapping operation are controlled are provided below.

Wrap Force Control

In many wrapping applications, the rate at which packaging material is dispensed by a packaging material dispenser of a wrapping apparatus is controlled based on a desired payout percentage, which in general relates to the amount of wrap force applied to the load by the packaging material during wrapping. Further details regarding the concept of payout percentage may be found, for example, in the aforementioned U.S. Pat. No. 7,707,801, which has been incorporated by reference.

In many embodiments, for example, a payout percentage may have a range of about 80% to about 120%. Decreasing the payout percentage slows the rate at which packaging material exits the packaging material dispenser compared to the relative rotation of the load such that the packaging material is pulled tighter around the load, thereby increasing wrap force, and as a consequence, the overall containment force applied to the load. In contrast, increasing the payout percentage decreases the wrap force. For the purposes of simplifying the discussion hereinafter, however, a payout percentage of 100% is initially assumed.

It will be appreciated, however, that other metrics may be used as an alternative to payout percentage to reflect the relative amount of wrap force to be applied during wrapping, so the invention is not so limited. In particular, to simplify the discussion, the term "wrap force" will be used herein to generically refer to any metric or parameter in a wrapping apparatus that may be used to control how tight the packaging material is pulled around a load at a given instant. Wrap force, as such, may be based on the amount of tension induced in a web of packaging material extending between the packaging material dispenser and the load, which in some embodiments may be measured and controlled directly, e.g., through the use of an electronic load cell coupled to a roller over which the packaging material passes, a spring-loaded dancer interconnected with a sensor, a torque control device, or any other suitable sensor capable of measuring force or tension in a web of packaging material.

On the other hand, because the amount of tension that is induced in a web of packaging material is fundamentally based upon the relationship between the feed rate of the packaging material and the rate of relative rotation of the load (i.e., the demand rate of the load), wrap force may also refer to various metrics or parameters related to the rate at which the packaging material is dispensed by a packaging material dispenser.

Thus, a payout percentage, which relates the rate at which the packaging material is dispensed by the packaging material dispenser to the rate at which the load is rotated relative to the packaging material dispenser, may be a suitable wrap force parameter in some embodiments. Alternatively, a dispense rate, e.g., in terms of the absolute or relative linear rate at which packaging material exits the packaging material dispenser, or the absolute or relative rotational rate at which an idle or driven roller in the packaging material dispenser or otherwise engaging the packaging material rotates, may also be a suitable wrap force parameter in some embodiments.

To control wrap force in a wrapping apparatus, a number of different control methodologies may be used. For example, in some embodiments of the invention, the effective circumference of a load may be used to dynamically control the rate at which packaging material is dispensed to a load when wrapping the load with packaging material during relative rotation established between the load and a packaging material dispenser, and thus control the wrap force applied to the load by the packaging material.

Figure 5:
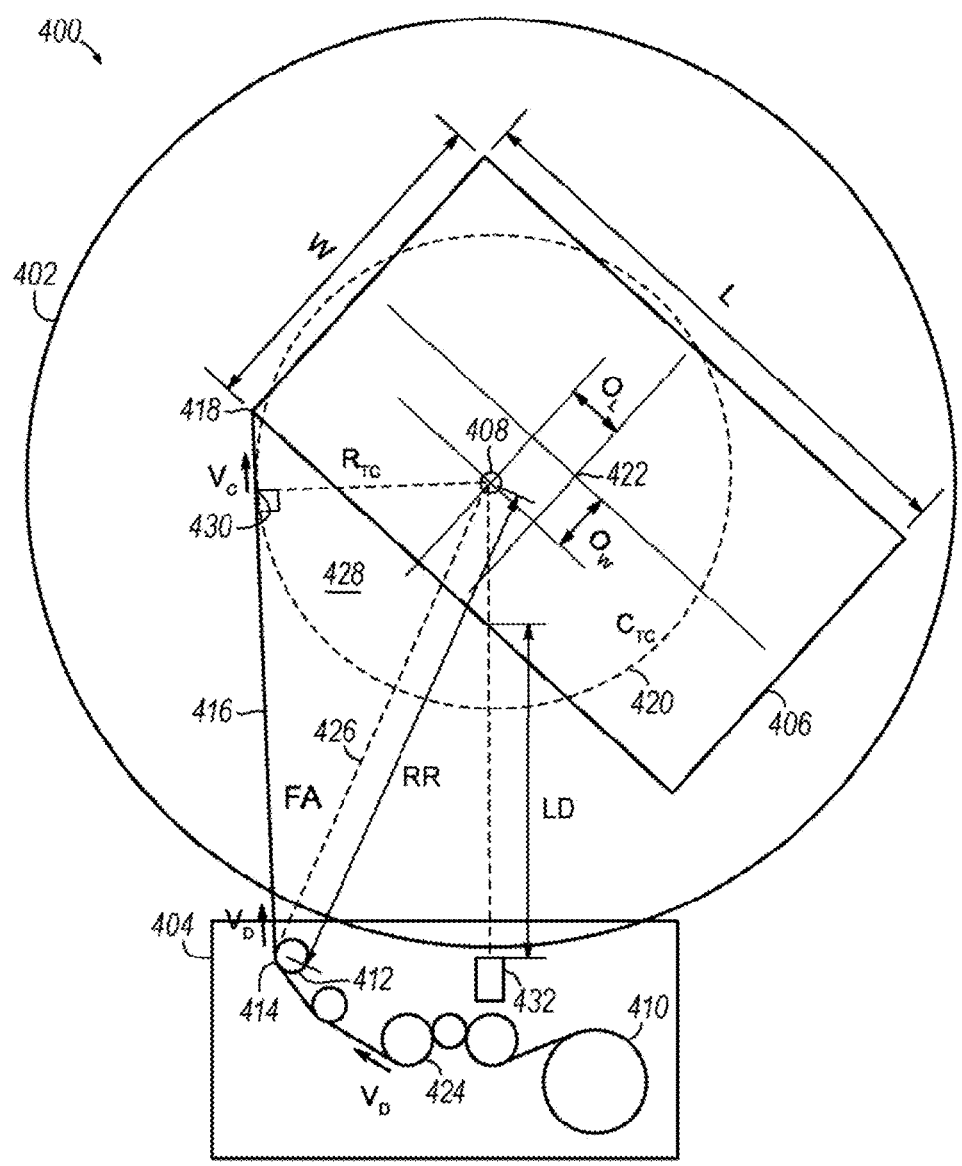
FIG. 5 is a top view of a packaging material dispenser and a load, illustrating a tangent circle defined for the load throughout relative rotation between the packaging material dispenser and the load.

FIG. 5, for example, functionally illustrates a wrapping apparatus 400 in which a load support 402 and packaging material dispenser 404 are adapted for relative rotation with one another to rotate a load 406 about a center of rotation 408 and thereby dispense a packaging material 410 for wrapping around the load. In this illustration, the relative rotation is in a clockwise direction relative to the load (i.e., the load rotates clockwise relative to the packaging material dispenser, while the packaging material dispenser may be considered to rotate in a counter-clockwise direction around the load).

In embodiments consistent with the invention, the effective circumference of a load throughout relative rotation is indicative of an effective consumption rate of the load, which is in turn indicative of the amount of packaging material being "consumed" by the load as the load rotates relative to the packaging dispenser. In particular, effective consumption rate, as used herein, generally refers to a rate at which packaging material would need to be dispensed by the packaging material dispenser in order to substantially match the tangential velocity of a tangent circle that is substantially centered at the center of rotation of the load and substantially tangent to a line substantially extending between a first point proximate to where the packaging material exits the dispenser and a second point proximate to where the packaging material engages the load. This line is generally coincident with the web of packaging material between where the packaging material exits the dispenser and where the packaging material engages the load.

As shown in FIG. 5, for example, an idle roller 412 defines an exit point 414 for packaging material dispenser 404, such that a portion of web 416 of packaging material 410 extends between this exit point 414 and an engagement point 418 at which the packaging material 410 engages load 406. In this arrangement, a tangent circle 420 is tangent to portion 416 and is centered at center of rotation 408.

The tangent circle has a circumference $C_{TC}$, which for the purposes of this invention, is referred to as the "effective circumference" of the load. Likewise, other dimensions of the tangent circle, e.g., the radius $R_{TC}$ and diameter $D_{TC}$, may be respectively referred to as the "effective radius" and "effective diameter" of the load.

It has been found that for a load having a non-circular cross-section, as the load rotates relative to the dispenser about center of rotation 408 (through which an axis of rotation extends generally perpendicular to the view shown in FIG. 5), the size (i.e., the circumference, radius and diameter) of tangent circle 420 dynamically varies, and that the size of tangent circle 420 throughout the rotation effectively models, at any given angular position of the load relative to the dispenser, a rate at which packaging material should be dispensed in order to match the consumption rate of the load, i.e., where the dispense rate in terms of linear velocity (represented by arrow $V_D$) is substantially equal to the tangential velocity of the tangent circle (represented by arrow $V_C$). Thus, in situations where a payout percentage of 100% is desired, the desired dispense rate of the packaging material may be set to substantially track the dynamically changing tangential velocity of the tangent circle.

Of note, the tangent circle is dependent not only on the dimensions of the load (i.e., the length L and width W), but also the offset of the geometric center 422 of the load from the center of rotation 408, illustrated in FIG. 5 as $O_L$ and $O_W$. Given that in many applications, a load will not be perfectly centered when it is placed or conveyed onto the load support, the dimensions of the load, by themselves, typically do not present a complete picture of the effective consumption rate of the load. Nonetheless, as will become more apparent below, the calculation of the dimensions of the tangent circle, and thus the effective consumption rate, may be determined without determining the actual dimensions and/or offset of the load in many embodiments.

It has been found that this tangent circle, when coupled with the web of packaging material and the drive roller (e.g., drive roller 424), functions in much the same manner as a belt drive system, with tangent circle 420 functioning as the driver pulley, dispenser drive roller 424 functioning as the follower pulley, and web 416 of packaging material functioning as the belt. For example, let $N_d$ be the rotational velocity of a driver pulley in RPM, $N_f$ be the rotational velocity of a follower pulley in RPM, $R_d$ be the radius of the driver pulley and $R_f$ be the radius of the follower pulley. Consider the length of belt that passes over each of the driver pulley and the follower pulley in one minute, which is equal to the circumference of the respective pulley (diameter*$\pi$, or radius*$2\pi$) multiplied by the rotational velocity:

$$L_d = 2\pi * R_d * N_d \quad (1)$$

$$L_f = 2\pi * R_f * N_f \quad (2)$$

where $L_d$ is the length of belt that passes over the driver pulley in one minute, and $L_f$ is the length of belt that passes over the follower pulley in one minute.

In this theoretical system, the point at which neither pulley applied a tensile or compressive force to the belt (which generally corresponds to a payout percentage of 100%) would be achieved when the tangential velocities, i.e., the linear velocities at the surfaces or rims of the pulleys, were equal. Put another way, when the length of belt that passes over each pulley over the same time period is equal, i.e., $L_d = L_f$. Therefore:

$$2\pi * R_d * N_d = 2\pi * R_f * N_f \quad (3)$$

Consequently, the velocity ratio VR of the rotational velocities of the driver and follower pulleys is:

$$VR = \frac{N_d}{N_f} = \frac{R_f}{R_d} \quad (4)$$

Alternatively, the velocity ratio may be expressed in terms of the ratio of diameters or of circumferences:

$$VR = \frac{N_d}{N_f} = \frac{D_f}{D_d} \quad (5)$$

-continued $$VR = \frac{N_d}{N_f} = \frac{C_f}{C_d} \quad (6)$$

where $D_f$, $D_d$ are the respective diameters of the follower and driver pulleys, and $C_f$, $C_d$ are the respective circumferences of the follower and driver pulleys.

Returning to equations (1) and (2) above, the values $L_d$ and $L_f$ represent the length of belt that passes the driver and follower pulleys in one minute. Thus, when the tangent circle for the load is considered a driver pulley, the effective consumption rate (ECR) may be considered to be equal to the length of packaging material that passes the tangent circle in a fixed amount of time, e.g., per minute:

$$ECR = C_{TC} * N_{TC} = 2\pi * R_{TC} * N_{TC} \quad (7)$$

where $C_{TC}$ is the circumference of the tangent circle, $N_{TC}$ is the rotational velocity of the tangent circle (e.g., in revolutions per minute (RPM)), and $R_{TC}$ is the radius of the tangent circle.

Therefore, given a known rotational velocity for the load, a known circumference of the tangent circle at a given instant and a known circumference for the drive roller, the rotational velocity of the drive roller necessary to provide a dispense rate that substantially matches the effective consumption rate is:

$$N_{DR} = \frac{C_{TC}}{C_{DR}} * N_L \quad (8)$$

where $N_{DR}$ is the rotational rate of the drive roller, $C_{TC}$ is the circumference of the tangent circle and the effective circumference of the load, CDR is the circumference of the drive roller and NL is the rotational rate of the load relative to the dispenser.

In addition, should it be desirable to scale the rotational rate of the drive roller to provide a controlled payout percentage (PP), and thereby provide a desired containment force and/or a desired packaging material use efficiency, equation (8) may be modified as follows:

$$N_{DR} = \frac{C_{TC}}{C_{DR}} * N_L * PP \quad (9)$$

Figure 6:
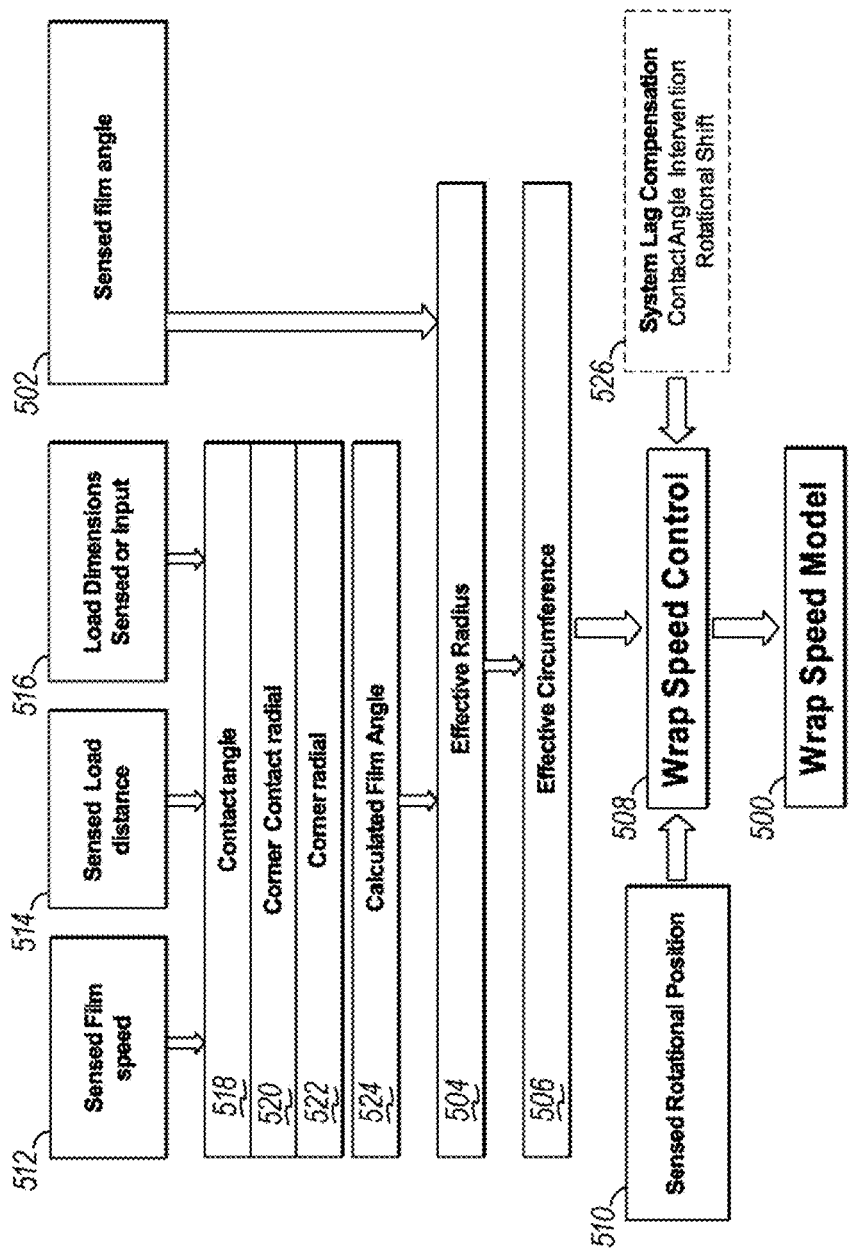
FIG. 6 is a block diagram of various inputs to a wrap speed model consistent with the invention.

The manner in which the dimensions (i.e., circumference, diameter and/or radius) of the tangent circle may be calculated or otherwise determined may vary in different embodiments. For example, as illustrated in FIG. 6, a wrap speed model 500, representing the control algorithm by which to drive a packaging material dispenser to dispense packaging material at a desired dispense rate during relative rotation with a load, may be responsive to a number of different control inputs.

In some embodiments, for example, a sensed film angle (block 502) may be used to determine various dimensions of a tangent circle, e.g., effective radius (block 504) and/or effective circumference (block 506). As shown in FIG. 5, for example, a film angle FA may be defined as the angle at exit point 414 between portion 416 of packaging material 410 (to which tangent circle 420 is tangent) and a radial or radius 426 extending from center of rotation 408 to exit point 414.

Returning to FIG. 6, the film angle sensed in block 502, e.g., using an encoder and follower arm or other electronic sensor, is used to determine one or more dimensions of the tangent circle (e.g., effective radius, effective circumference and/or effective diameter), and from these determined dimensions, a wrap speed control algorithm 508 determines a dispense rate. In many embodiments, wrap speed control algorithm 508 also utilizes the angular relationship between the load and the packaging material dispenser, i.e., the sensed rotational position of the load, as an input such that, for any given rotational position or angle of the load (e.g., at any of a plurality of angles defined in a full revolution), a desired dispense rate for the determined tangent circle may be determined.

Alternatively or in addition to the use of sensed film angle, various additional inputs may be used to determine dimensions of a tangent circle. As shown in block 512, for example, a film speed sensor, such as an optical or magnetic encoder on an idle roller, may be used to determine the speed of the packaging material as the packaging material exits the packaging material dispenser. In addition, as shown in block 514, a laser or other distance sensor may be used to determine a load distance (i.e., the distance between the surface of the load at a particular rotational position and a reference point about the periphery of the load). Furthermore, as shown in block 516, the dimensions of the load, e.g., length, width and/or offset, may either be input manually by a user, may be received from a database or other electronic data source, or may be sensed or measured.

From any or all of these inputs, one or more dimensions of the load, such as corner contact angles (block 518), corner contact radials (block 520), and/or corner radials (block 522) may be used to determine a calculated film angle (block 524), such that this calculated film angle may be used in lieu of or in addition to any sensed film angle to determine one or more dimensions of the tangent circle. Thus, the calculated film angle may be used by the wrap speed control algorithm in a similar manner to the sensed film angle described above. Moreover, in some embodiments additional modifications may be applied to wrap speed control algorithm 508 to provide more accurate control over the dispense rate. As shown in block 526, for example, a compensation may be performed to address system lag. In some embodiments, for example, a controlled intervention may be performed to effectively anticipate contact of a corner of the load with the packaging material. In addition, in some embodiments, a rotational shift may be performed to better align collected data with the control algorithm and thereby account for various lags in the system.

Additional details regarding effective circumference-based control may be found in the aforementioned U.S. provisional patent applications Ser. 61/718,429 and Ser. No. 61/718,433, which have been incorporated by reference herein. In addition, as noted above other manners of directly or indirectly controlling wrap force may be used in other embodiments without departing from the spirit and scope of the invention, including various techniques and variations disclosed in the aforementioned provisional patent applications, as well as other wrap speed or wrap force-based control packaging material dispense techniques known in the art.

Web Position Control

Figure 7:
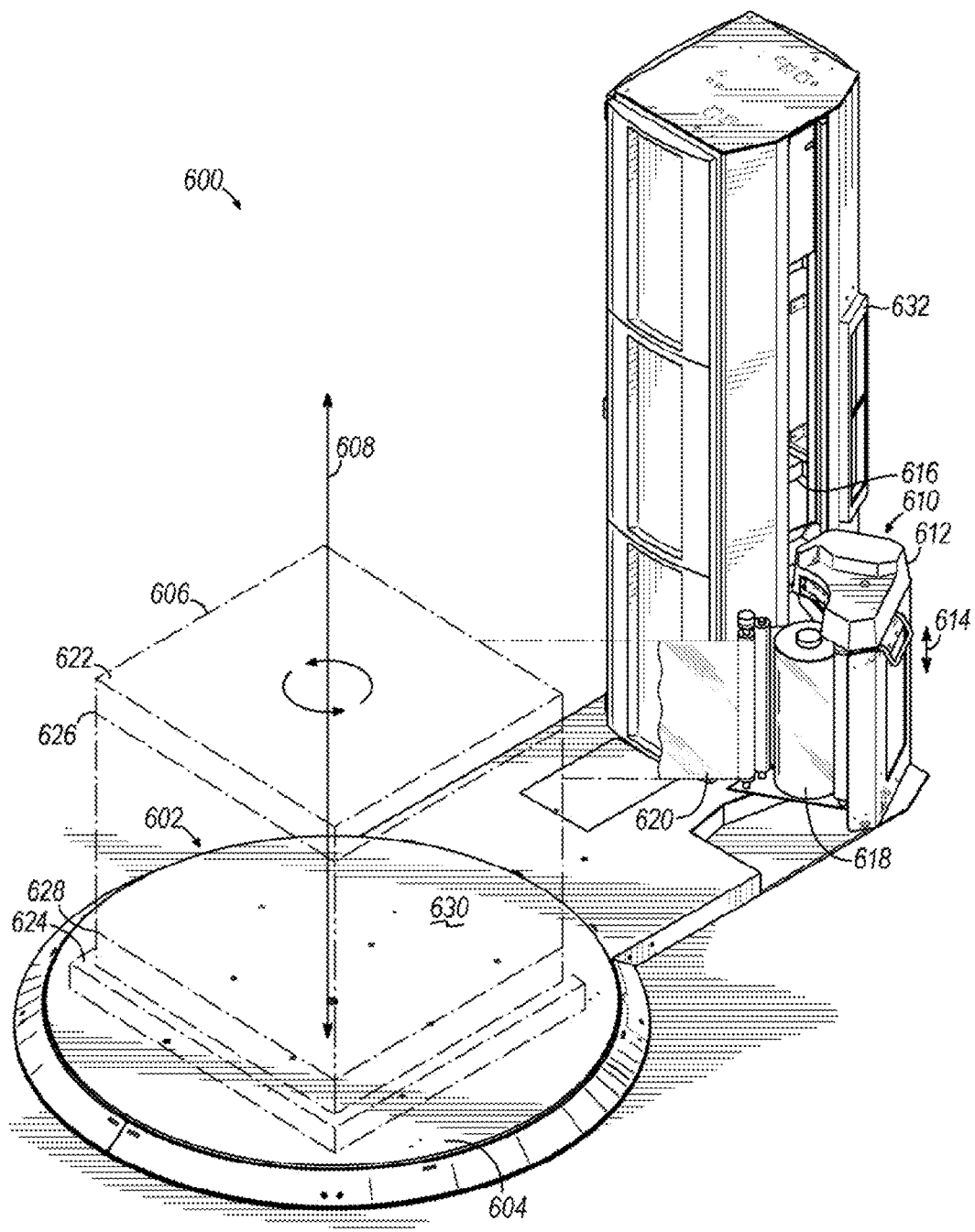
FIG. 7 is a perspective view of a turntable-type wrapping apparatus consistent with the invention.

As noted above, during a wrapping operation, the position of the web of packaging material is typically controlled to wrap the load in a spiral manner. FIG. 7, for example, illustrates a turntable-type wrapping apparatus 600 similar to wrapping apparatus 300 of FIG. 4, including a load support 602 configured as a rotating turntable 604 for supporting a load 606. Turntable 604 rotates about an axis of rotation 608, e.g., in a counter-clockwise direction as shown in FIG. 7.

A packaging material dispenser 610, including a roll carriage 612, is configured for movement along a direction 614 by a lift mechanism 616. Roll carriage 612 supports a roll 618 of packaging material, which during a wrapping operation includes a web 620 extending between packaging material dispenser 610 and load 606.

Direction 614 is generally parallel to an axis about which packaging material is wrapped around load 606, e.g., axis 608, and movement of roll carriage 612, and thus web 620, along direction 614 during a wrapping operation enables packaging material to be wrapped spirally around the load.

In the illustrated embodiment, it is desirable to provide at least a minimum number of layers of packaging material within a contiguous region on a load. For example, load 606 includes opposing ends along axis 608, e.g., a top 622 and bottom 624 for a load wrapped about a vertically oriented axis 608, and it may be desirable to wrap packaging material between two positions 626 and 628 defined along direction 614 and respectively proximate top 622 and bottom 624. Positions 626, 628 define a region 630 therebetween that, in the illustrated embodiments, is provided with at least a minimum number of layers of packaging material throughout.

The position of roll carriage 612 may be sensed using a sensing device (not shown in FIG. 7), which may include any suitable reader, encoder, transducer, detector, or sensor capable of determining the position of the roll carriage, another portion of the packaging material dispenser, or of the web of packaging material itself relative to load 606 along direction 614. It will be appreciated that while a vertical direction 614 is illustrated in FIG. 7, and thus the position of roll carriage 612 corresponds to a height, in other embodiments where a load is wrapped about an axis other than a vertical axis, the position of the roll carriage may not be related to a height.

Control of the position of roll carriage 612, as well as of the other drive systems in wrapping apparatus 600, is provided by a controller 632, the details of which are discussed in further detail below.

Containment Force-Based Wrapping

Conventionally, stretch wrapping machines have controlled the manner in which packaging material is wrapped around a load by offering control input for the number of bottom wraps placed at the base of a load, the number of top wraps placed at the top of the load, and the speed of the roll carriage in the up and down traverse to manage overlaps of the spiral wrapped film. In some designs, these controls have been enhanced by controlling the overlap inches during the up and down travel taking into consideration the relative speed of rotation and roll carriage speed.

However, it has been found that conventional control inputs often do not provide optimal performance, as such control inputs often do not evenly distribute the containment forces on all areas of a load, and often leave some areas with insufficient containment force. Often, this is due to the relatively complexity of the control inputs and the need for experienced operators. Particularly with less experienced operators, operators react to excessive film breaks by reducing wrap force and inadvertently lowering cumulative containment forces below desirable levels.

Some embodiments consistent with the invention, on the other hand, utilize a containment force-based wrap control to simplify control over wrap parameters and facilitate even distribution of containment force applied to a load. In particular, in some embodiments of the invention, an operator specifies a load containment force requirement that is used, in combination with one or more attributes of the packaging material being used to wrap the load, to control the dispensing of packaging material to the load.

A load containment force requirement, for example, may include a minimum overall containment force to be applied over all concerned areas of a load (e.g., all areas over which packaging material is wrapped around the load). In some embodiments, a load containment force requirement may also include different minimum overall containment forces for different areas of a load, a desired range of containment forces for some or all areas of a load, a maximum containment force for some or all areas of a load.

A packaging material attribute may include, for example, an incremental containment force/revolution (ICF) attribute, which is indicative of the amount of containment force added to a load in a single revolution of packaging material around the load. The ICF attribute may be related to a wrap force or payout percentage, such that, for example, the ICF attribute is defined as a function of the wrap force or payout percentage at which the packaging material is being applied. In some embodiments, the ICF attribute may be linearly related to payout percentage, and include an incremental containment force at 100% payout percentage along with a slope that enables the incremental containment force to be calculated for any payout percentage. Alternatively, the ICF attribute may be defined with a more complex function, e.g., s-curve, interpolation, piecewise linear, exponential, multi-order polynomial, logarithmic, moving average, power, or other regression or curve fitting techniques. It will be appreciated that other attributes associated with the tensile strength of the packaging material may be used in the alternative.

Other packaging material attributes may include attributes associated with the thickness and/or weight of the packaging material, e.g., specified in terms of weight per unit length, such as weight in ounces per 1000 inches. Still other packaging material attributes may include a wrap force limit attribute, indicating, for example, a maximum wrap force or range of wrap forces with which to use the packaging material (e.g., a minimum payout percentage), a width attribute indicating the width (e.g., in inches) of the packaging material, and/or additional identifying attributes of a packaging material (e.g., manufacturer, model, composition, coloring, etc.), among others.

A load containment force requirement and a packaging material attribute may be used in a wrap control consistent with the invention to determine one or both of a wrap force to be used when wrapping a load with packaging material and a number of layers of packaging material to be applied to the load to meet the load containment force requirement. The wrap force and number of layers may be represented respectively by wrap force and layer parameters. The wrap force parameter may specify, for example, the desired wrap force to be applied to the load, e.g., in terms of payout percentage, or in terms of a dispense rate or force.

The layer parameter may specify, for example, a minimum number of layers of packaging material to be dispensed throughout a contiguous region of a load. In this regard, a contiguous region of a load may refer to a region of a load between two different relative elevations along an axis of relative rotation and throughout which it is desirable to apply packaging material. In some embodiments, the contiguous region may be considered to include all sides of a load, while in other embodiments, the contiguous region may refer to only a single side or subset of sides, or even to a line extending along a side of a load between different elevations.

With regard to the concept of a minimum number of layers of packaging material, a minimum number of layers of three, for example, means that at any point on the load within a contiguous region wrapped with packaging material, at least three overlapping layers of packaging material will overlay that point. Put differently, the number of layers may also be considered to represent a combined thickness of packaging material applied to the load. As such, in some embodiments, the layer parameter may be specified in terms of a minimum combined thickness of packaging material to be dispensed through a contiguous region of a load. In some embodiments, the combined thickness may be represented in terms of layers, while in other embodiments, the combined thickness may be represented in terms of the actual packaging material thickness represented by the combined layers of packaging material applied to the load. Nonetheless, for the purposes of this disclosure, the terms "number of layers" and "combined thickness" may be used interchangeably.

In addition, while a layer parameter in the embodiments hereinafter is based upon a minimum value throughout a contiguous region of a load, in other embodiments, a layer parameter may be based on an average, median or other calculation related to the combined thickness of packaging material throughout at least a portion of the contiguous region.

Moreover, it will be appreciated that a layer parameter may specify other control parameters that, when utilized, provide the desired minimum number of layers or combined thickness, e.g., an amount of overlap between successive revolutions, a carriage or elevator speed, a number of up and/or down passes of the carriage or elevator, a number of relative revolutions, etc. For example, in some embodiments, carriage speed and the number of up and/or down passes may be used as layer parameters to provide a desired minimum number of layers or combined thickness of packaging material during a wrapping operation. In some other embodiments, however, no separate determination of minimum number of layers or combined thickness may be performed, and layer parameters based on overlap, carriage speed and/or number of passes may be used.

A layer parameter may also specify different number of layers for different portions of a load, and may include, for example, additional layers proximate the top and/or bottom of a load. Other layer parameters may include banding parameters (e.g., where multiple pallets are stacked together in one load).

Figure 8:
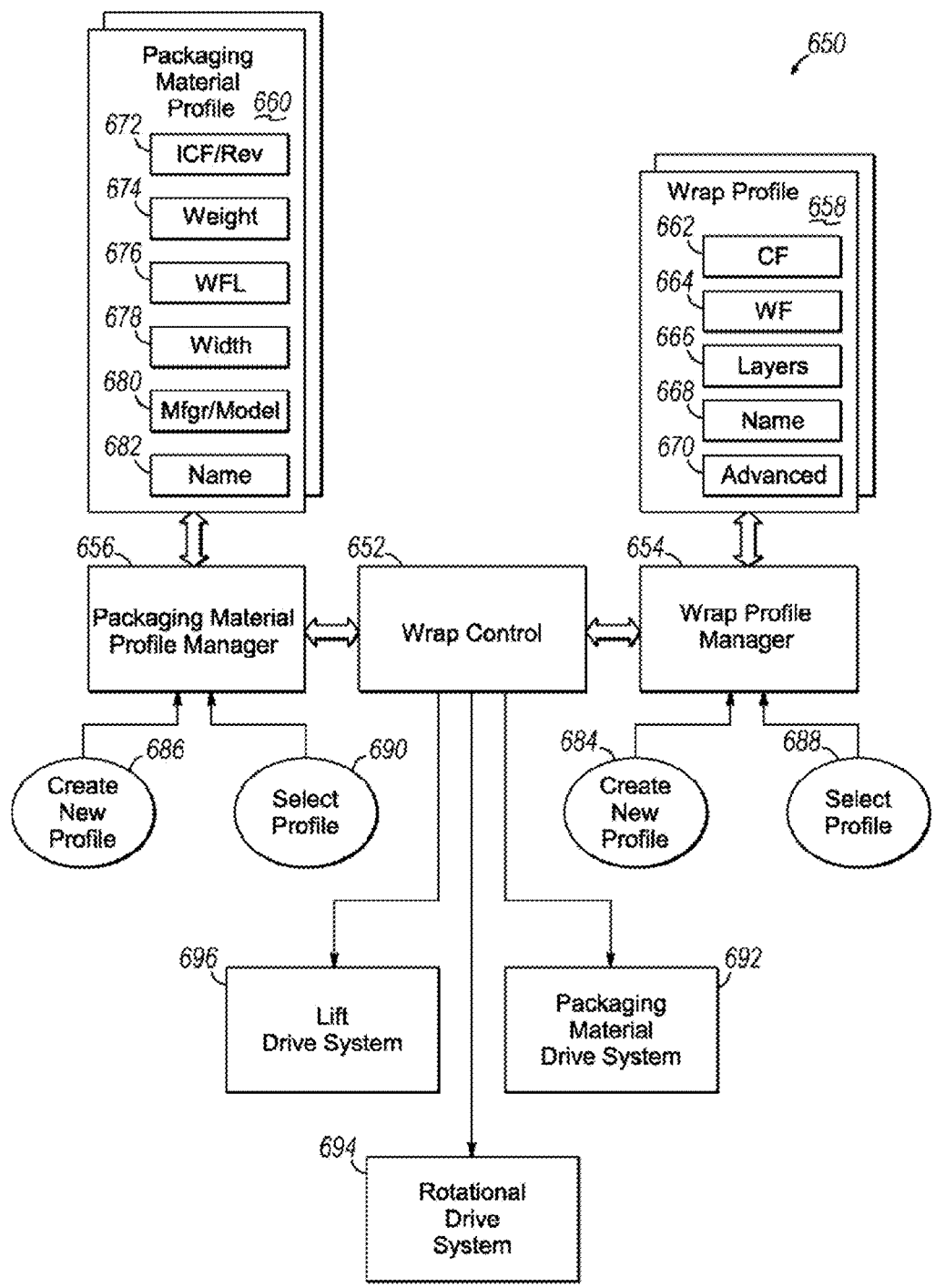
FIG. 8 is a block diagram illustrating an example load containment force-based control system consistent with the invention.

Now turning to FIG. 8, an example control system 650 for a wrapping apparatus implements load containment force-based wrap control through the use of profiles. In particular, a wrap control block 652 is coupled to a wrap profile manager block 654 and a packaging material profile manager block 656, which respectively manage a plurality of wrap profiles 658 and packaging material profiles 660.

Each wrap profile 658 stores a plurality of parameters, including, for example, a containment force parameter 662, a wrap force (or payout percentage) parameter 664, and a layer parameter 666. In addition, each wrap profile 658 may include a name parameter providing a name or other identifier for the profile. The name parameter may identify, for example, a type of load (e.g., a light stable load type, a moderate stable load type, a moderate unstable load type or a heavy unstable load type), or may include any other suitable identifier for a load (e.g., "20 oz bottles", "Acme widgets", etc.).

In addition, a wrap profile may include additional parameters, collectively illustrated as advanced parameters 670, that may be used to specify additional instructions for wrapping a load. Additional parameters may include, for example, an overwrap parameter identifying the amount of overwrap on top of a load, a top parameter specifying an additional number of layers to be applied at the top of the load, a bottom parameter specifying additional number of layers to be applied at the bottom of the load, a pallet payout parameter specifying the payout percentage to be used to wrap a pallet supporting the load, a top wrap first parameter specifying whether to apply top wraps before bottom wraps, a variable load parameter specifying that loads are the same size from top to bottom, a variable layer parameter specifying that loads are not the same size from top to bottom, one or more rotation speed parameters (e.g., one rotation speed parameter specifying a rotational speed prior to a first top wrap and another rotation speed parameter specifying a rotational speed after the first top wrap), a band parameter specifying any additional layers to be applied at a band position, a band position parameter specifying a position of the band from the down limit, a load lift parameter specifying whether to raise the load with a load lift, a short parameter specifying a height to wrap for short loads (e.g., for loads that are shorter than a height sensor), etc.

A packaging material profile 660 may include a number of packaging material-related attributes and/or parameters, including, for example, an incremental containment force/revolution attribute 672 (which may be represented, for example, by a slope attribute and a force attribute at a specified wrap force), a weight attribute 674, a wrap force limit attribute 676, and a width attribute 678. In addition, a packaging material profile may include additional information such as manufacturer and/or model attributes 680, as well as a name attribute 682 that may be used to identify the profile. Other attributes, such as cost or price attributes, roll length attributes, prestretch attributes, or other attributes characterizing the packaging material, may also be included.

Each profile manager 654, 656 supports the selection and management of profiles in response to user input, e.g., from an operator of the wrapping apparatus. For example, each profile manager may receive user input 684, 686 to create a new profile, as well as user input 688, 690 to select a previously-created profile. Additional user input, e.g., to modify or delete a profile, duplicate a profile, etc. may also be supported. Furthermore, it will be appreciated that user input may be received in a number of manners consistent with the invention, e.g., via a touchscreen, via hard buttons, via a keyboard, via a graphical user interface, via a text user interface, via a computer or controller coupled to the wrapping apparatus over a wired or wireless network, etc.

In addition, wrap and packaging material profiles may be stored in a database or other suitable storage, and may be created using control system 650, imported from an external system, exported to an external system, retrieved from a storage device, etc. In some instances, for example, packaging material profiles may be provided by packaging material manufacturers or distributors, or by a repository of packaging material profiles, which may be local or remote to the wrapping apparatus. Alternatively, packaging material profiles may be generated via testing, e.g., as disclosed in the aforementioned U.S. Patent Application Publication No. 2012/0102886.

A load wrapping operation using control system 650 may be initiated, for example, upon selection of a wrap profile 658 and a packaging material profile 660, and results in initiation of a wrapping operation through control of a packaging material drive system 692, rotational drive system 694, and lift drive system 696.

Furthermore, wrap profile manager 654 includes functionality for automatically calculating one or more parameters in a wrap profile based upon a selected packaging material profile and/or one or more other wrap profile parameters. For example, wrap profile manager 654 may be configured to calculate a layer parameter and/or a wrap force parameter for a wrap profile based upon the load containment force requirement for the wrap profile and the packaging material attributes in a selected packaging material profile. In addition, in response to modification of a wrap profile parameter and/or selection of a different packaging material profile, wrap profile manager 654 may automatically update one or more wrap profile parameters.

In one embodiment, for example, selection of a different packaging material profile may result in updating of a layer and/or wrap force parameter for a selected wrap profile. In another embodiment, selection of a different wrap force parameter may result in updating of a layer parameter, and vice versa.

As one example, in response to unacceptable increases in film breaks, film quality issues, or mechanical issues such as film clamps or prestretch roller slippage, an operator may reduce wrap force (i.e., increase payout percentage), and functionality in the wrap control system may automatically increase the layer parameter to maintain the overall load containment force requirement for the wrap profile.

Wrap profile manager 654 may also support functionality for comparing different packaging material profiles, e.g., to compare the performance and/or cost of different packaging materials. An operator may therefore be able to determine, for example, that one particular packaging material, which has a lower cost per roll than another packaging material, is actually more expensive due to a need for additional layers to be applied to maintain a sufficient overall containment force. In some embodiments, a packaging material profile may even be automatically selected from among a plurality of packaging material profiles based upon comparative calculations to determine what packaging materials provide the desired performance with the lowest overall cost.

Figure 9:
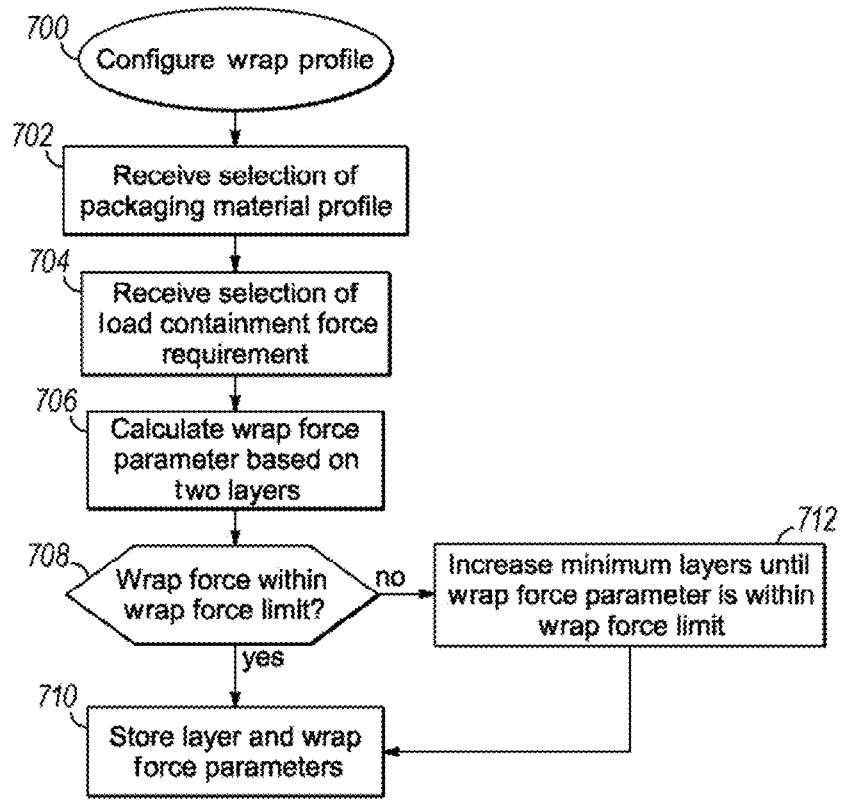
FIG. 9 is a flowchart illustrating a sequence of steps in an example routine for configuring a wrap profile in the control system of FIG. 8.

FIG. 9 illustrates an example routine 700 for configuring a wrap profile using wrap control system 650. Routine 700 begins in block 702 by receiving an operator selection of a packaging material profile. Next, in block 704, an operator selection of a load containment force requirement, e.g., a minimum load containment force, is received.

In some embodiments, a load containment force requirement may be specified based on a numerical force (e.g., in pounds of force). In other embodiments, the requirement may be based on a load attribute, such as a load type and/or various load-related characteristics. In some embodiments, for example, loads may be classified as being light, moderate or heavy, and stable or unstable in nature, and an appropriate load containment force requirement may be calculated based upon the load type or attributes. In still other embodiments, an operator may be provided with recommended ranges of containment forces, e.g., 2-5 lbs for light stable loads, 5-7 lbs for moderate stable loads, 7-12 lbs for moderate unstable loads, and 12-20 lbs for heavy unstable loads, enabling an operator to input a numerical containment force based upon the recommended ranges.

Next, in block 706, a wrap force parameter, e.g., a payout percentage, is calculated assuming an initial layer parameter of a minimum of two layers, and based on an incremental containment force/revolution attribute of the selected packaging material profile. The overall load containment force (CF) is calculated as:

$$CF = ICF * L \quad (10)$$

where ICF is the incremental containment force/revolution of the packaging material and L is the layer parameter, which is initially set to two.

The ICF attribute, as noted above, may be specified based on a containment force at a predetermined wrap force/payout percentage and a slope. Thus, for example, assuming an incremental containment force at 100% payout percentage ($ICF_{100\%}$) and slope (S), the ICF attribute is calculated as:

$$ICF = ICF_{100\%} + S(PP - 100\%) \quad (11)$$

where PP is the wrap force or payout percentage.

Based on equations (10) and (11), wrap force, or payout percentage (PP) is calculated from the overall load containment force, the ICF attribute and the layer parameter as follows:

$$PP = 100\% + \frac{\left(\frac{CF}{L} - ICF_{100\%}\right)}{S} \quad (12)$$

Next, block 708 determines whether the payout percentage is within the wrap force limit for the packaging material. If so, control passes to block 710 to store the layer (L) and wrap force (PP) parameters for the wrap profile, and configuration of the wrap profile is complete. Otherwise, block 708 passes control to block 712 to increase the layer (L) parameter until the wrap force (PP) parameter as calculated using equation (12) falls within the wrap force limit for the packaging material. Control then passes to block 710 to store the layer and wrap force parameters. In this way, the overall load containment force requirement is met using the least number of layers, which minimizes costs and cycle time for a wrapping operation.

It will be appreciated that the functionality described above for routine 700 may also be used in connection with modifying a wrap profile, e.g., in response to an operator changing the number of layers, the selected packaging material profile, the desired wrap force and/or the overall load containment force requirement for a wrap profile. In addition, in other embodiments, no preference for using the least number of layers may exist, such that the selection of a layer and/or wrap force parameter may be based on whichever combination of parameters that most closely match the overall load containment force requirement for a load.

Figure 10:
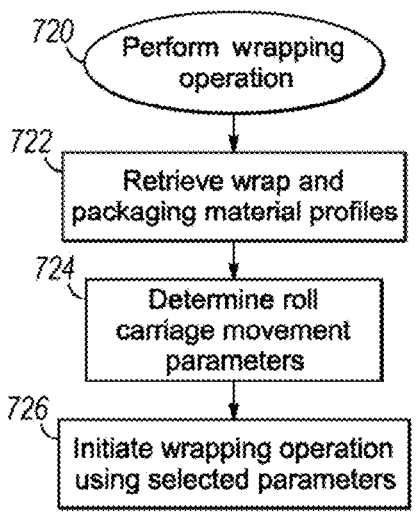
FIG. 10 is a flowchart illustrating a sequence of steps in an example routine for performing a wrapping operation in the control system of FIG. 8.

Once a wrap profile has been selected by an operator, a wrapping operation may be initiated, e.g., using a sequence of steps such as illustrated by routine 720 in FIG. 10. In particular, in block 722 the selected wrap and packaging material profiles are retrieved, and then in block 724, one or more roll carriage parameters are determined. The roll carriage parameters generally control the movement of the roll carriage, and thus, the height where the web of packaging material engages the load during a wrapping operation, such that the selected minimum number of layers of packaging material are applied to the load throughout a desired contiguous region of the load.

For example, in one embodiment, the roll carriage parameters may include a speed or rate of the roll carriage during a wrapping operation, as the number of layers applied by a wrapping operation may be controlled in part by controlling the speed or rate of the roll carriage as it travels between top and bottom positions relative to the rotational speed of the load. The rate may further be controlled based on a desired overlap between successive revolutions or wraps of the packaging material, as the overlap (O) may be used to provide the desired number of layers (L) of a packaging material having a width (W) based on the relationship:

$$O = W - \frac{W}{L} \tag{13}$$

In some instances, however, it may be desirable to utilize multiple up and/or down passes of the roll carriage in a wrapping operation such that only a subset of the desired layers is applied in each pass, and as such, the roll carriage parameters may also include a number of up and/or down passes.

In some embodiments, for example, such as some vertical ring designs, it may be desirable to attempt to apply all layers in a single pass between the top and bottom of a load. In other designs, however, such as designs incorporating bottom mounted clamping devices, it may be desirable to perform a first pass from the bottom to the top of the load and a second pass from the top of the load to the bottom of the load. In one embodiment for the latter type of designs, for example, two layers may be applied by applying the first layer on the first pass using an overlap of 0 inches and applying the second layer on the second pass using an overlap of 0 inches. Three layers may be applied by applying the first and second layers on the first pass using an overlap of 50% of the packaging width and applying the third layer on the second pass using an overlap of 0 inches. Four layers may be applied by applying the first and second layers on the first pass and the third and fourth layers on the second path, all with an overlap of 50% of the packaging material width. Five layers may be applied by applying the first, second and third layers on the first pass with an overlap of 67% of the packaging material width and applying the fourth and fifth layers on the second pass with an overlap of 50% of the packaging material width, etc.

It will be appreciated, however, the calculation of a roll carriage rate to provide the desired overlap and minimum number of layers throughout a contiguous region of the load may vary in other embodiments, and may additionally account for additional passes, as well as additional advanced parameters in a wrap profile, e.g., the provision of bands, additional top and/or bottom layers, pallet wraps, etc. In addition, more relatively complex patterns of movement may be defined for a roll carriage to vary the manner in which packaging material is wrapped around a load in other embodiments of the invention.

Returning to FIG. 10, after determination of the roll carriage parameters, block 726 initiates a wrapping operation using the selected parameters. During the wrapping operation, the movement of the roll carriage is controlled based upon the determined roll carriage parameters, and the wrap force is controlled in the manner discussed above based on the wrap force parameter in the wrap profile. In this embodiment, the load height is determined after the wrapping operation is initiated, e.g., using a sensor coupled to the roll carriage to sense when the top of the load has been detected during the first pass of the roll carriage. Alternatively, the load height may be defined in a wrap profile, may be manually input by an operator, or may be determined prior to initiation of a wrapping operation using a sensor on the wrapping apparatus. In addition, other parameters in the profile or otherwise stored in the wrap control system (e.g., the top and/or bottom positions for roll carriage travel relative to load height, band positions and layers, top and/or bottom layers, etc.), may also be used in the performance of the wrapping operation.

It will be appreciated that in other embodiments, no profiles may be used, whereby control parameters may be based on individual parameters and/or attributes input by an operator. Therefore, the invention does not require the use of profiles in all embodiments. In still other embodiments, an operator may specify one parameter, e.g., a desired number of layers, and a wrap control system may automatically select an appropriate wrap force parameter, packaging material and/or load containment force requirement based upon the desired number of layers.

For example, FIG. 11 illustrates an alternate routine 730 in which an operator inputs packaging material parameters either via a packaging material profile or through the manual input of one or more packaging material parameters (block 732), along with the input of a load containment force requirement (block 734). The input of the load containment force requirement may include, for example, selection of a numerical indicator of load containment force (e.g., 10 lbs). Alternatively, the input of the load containment force requirement may include the input of one or more load types, attributes or characteristics (e.g., weight of load, stability of load, a product number or identifier, etc.), with a wrap control system selecting an appropriate load containment force for the type of load indicated.

Then, in block 736, wrap force and layer parameters are determined in the manner disclosed above based on the load containment force requirement and packaging material attributes, and thereafter, roll carriage movement parameters are determined (block 738) and a wrapping operation is initiated to wrap the determined number of layers on the load using the determined wrap force (block 740). As such, an operator is only required to input characteristics of the load and/or an overall load containment force, and based on the packaging material used, suitable control parameters are generated to control the wrapping operation. Thus, the level of expertise required to operate the wrapping apparatus is substantially reduced.

As another example, FIG. 12 illustrates a routine 750 that is similar to routine 720 of FIG. 10, but that includes the retrieval of a selection of the number of layers to be applied from an operator in block 752, e.g., via user input that selects a numerical number of layers. Once the number of layers has been selected by an operator, and then based upon the width of the packaging material, and the number of layers defined in the wrap profile, as well as any additional parameters in the profile or otherwise stored in the wrap control system (e.g., the top and/or bottom positions for roll carriage travel relative to load height, band positions and layers, top and/or bottom layers, etc.), one or more roll carriage parameters may be determined in block 754, in a similar manner as that described above in connection with FIG. 10. Then, after determination of the roll carriage parameters, block 756 initiates a wrapping operation using the selected parameters. During the wrapping operation, the movement of the roll carriage is controlled based upon the determined roll carriage parameters. In addition, the wrap force may be controlled in the manner discussed above based on a wrap force parameter. Alternatively, various alternative wrap force controls, e.g., various conventional wrap force controls, may be used, with the operator selection of the number of layers used to control the manner in which the packaging material is wrapped about the load.

Additional details, such as touch screen displays suitable for implementing the aforementioned routines, as well as techniques for profiling packaging material, are described in the aforementioned '863 and '864 published applications referenced above.

Load Stability-Based Wrapping

As noted above, conventional control over the manner in which packaging material is wrapped around a load may be hampered in some instances due to the relatively complexity of the control inputs and the need for experienced operators. Despite manufacturer recommendations for setting up wrap parameters, a wrapping apparatus may nonetheless be set up incorrectly for the types of loads being wrapped, resulting in undesired film breaks, which lead to downtime and lost productivity, and/or insufficiently wrapped loads, which may later fail during transport, resulting in damaged loads.

These challenges may be particularly acute for machines that primarily monitor and control wrap force during wrap operations by controlling the feed or supply rate of a packaging material dispenser. As noted above, some stretch wrapping machines alter the supply of packaging material such that a relatively constant packaging material wrap force is maintained. With powered pre-stretching devices, changes in the force or tension of the dispensed packaging material are monitored, e.g., by using feedback mechanisms typically linked to spring loaded dancer bars, electronic load cells, or torque control devices. The changing force or tension of the packaging material caused by rotating a rectangular shaped load is transmitted back through the packaging material to some type of sensing device, that which attempts to vary the speed of the motor driven dispenser to minimize the change. In such designs, the geometry of the load may not be considered, and as such, the aforementioned techniques of monitoring the rotational position of the load and monitoring effective circumference, effective radius, film speed, load distance, film angle, etc. may not be performed.

Particularly with these designs, operators have conventionally been required to configure a stretch wrapping machine based primarily on "direct" control parameters, e.g., by inputting desired wrap force, desired carriage speed or inches of overlap, etc. In some embodiments consistent with one aspect of the invention, on the other hand, an "indirect" control parameter, e.g., based upon containment force, stability characteristics of a load, or other aspects of a wrapping operation that are not directly controllable (as is the case for direct control parameters such as wrap force, carriage speed, etc.) may be used to simplify control over wrap parameters and facilitate set up of a stretch wrapping machine. In this regard, wrapping is based at least in part on a non-force attribute (e.g., based on one or more load stability characteristics).

As such, the term indirect control parameter may be used herein to refer to various types of control inputs that do not generally correspond to physical control inputs on a wrapping machine, but that from which direct control parameters may be generated for controlling the wrapping machine. Examples of direct control parameters include parameters such as wrap force, tension, carriage speed, relative rotation speed, packaging material dispenser rate, etc., each of which may be directly controlled and/or monitored, e.g., via a closed-loop control of a dispenser drive, rotational drive, lift drive, etc. Indirect control parameters, on the other hand, include parameters such as load stability, axial load variability, load irregularity, degree of inboard, and other characteristics of a load that may ultimately impact a wrapping operation, and from which one or more direct control parameters may be derived for use in control over such a wrapping operation. In some embodiments, the indirect control parameters may be used to determine a load containment force requirement, with the determined load containment force requirement then used to determine one or more direct control parameters for use in controlling the wrapping machine when wrapping the load.

In some embodiments of the invention, for example, various load stability characteristics may be used to map different "stability types" of loads to different containment force requirements, such that an operator may be relieved of specifying a particular containment force requirement for a load as a numerical value, e.g., a particular containment force in pounds. Load stability characteristics, for example, may include one or more of load weight (e.g., an actual weight in lbs. or kg, or a relative weight such as light, medium or heavy), load stability (e.g., stable v. unstable), load contents (e.g., liquid materials, solid materials, powder materials, etc.), load height, load aspect ratio (i.e., how tall a load is relative to its length and/or width), frictional characteristics (i.e., how likely load contents will be able to slide around relative to one another, e.g., where stacked cardboard boxes are more likely to slide than stacked concrete blocks), etc.

Based upon one or more load stability characteristics, loads may be classified or categorized into one of a plurality of load stability types that are mapped to different containment forces. The mapping of load stability types to containment forces may be performed in a number of manners. For example, load stability types may be mapped to containment forces through a hierarchical definition of multiple load stability characteristics. In one embodiment discussed below, for example, a two level binary tree may categorize loads into one of four types based first on relative load weight (heavy v. light), and second based on relative stability (stable v. unstable), with each type mapped to a containment force or a range of containment forces. Thus, for example, in one embodiment a light, stable load may be mapped to 2-5 lbs of containment force, a light, unstable load may be mapped to 5-7 lbs of containment force, a heavy, stable load may be mapped to 7-12 lbs of containment force, and a heavy, unstable load may be mapped to 12-20 lbs of containment force.

Other manners of mapping load stability types to containment forces may be used. For example, clustering algorithms may be used to define clusters of loads based upon combinations of load stability characteristics, with each cluster assigned a containment force or range of containment forces. Mathematical relationships between load stability characteristics and containment force may be defined such that the contribution of each type of load stability characteristic may be quantified and may contribute to a recommended containment force for loads matching particular combinations of load stability characteristics. For example, weight may be determined to have a greater impact on stability than load contents, load height or load aspect ratio, and may thus be allocated a greater contribution to the recommended containment force.

Selection of a load stability type may also vary in different embodiments. For example, as will be discussed below, load stability types may be presented as alternatives representing "buckets," e.g., so that an operator may select between "light stable," "light unstable," "heavy stable," and "heavy unstable" load stability types. In other embodiments, however, an operator may be permitted to select between individual load stability characteristics, e.g., to select, either sequentially (e.g., in a "wizard" fashion), or collectively (e.g., via checkboxes) between multiple load stability characteristics (e.g., heavy v. light, stable v. unstable, liquid v. powder v. solid, tall v. short load, etc.)

Selection of a load stability type, within the context of the present disclosure, may represent a non-force, indirect control parameter selection by an operator from which a containment force requirement may be derived to control a wrapping operation. As such, an operator may, in some embodiments, be able to configure a stretch wrapping machine to wrap a load without having to specify a numerical value for a containment force and/or wrap force.

Furthermore, while the techniques disclosed herein may be used in connection with the various types of wrapping apparatus discussed above in connection with FIGS. 1-4, it will be appreciated that such techniques may be used in connection with other types of wrapping apparatus, and in particular, a wrapping apparatus that is based at least in part on monitoring wrap force or tension in a web, as well as a wrapping apparatus that omits one or more of the sensors/encoders disclosed above in connection with FIGS. 1-4, e.g., sensors that provide feedback of the rotational position of the load, film speed, load distance, load dimensions, film angle, as well as a wrapping apparatus that does not rely on load geometry, effective circumference, etc. Therefore, the invention is not limited to the particular wrapping apparatus implementations discussed herein.

In addition, a mapping may be represented in a number of manners consistent with the invention. In some embodiments, a mapping may be represented by a data structure such as a database, library, table or other data store that represents relationships between mapped entities. In some embodiments, a mapping may be represented by a function, equation or algorithm that returns one or more entities that are mapped to a particular entity in question (e.g., to return a load containment force requirement mapped to a selected load stability type). The manner in which a mapping is represented in a controller may therefore vary without departing from the spirit and scope of the invention.

Figure 13:
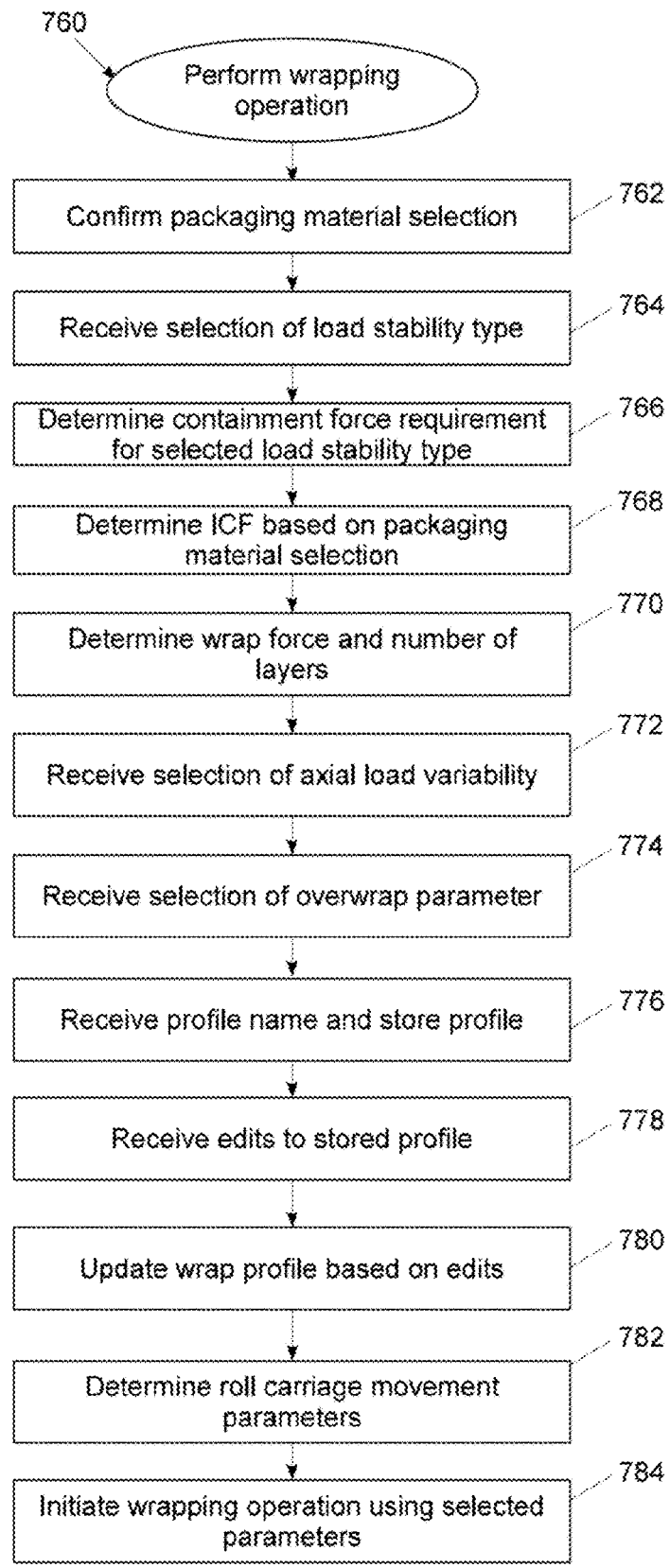
FIG. 13 is a flowchart illustrating a sequence of steps in an example routine for configuring a wrap profile and performing a wrapping operation using load stability-based control in the control system of FIG. 8.

Now turning to FIG. 13, and with further reference to FIGS. 14-31, FIG. 13 illustrates a routine 760 for performing a wrapping operation consistent with some embodiments of the invention, while FIGS. 14-31 illustrate a number of example touch screen displays that may be presented to an operator in connection with performing routine 760.

Figure 14:
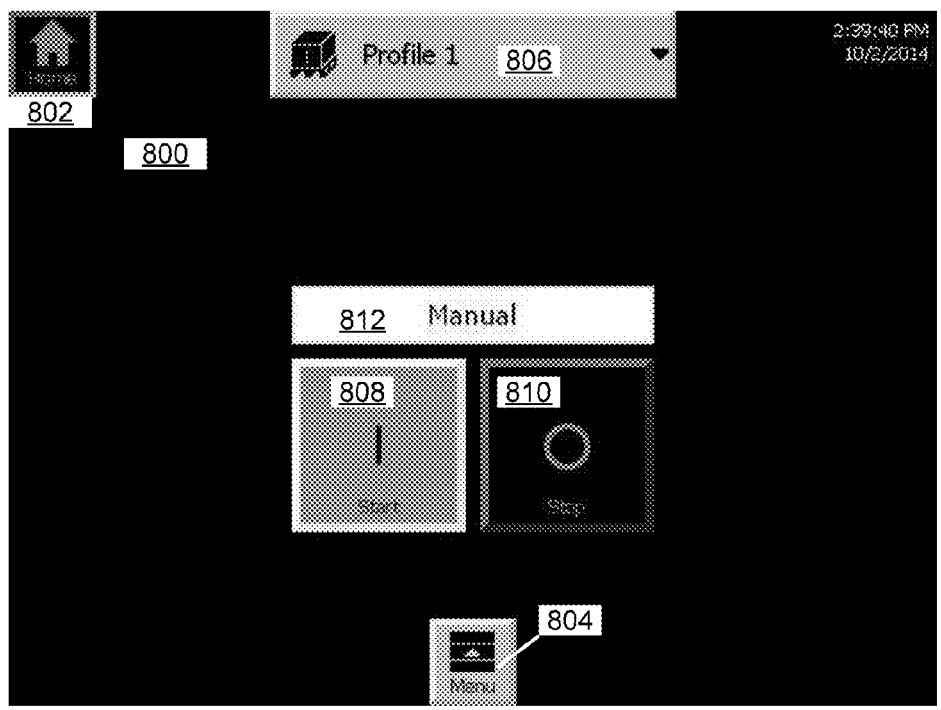
FIGS. 14-53 are block diagrams of example displays capable of being displayed by the control system of FIG. 8 when interacting with an operator.

FIG. 14, for example, illustrates an example computer-generated display 800 that may be displayed to an operator during normal operation of a wrapping apparatus. A home button 802 is displayed to return to display 800 at any point, while a menu button 804 provides access to various operations discussed below. A profile button 806 is used to select or create a profile button, and buttons 808 and 810 are respectively used to start and stop a wrap operation. Button 812 provides access to a manual screen for initiating a manual wrap operation. In display 800, it is assumed that a wrap profile has been selected, with the name of the current wrap profile ("profile 1") displayed on the face of button 806.

Figure 15:
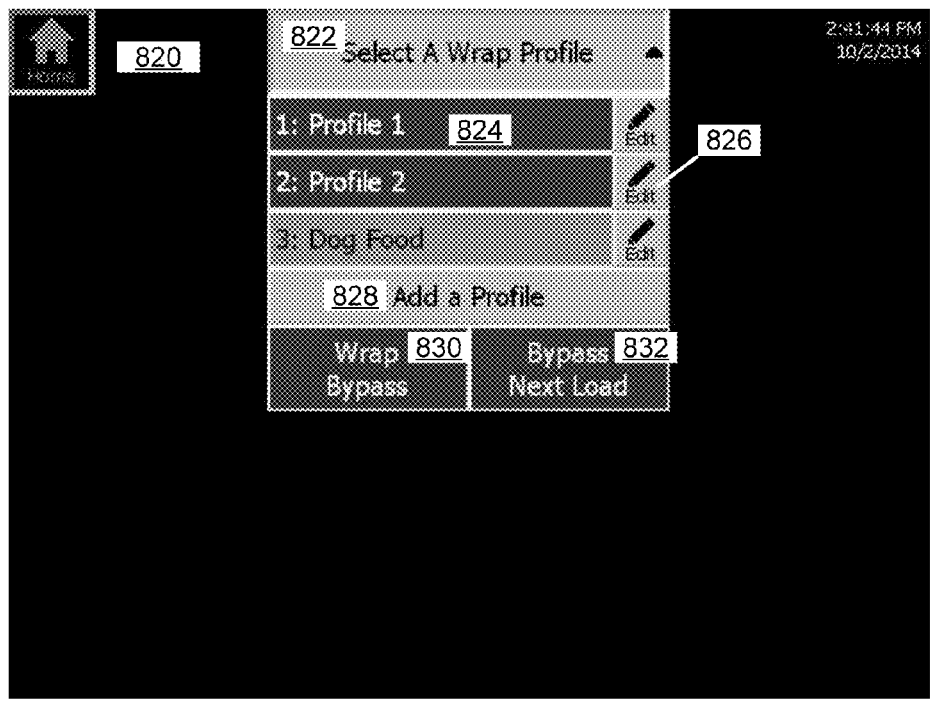
Figure 16:
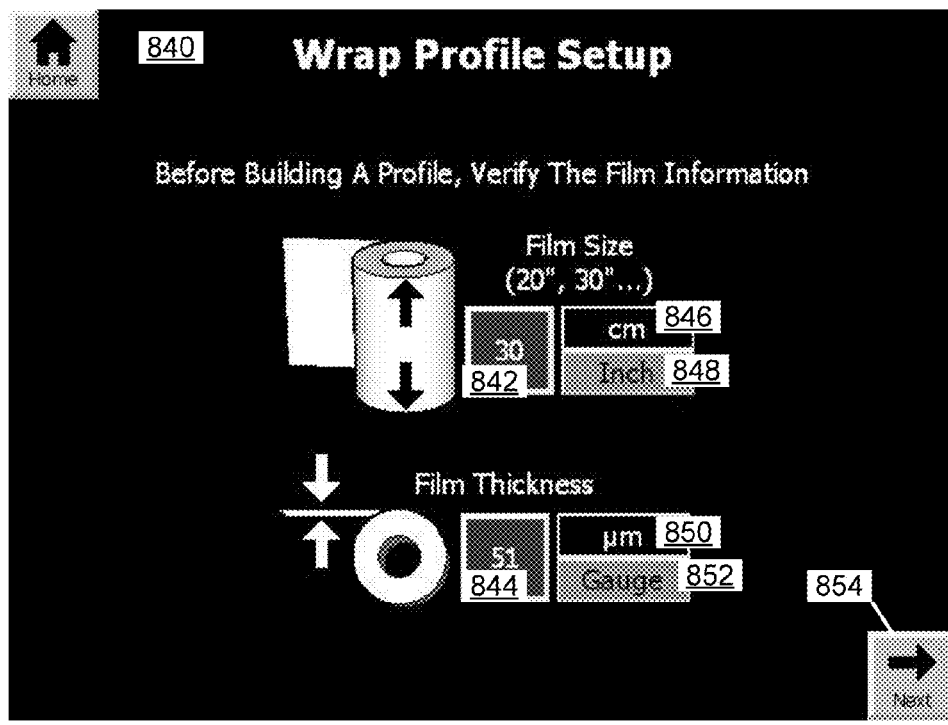

Assuming that an operator wishes to modify the setup of the wrapping apparatus, the operator may select button 806 and be presented with a wrap profile setup display 820 as shown in FIG. 15. In this display, an operator may select an existing wrap profile via selection of a line 824, and may edit an existing wrap profile via selection of an edit button 826. In addition, an operator may add a new wrap profile by selecting button 828. Additional buttons 830, 832 are respectively provided to permit a wrap bypass and a next load bypass.

Returning to routine 760, and with continued reference to FIG. 15, it will be assumed for the purposes of this example that an operator wishes to create a new wrap profile in connection with performing a wrap operation in routine 760. As such, the operator may select button 828 of display 820 (FIG. 15) to initiate a wrap profile creation operation.

First, in block 762 of FIG. 13, prior to creating a wrap profile, a check may be performed to confirm that the current packaging material selection is still appropriate for the new wrap profile, e.g., that the current packaging material installed on the stretch wrapping apparatus has not changed. As illustrated by display 840 of FIG. 16, for example, an operator may be presented with the last packaging material information input to the apparatus, including a packaging material width 842 and a packaging material thickness 844. Selection of either the packaging material width 842 or packaging material thickness 844 may be bring up a keypad to enter a new value, and units may be changed through selection of cm/inch buttons 846, 848 and micron/gauge buttons 850, 852, with automatic conversion of the current values 842, 844 performed whenever the associated units are changed.

Figure 17:
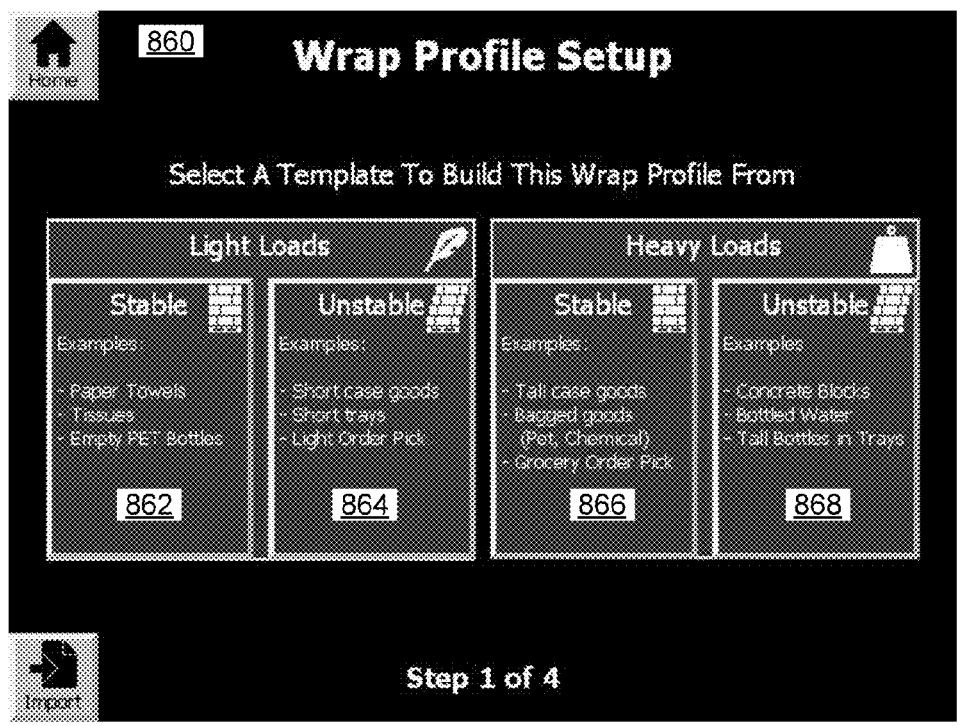

Once the packaging material attributes are confirmed or updated, selection of next button 854 transitions routine 760 (FIG. 13) to block 764 to receive an operator selection of a load stability type for the load. As illustrated by display 860 of FIG. 17, an operator may be presented with four buttons 862-868 that are respectively associated with light/heavy loads, and under each of light and heavy loads, stable and unstable loads. As such, an operator is permitted to select, via a non-force, indirect control parameter selection, a load stability type that characterizes the overall stability of the load, and from which a load containment force requirement (and ultimately a wrap force) may be determined. Further, it may be desirable in some embodiments to display examples of types of loads that are expected to fall within the ranges represented by the respective buttons, as well as to arrange the buttons hierarchically as illustrated in FIG. 17.

Each of the four buttons 862-868 may be associated with a particular containment force or range of containment forces, and as such, an operator's selection of a load stability type effectively selects a containment force requirement for the load without requiring the operator provide a numerical input of a specific value for the containment force.

Figure 37:
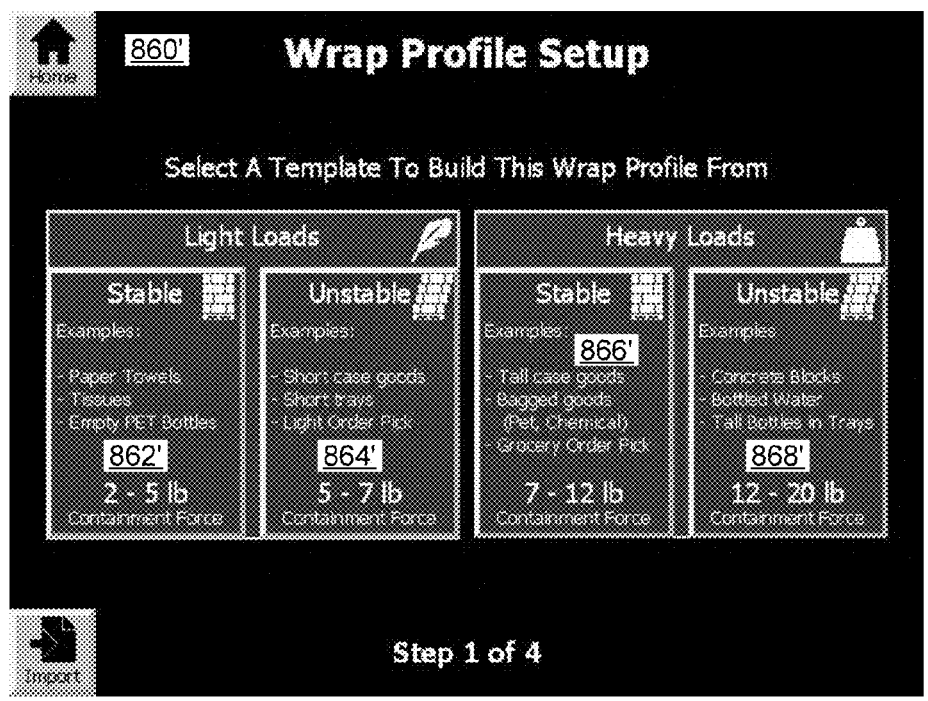

It will be appreciated that in some embodiments, even though a numerical input of a specific value for the containment force is not made by an operator when configuring a wrap profile, it may nonetheless be desirable to provide an operator with an indication of the containment force or range of containment forces mapped to a particular load stability type. FIG. 37, for example, illustrates a display 860' having buttons 862'-868' that respectively correspond to buttons 862-868 of display 860 of FIG. 17, but additionally displaying a containment force range mapped to the respective load stability type. Despite the display of a containment force range, however, operator selection is still of a load stability type in this embodiment.

Returning to FIG. 13, upon selection of a load stability type in block 764, a containment force requirement for the load stability type may be determined in block 766, an incremental containment force (ICF) may be determined based on the current width and thickness of the packaging material in block 768 and the wrap force and number of layers for achieving the desired containment force requirement may be determined in block 770.

In one embodiment, for example, the load containment force requirement may be determined by accessing a containment force parameter associated with a selected load stability type. In another embodiment, the load containment force requirement may be determined by selecting a value (e.g., a mean value) in a range associated with a selected load stability type.

Determination of an ICF may be made based on current packaging material width and thickness in any of the manners discussed above or in the cross-referenced applications, e.g., based on a table or a function that maps ICF to packaging material attributes. In some embodiments, an ICF function may be linear, and based on an ICF value at a predetermined wrap force (e.g., 100% payout) and a slope. Alternatively, a more complex ICF function may be defined, e.g., based on an s-curve, interpolation, piecewise linear, exponential, multi-order polynomial, logarithmic, moving average, power, or other regression or curve fitting technique.

In some embodiments, an ICF function may be defined for each load stability type based on a default packaging material thickness and a slope that varies the ICF for different thicknesses, such that an ICF value may be determined based upon the thickness specified in block 762.

Determination of wrap force and number of layers may also be performed in any of the manners discussed above or in the cross-referenced applications, based in part on the load containment force requirement and the ICF determined for the current packaging material. For example, it may be desirable to associate a default number of layers for a given load stability type and adjust wrap force to meet the desired containment force requirement using the determined ICF. Limits (e.g., maximum allowable wrap force) may be checked once a wrap force is calculated, and one or more layers may be added or removed as is desired to obtain an acceptable wrap force.

In addition, in some embodiments, each load stability type may have a default number of layers and wrap force, as well as a default packaging material thickness that, when combined with the default number of layers and wrap force, is anticipated to meet a load containment force requirement for loads of that load stability type. Then, the layers/wrap force may be adjusted for the actual thickness of the packaging material that the wrap profile is being set up for, e.g., by adjusting wrap force first, and modifying the default layers only when no acceptable wrap force can be established for that containment force requirement and packaging material thickness.

Upon completion of block 770 of FIG. 13, a wrap profile is generally sufficiently configured for a majority of applications. In the illustrated embodiment, however, two additional parameters may be specified in a wrap profile to address additional applications. In particular, block 772 may receive a selection of axial load variability and block 774 may receive a selection of an overwrap parameter.

Figure 18:
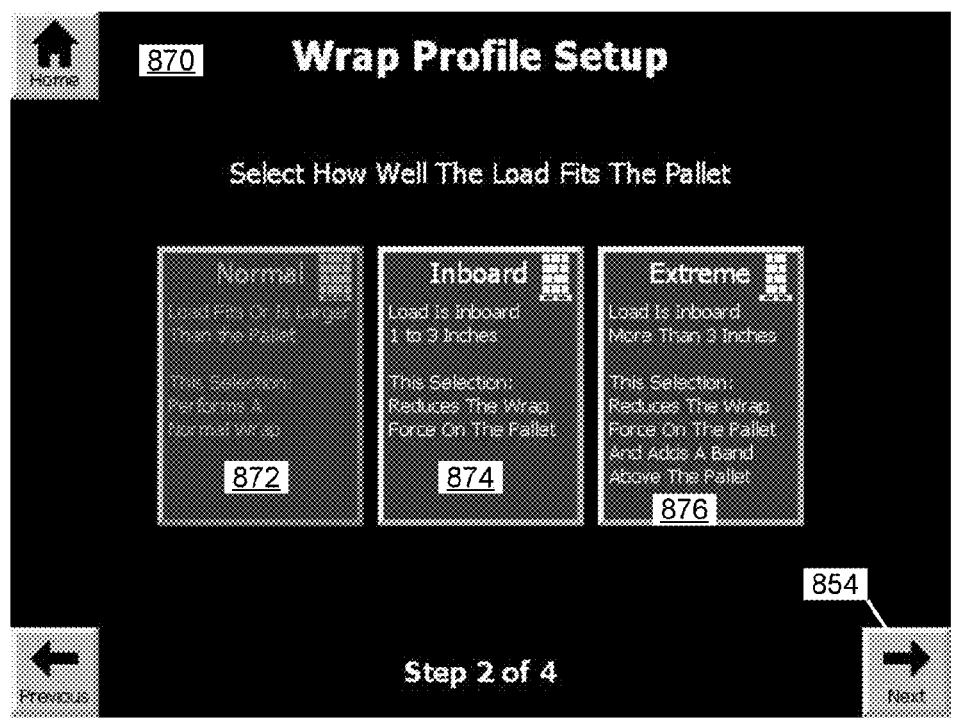

FIG. 18, for example, illustrates a display 870 suitable for receiving an axial load variability selection using three buttons 872-876. Axial load variability, in this regard, may refer to variability in a load generally along the axis of rotation of the packaging material dispenser relative to the load. For many applications where the axis of rotation is generally vertical, the axial load variability will generally refer to the variability in girth in a vertical direction (i.e., the height dimension).

One particular type of axial load variability, for example, refers to the size of a load relative to a pallet. For a load that is the same size or larger than a pallet, button 872 may be selected, while depending on how far inboard a load is relative to a pallet, button 874 or button 876 may be selected. In one embodiment, button 874 may correspond to a load that is 1-3 inches inboard, while button 876 may correspond to a load that is more than 3 inches inboard. It will be appreciated that when a load is inboard to a pallet, the girth of the pallet is larger than that of the load, so a wrap around the pallet may have a higher risk of tearing the packaging material at the corners of the pallet due to the higher wrap force encountered at those corners. As such, it may be desirable to reduce the wrap force when wrapping around the pallet and/or increase the number of layers around or near the pallet to account for the different girths of the pallet and the load.

For example, it may be desirable for a moderately inboard load (corresponding to button 874) to reduce the wrap force by a fixed amount (e.g., about 5% of payout percentage), and for an extremely inboard load (corresponding to button 876) to reduce the wrap force by the same or additional amount, coupled with applying an additional band of packaging material around the load just above the pallet (and generally at the originally-determined wrap force). Thus, in this embodiment, a wrap profile may specify either how far inboard a load is on a pallet (e.g., none, moderate or extreme) or to specify what, if any actions are to be taken to account for an inboard load (reduced wrap force and/or additional banding).

Figure 19:
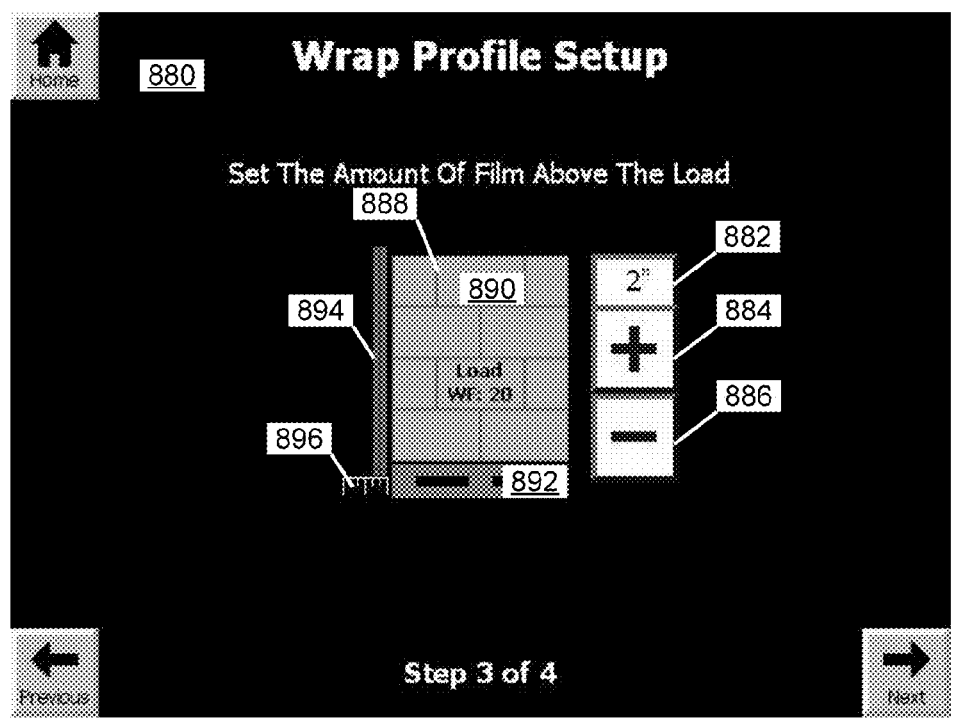
Figure 20:
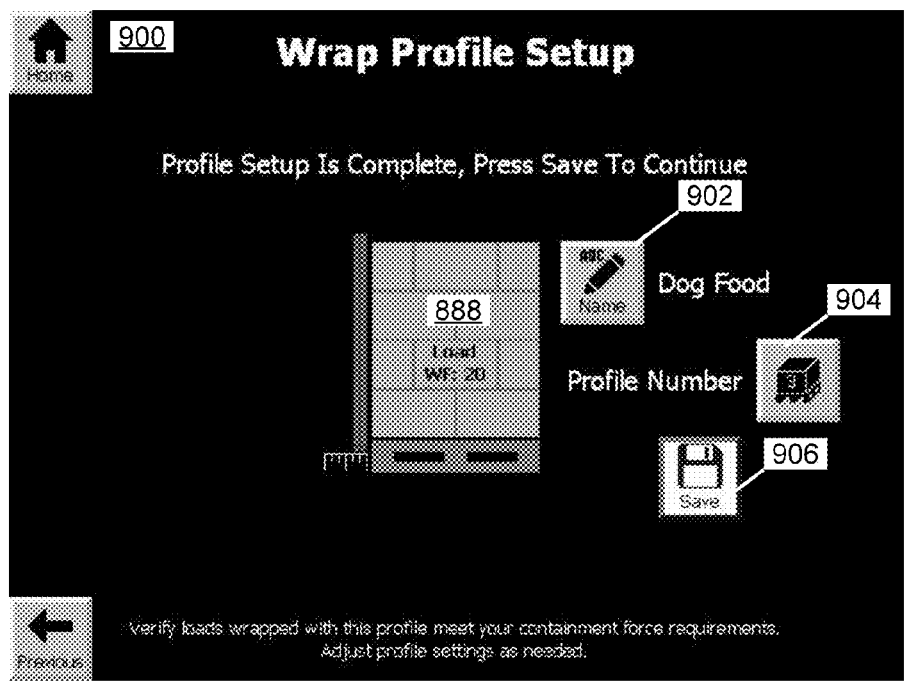

FIG. 19 illustrates a display 880 that may be used to receive an overwrap parameter, representing the distance above the top of a load to apply packaging material (e.g., to assist in retaining a top sheet). A current overwrap parameter (e.g., in inches) may be displayed at 882, with buttons 884, 886 used to increase or decrease the parameter. A graphical depiction 888 of the wrap profile may also be displayed, illustrating a load 890 supported by a pallet 892 and with the number of layers of packaging material to be dispensed graphically represented at 894 by a number of parallel, vertical bars corresponding to the number of layers. A scale 896 may also be displayed to facilitate a recognition of the number of layers being applied. In response to changing the overwrap parameter, the length of the vertical bars may be modified to represent the amount of overwrap to be applied. In some embodiments, a scale similar to scale 896 (not shown in FIG. 19) may additionally be displayed to represent the amount of the overwrap to be applied. In addition, the color or shading applied to the graphical depiction of the load 890 may be used to visually depict the wrap force to be applied to the load (discussed in greater detail below, for example, in connection with FIG. 22).

Returning to FIG. 13, once an overwrap parameter is selected, control passes to block 776 to receive a name for the wrap profile and store the wrap profile. For example, a display such as display 900 of FIG. 20 may be presented to an operator, including the aforementioned graphical depiction 888 of the wrap profile. A button 902 may be provided to enter a profile name, and a button 904 may be provided to edit a profile number. Selection of save button 906 may store the wrap profile, as well as select the stored wrap profile as the current wrap profile for the stretch wrapping apparatus.

Figure 21:
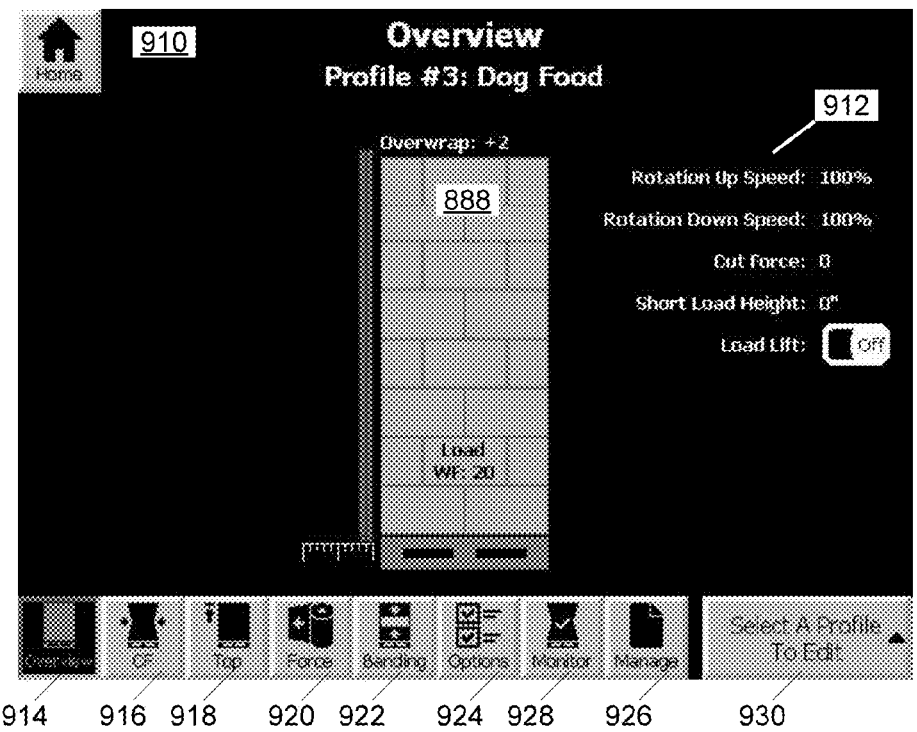

Now turning to FIG. 21, saving a wrap profile may transition to an overview display 910 from which a wrap profile may be displayed and modified. In the illustrated embodiment, a graphical depiction 888 of the wrap profile is used to graphically represent the manner in which a load will be wrapped using the wrap profile, including the number of layers, the wrap force and overwrap used (e.g., including via graphical and/or text overlays), and additional parameters 912 (e.g., rotation up/down speed, cut force, short load height and load lift).

In addition, a series of buttons (e.g., an overview button 914, containment force button 916, overwrap button 918, wrap force button 920, banding button 922, options button 924, manage button 926 and monitor button 928) may be used to customize the wrap profile in a number of manners, while a button 930 may be provided to enable an operator to select another profile for editing. Thus, returning to FIG. 13, various edits may be made to a profile in block 778, with the wrap profile updated based upon those edits in block 780. Then, once a wrap profile is configured as desired by an operator, roll carriage movement parameters may be determined for the wrap profile based upon the current settings for the profile (block 782) and a wrapping operation may be initiated using those settings (block 784).

Figure 22:
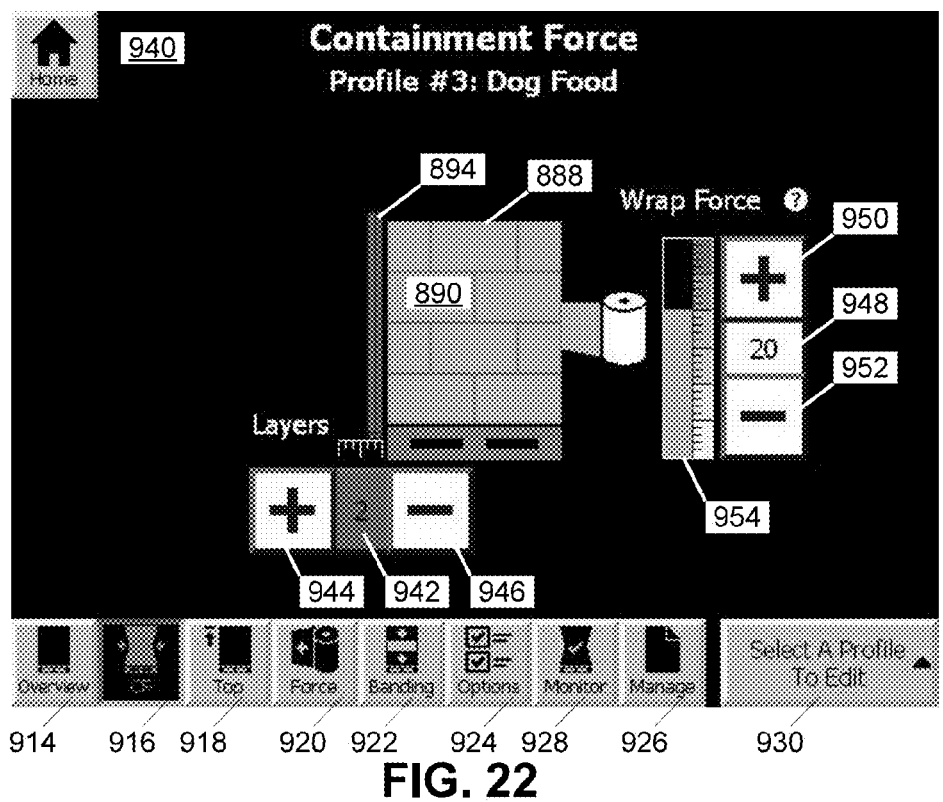

For example, as illustrated in FIG. 22, selection of button 916 may transition to display 940, from which a number of layers may be displayed at 942 and modified using buttons 944, 946, and from which a wrap force may be displayed at 948 and modified using buttons 950, 952. Updates to the number of layers may be reflected at 894 in graphical depiction 888, while updates to the wrap force may be represented by varying a display characteristic of load 890, e.g., by changing a color, a shading, a pattern, or other characteristic. In the illustrated embodiment, a legend 954 illustrates the current selected wrap force and different values of the display characteristic corresponding to different wrap forces (e.g., where darker shading represents higher wrap forces).

FIG. 22 therefore illustrates in part a graphical interface that may be used to facilitate operator interaction with a load wrapping apparatus, particularly in connection with setting up a wrap profile. The graphical interface includes graphical depiction 888 representing the wrap profile, which includes a graphical depiction of load 890 and as well as graphical depictions of one or more attributes or parameters of the wrap profile. In this embodiment, for example, the number of layers of packaging material to be applied by the wrap profile is displayed graphically in graphical depiction 888 as illustrated at 894, while the wrap force to be applied by the wrap profile is displayed graphically in graphical depiction 888 through control over the color, shading, pattern or other display characteristic of load 890. Furthermore, responsive to operator interaction with buttons 944, 946, 950 and 952, the graphical depiction may be updated dynamically in connection with updates to the wrap profile. Additional changes to the wrap profile, e.g., in terms of modifying top/bottom wrap force, adding bands, modifying overwrap, etc., may also be displayed graphically in graphical depiction 888, as will be more apparent below.

A graphical depiction as referred to herein may be considered to incorporate a pictorial or iconic representation of at least a portion of a load and of one or more wrap profile attributes or parameters using non-alphanumeric information, to thereby enable an operator to visually comprehend how a wrap profile will wrap a load. While textual and/or numerical information may also be presented along with a graphical depiction in some embodiments, a graphical depiction in the least visually conveys, in a non-alphanumeric fashion, at least one parameter or attribute of a wrap profile as it applies to a representative load.

Figure 23:
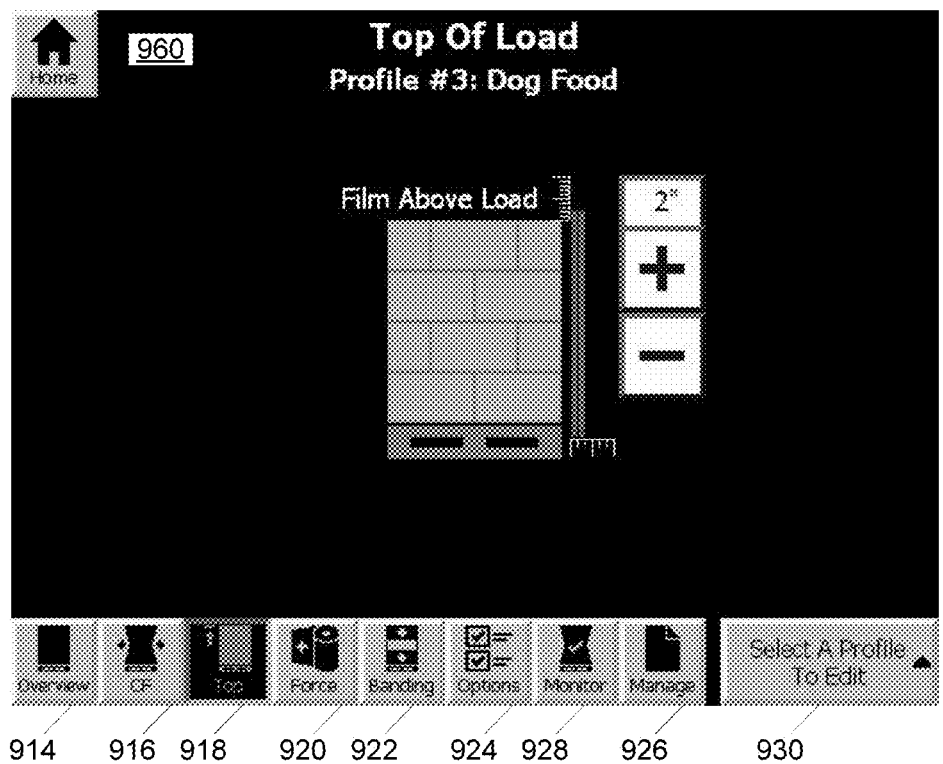

Now turning to FIG. 23, selection of button 918 may transition to display 960, from which the overwrap parameter may be modified, in a similar manner to display 880 of FIG. 19.

Figure 24:
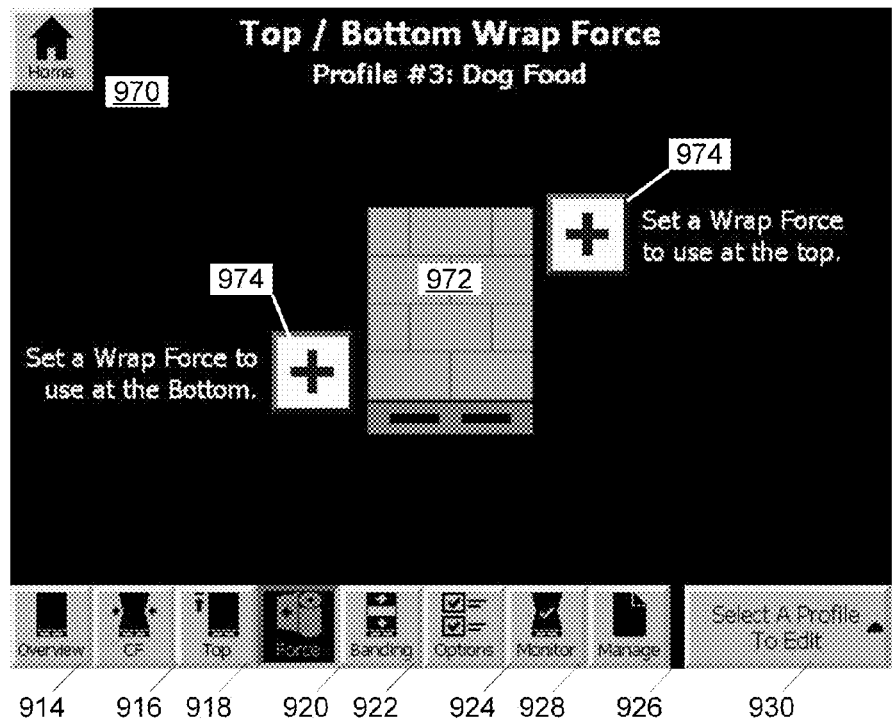

Next, as illustrated in FIG. 24, selection of button 920 may transition to display 970, from which top and/or bottom wrap force may be customized. A graphical depiction 972 may be provided of a load, along with buttons 974 enabling top and/or bottom wrap forces to be specified.

Figure 25:
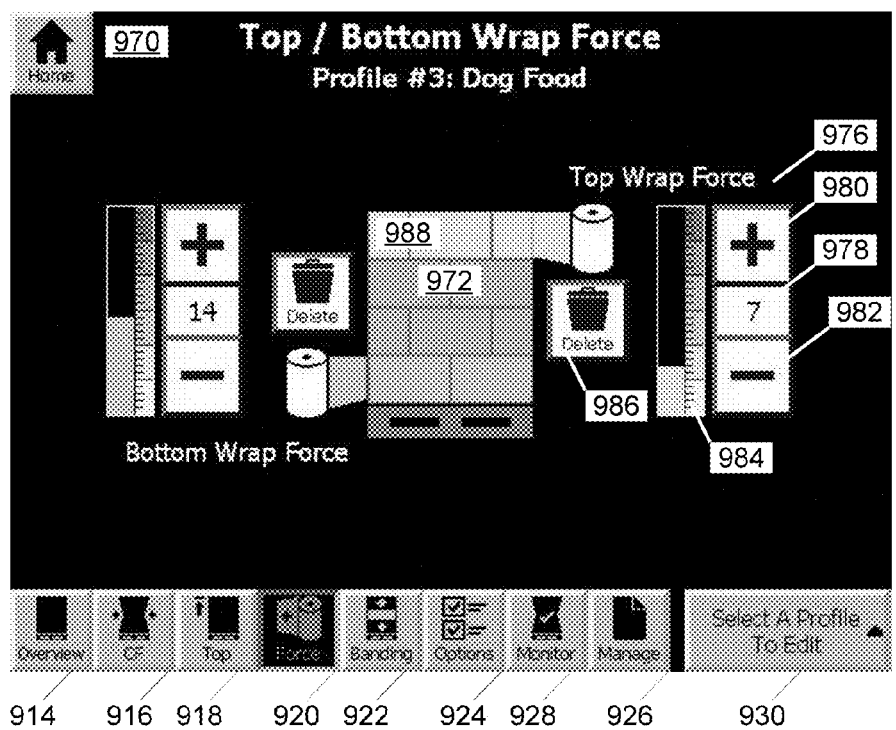

FIG. 25 illustrates display 970 after custom wrap forces have been specified for top and bottom. Selection of a button 974 (FIG. 24) displays a control 976 similar to that used in display 940 for overall wrap force, including a numerical display 978, buttons 980, 982 and legend 984. In addition, a delete button 986 is provided should it be desirable to remove a custom top/bottom wrap force. Moreover, as illustrated at 988, whenever the wrap force at the top or bottom of the load is modified, the display characteristic (e.g., shading) of the load is accordingly modified at the top and/or bottom of the load to visually represent the modified wrap force in those portions of the load.

Figure 26:
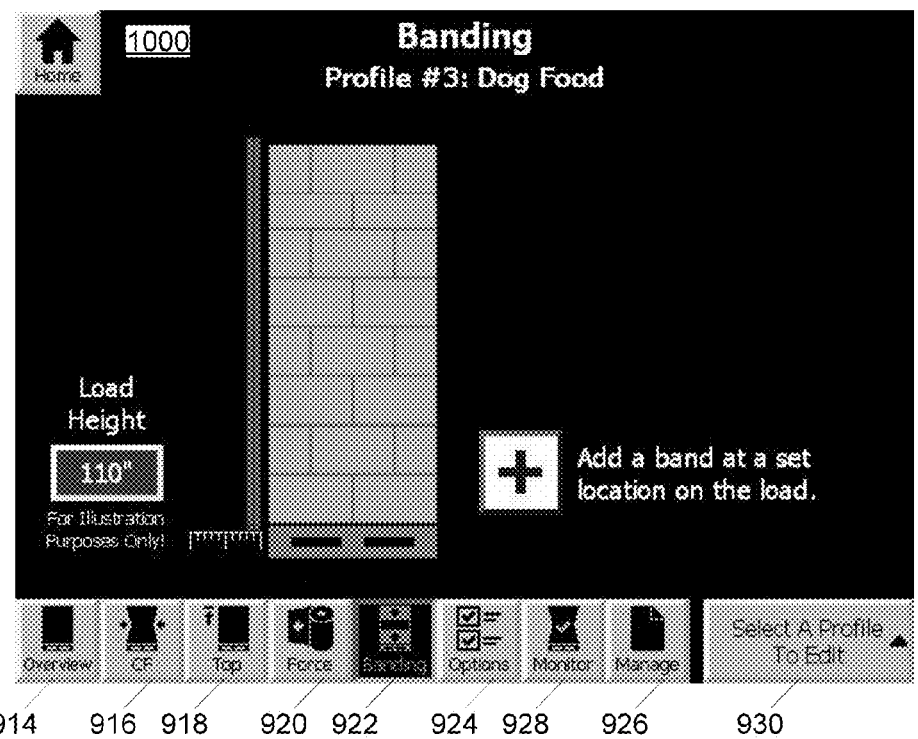

As illustrated in FIG. 26, selection of button 922 may transition to display 1000, from which one or more bands may be added to a wrap profile at various positions along the axis of rotation, e.g., at various elevations relative to a height of a load when a load is wrapped around a vertical axis of rotation. A graphical depiction 1002 of the wrap profile is displayed, including the number of layers 1004 (including scale 1006), represented by a number of parallel bars extending substantially along the entire height of the load (and extended, as appropriate, based upon the overwrap parameter. A representative load height may also be displayed at 1008, and a button 1010 is provided to add a band to the wrap profile.

Figure 27:
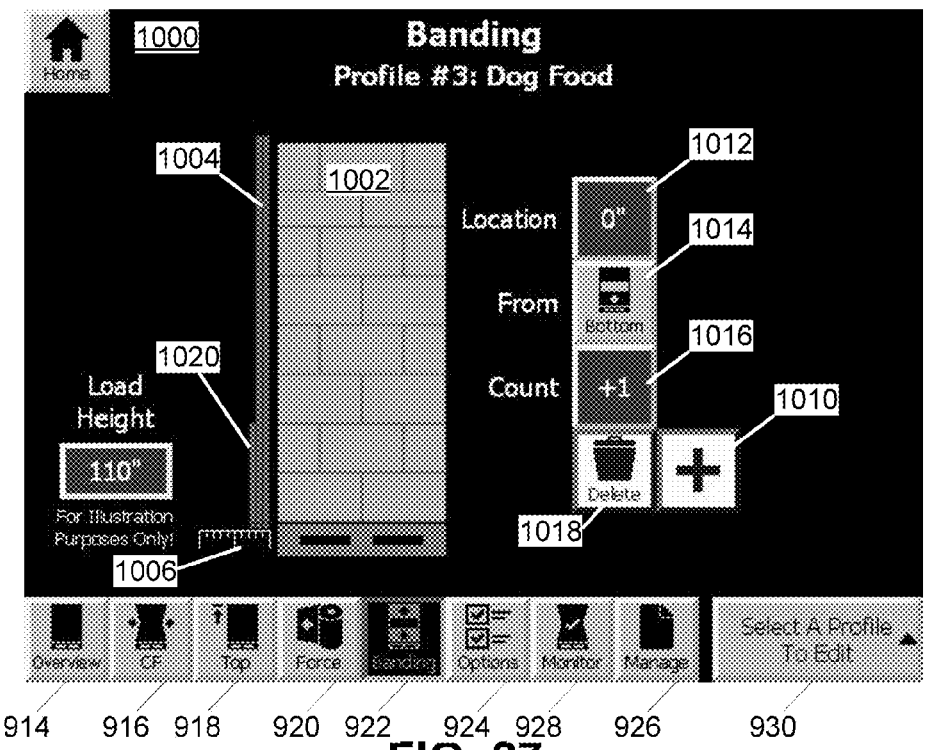
Figure 28:
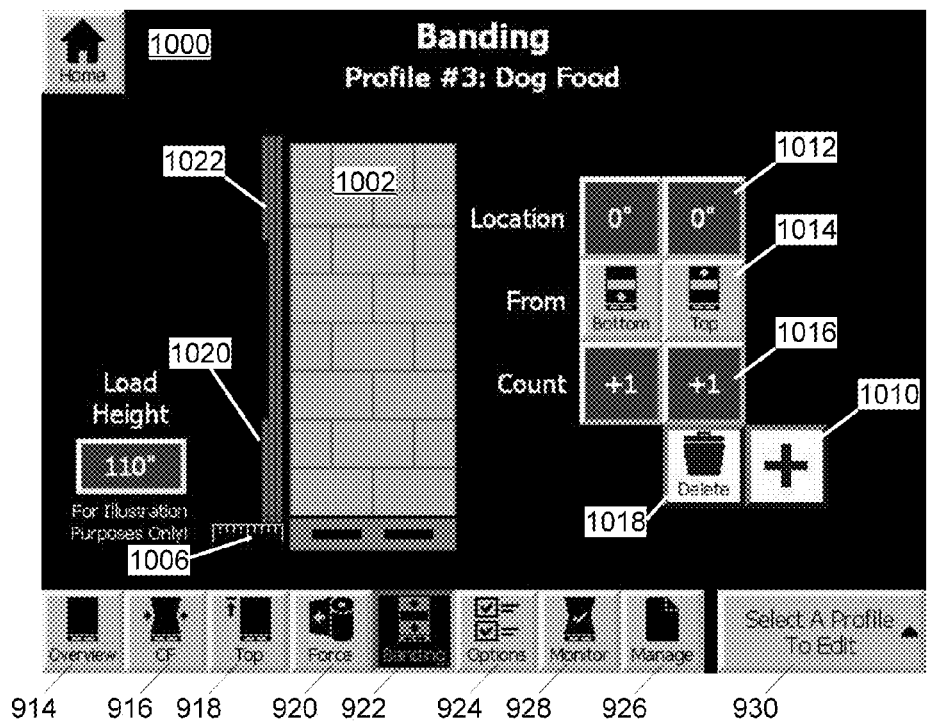
Figure 29:
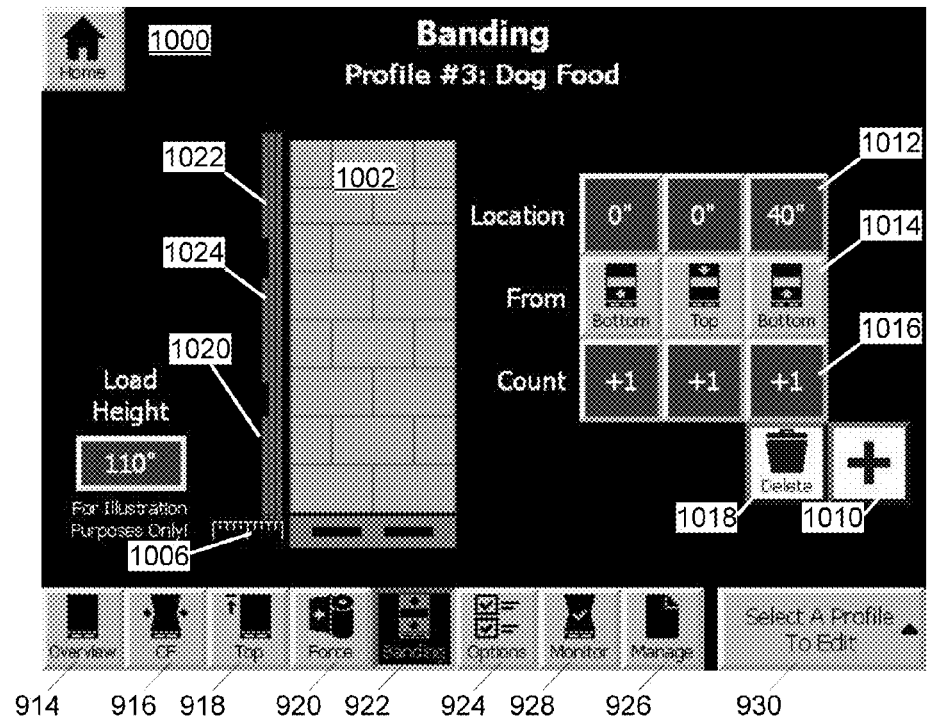

As shown in FIG. 27, upon selection of button 1010, a set of controls 1012-1018 is added to display 1000, including a location control 1012 (to add a location offset from the top/bottom of the load), a top/bottom toggle button 1014 (to toggle between a top or bottom location for the band), a count control 1016 (to specify the number of layers in the band) and a delete button 1018 (to remove the band). As shown in this figure, a band has been added with an offset of 0" from the bottom of the load and with one layer in the band, which is represented graphically at its relative elevation as shown at 1020, adjacent to the parallel bars representing the number of layers of packaging material specified by the wrap profile. FIGS. 28 and 29 additionally illustrate the addition of two other bands, a first, represented at 1022 of FIG. 28, located relative to the top of the load with a 0" offset and one layer, and a second, represented at 1024 of FIG. 29, located relative to the bottom of the load, with a 40" offset and one layer.

Figure 30:
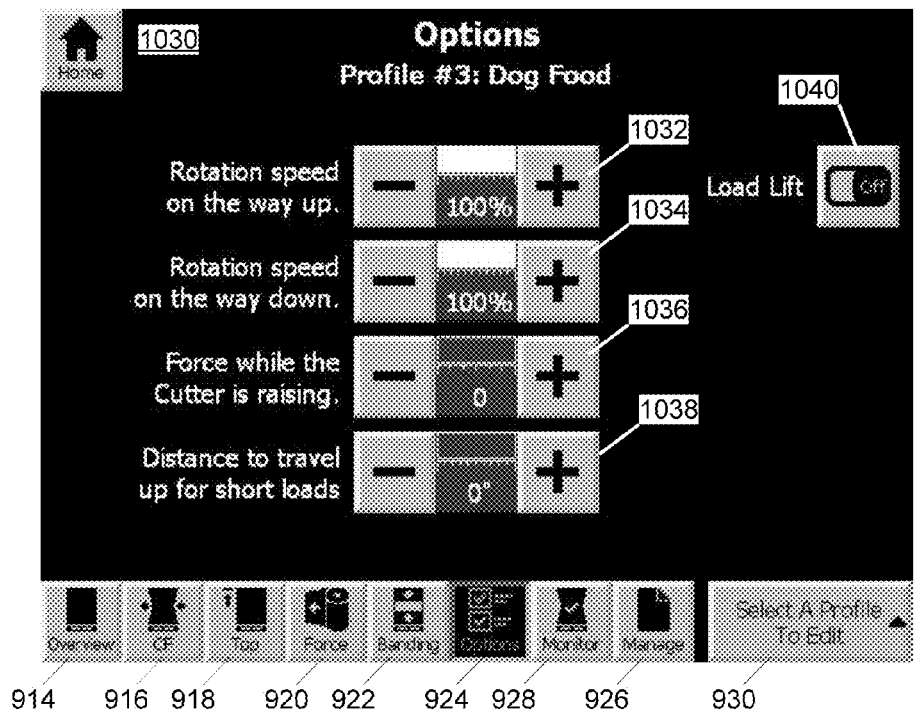

As illustrated in FIG. 30, selection of button 924 may transition to display 1030, from which various additional options may be configured. For example, controls 1032-1040 may be used to configure rotation speed on the way up and down (in % of maximum speed), force while cutter is raising, distance to travel for short loads (i.e., loads that are below a height sensor), and load lift enablement. Other options may also be configured in other embodiments.

Figure 31:
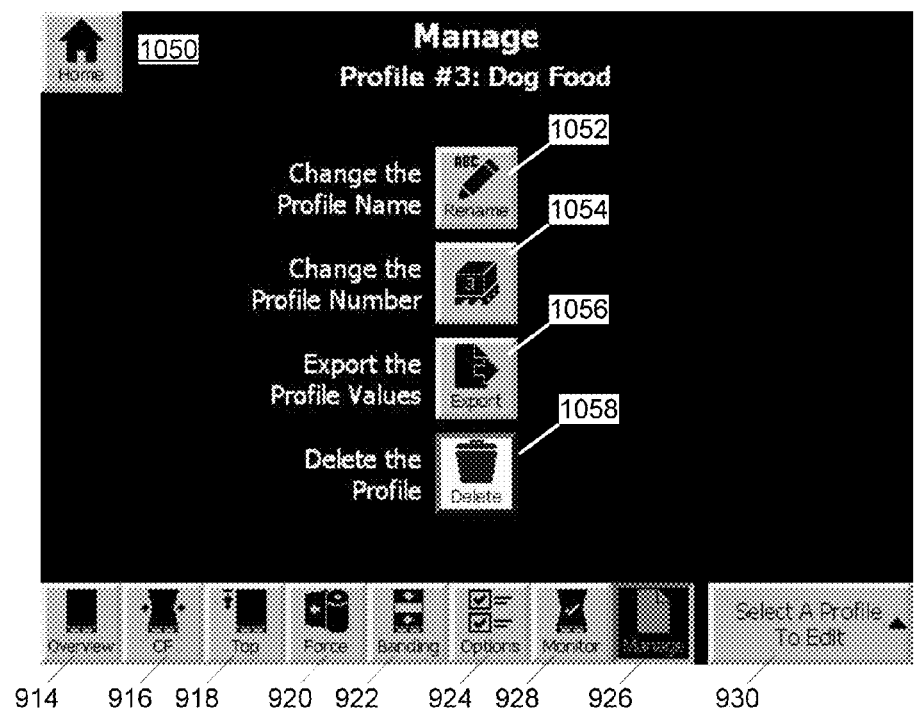

As illustrated in FIG. 31, selection of button 926 may transition to display 1050, from which various profile managing operations may be performed. Button 1052 enables the profile name to be changed, while button 1054 enables the profile number of be changed. Button 1056 enables profile values to be exported, and button 1058 enables a profile to be deleted. Additional options may also be presented to an operator, e.g., a button to duplicate or make a copy of the profile and/or a button to create or edit a password to protect the profile from viewing and/or editing. Additional management operations may also be supported in other embodiments.

As illustrated in FIGS. 32-35, it may also be desirable to incorporate containment force monitoring in some embodiments of the invention. Containment force monitoring, in this regard, may be used to protect against modifications being made to a wrap profile that could potentially result in a containment force that does not meet a desired containment force criteria. Containment force monitoring may be particularly useful in applications where wrap force is fixed and thus not actively monitored. In some embodiments, in particular, control over wrap force and number of layers (e.g., as discussed above in connection with display 940 of FIG. 22) may not be linked, so an operator may be able to modify either of these parameters without causing the other parameter to be updated to maintain a similar containment force. Containment force monitoring therefore may be used to identify when a wrap profile will potentially not meet a desired containment force criteria. In other embodiments, wrap force and/or containment force may be actively monitored during wrapping operations, such that an operator may be notified when a desired containment force criteria is not being met during a particular wrapping operation.

Figure 32:
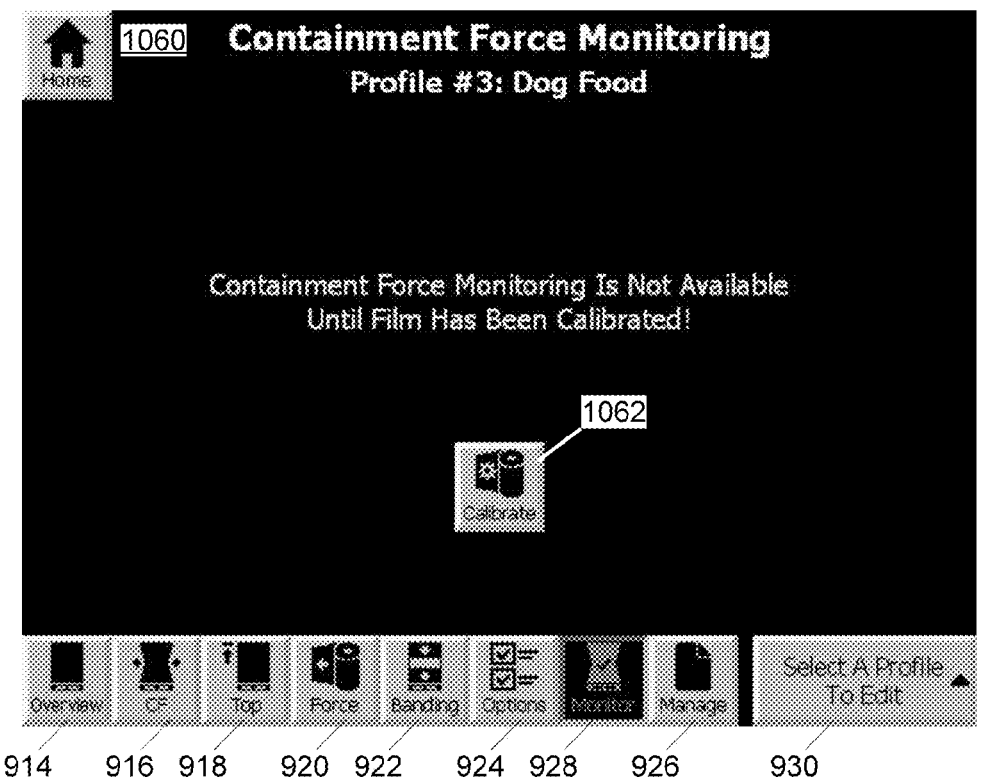
Figure 33:
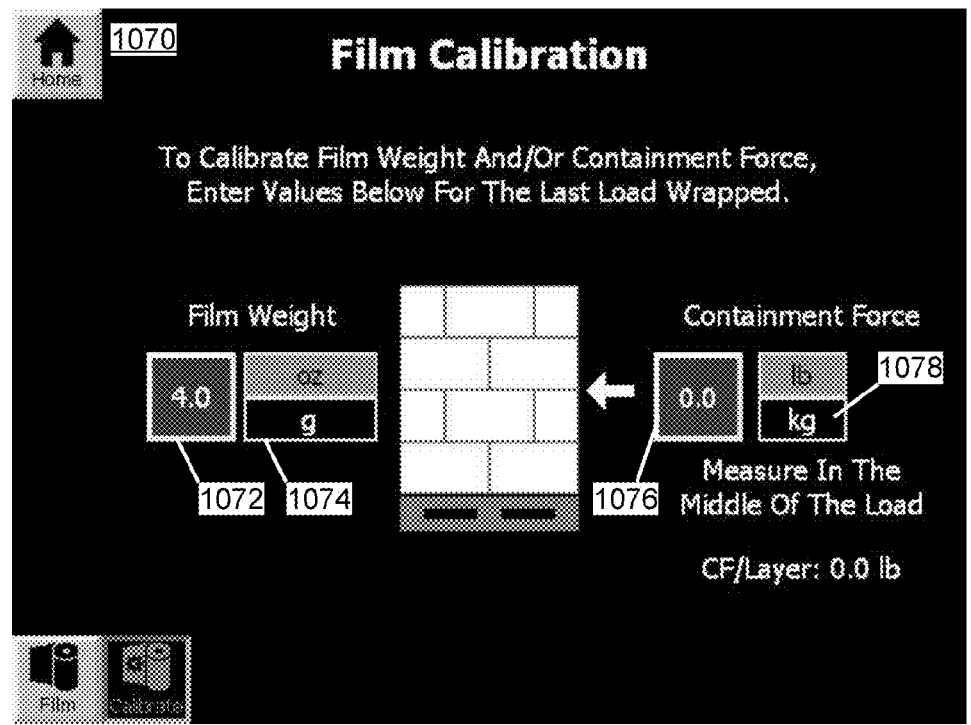

As illustrated in FIG. 32, upon selection of button 928, it may be desirable to first check whether the current packaging material has been calibrated. If not a display similar to display 1060 may be presented, warning the operator of the need to calibrate the packaging material, and providing a button 1062 to initiate a calibration. Selection of button 1062 then transitions to display 1070 of FIG. 33, where an operator is requested to input both the film weight using control 1072 (with units selected at 1074 from ounces or grams) and the actual containment force using control 1076 (with units selected at 1078 from pounds or kilograms). The values are taken from the last load wrapped with the wrap profile. The film weight is obtained by physically removing the packaging material from the load after the wrapping operation and weighing it, and the containment force is obtained by measuring the actual containment force on the load prior to removing the packaging material (e.g., in the middle of the load along one side, and using the containment force measuring device of U.S. Pat. No. 7,707,901). From these values, an incremental containment force (ICF) or containment force/layer may be computed in the manner disclosed above.

Figure 34:
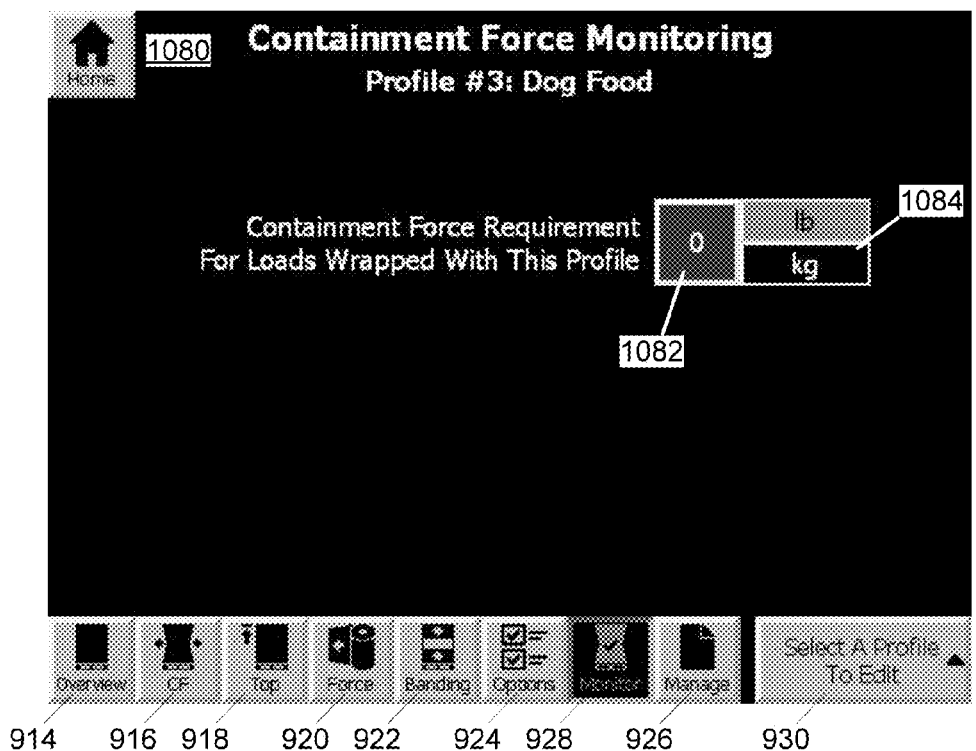
Figure 35:
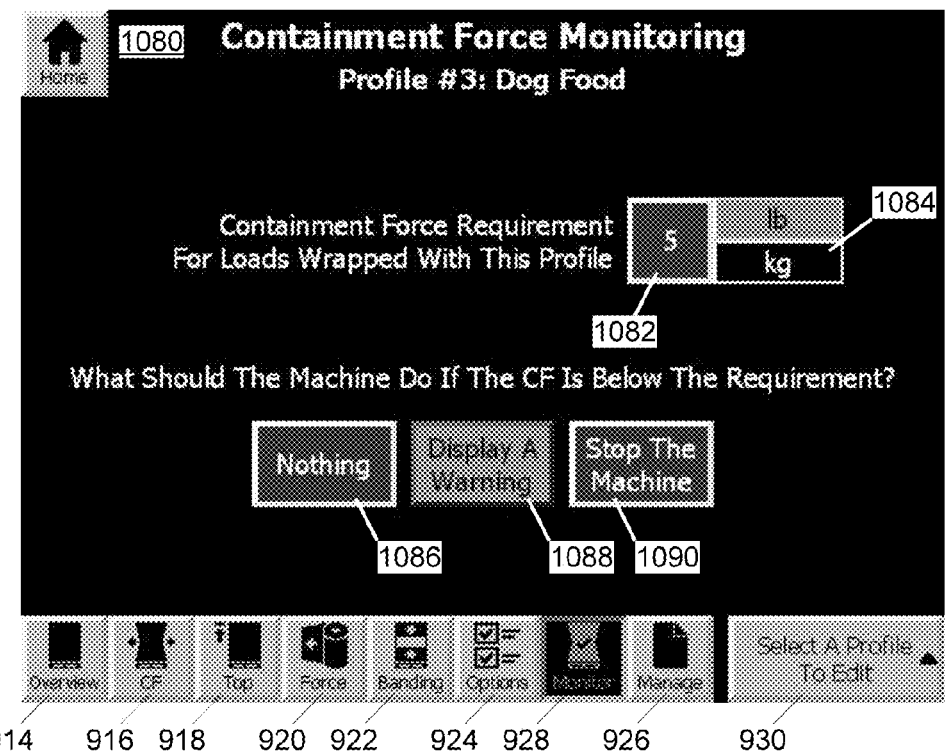

Once the packaging material has been calibrated, or if the packaging material was already calibrated upon selection of button 928, display 1080 of FIG. 34 may be presented to the operator, with a prompt to enter the containment force criteria for loads wrapped with the wrap profile (e.g., a minimum containment force), which may be entered using control 1082, with units selection via controls 1084. Upon selection of a non-zero containment force criteria, display 1080 may be updated as illustrated in FIG. 35 to prompt the operator to select one of buttons 1086-1090 representing different monitor actions that may be taken whenever it is detected that the containment force criteria is not being met by the wrap profile. An operator has an option of doing nothing, generating a warning or stopping the machine. Warnings may be generated on the display, generated via alerts (e.g., SMS, email, cellular or other messaging service) or in practically any other manner that notifies an operator, other personnel, management, or even a manufacturer of a machine or representative thereof. Other actions may be taken in response containment force monitoring, as will be apparent to one of ordinary skill in the art having the benefit of the instant disclosure.

When containment force monitoring is active, a wrap profile may be monitored whenever any parameters of the wrap profile are modified. In addition, where active monitoring is supported, monitoring may also be performed during wrapping operations based upon monitored wrap force.

Figure 36:

Now turning to FIG. 36, a menu display 1100 is illustrated, e.g., as may be presented in response to selection of button 804 of FIG. 14. Display 1100 supports advanced system operations, e.g., various tools such as alarms, reports, cycle time, I/O configuration and maintenance operations (buttons 1102-1110), as well as packaging material and wrap profile management (buttons 1112-1114). Additional machine configuration of the conveying and wrapper aspects of a machine may also be managed through display 1100 (buttons 1116-1118). In addition, it may be desirable to support user authentication via button 1120 to restrict certain management operations to authorized personnel. For example, it may be desirable to limit access to containment force monitoring to management personnel to preclude operators from overriding containment force monitoring established for a particular wrap profile. Additional functions that may be supported on display 1100 in other embodiments include a button to configure the generation of electronic messages (e.g., emails and/or text messages) with reports, statistics, alerts and/or other data to a remote device, as well as a button to skip wrapping of the next load.

It will be appreciated that additional and/or alternative displays may be used to facilitate operator interaction with a wrapping apparatus, and as such, the invention is not limited to the particular displays illustrated herein.

For example, FIGS. 38-46 illustrate a set of displays 1200-1216 suitable for implementing an alternate process for creating a wrap profile to that illustrated in FIGS. 13 and 16-20. Similar operations and/or user interface elements to that of the process illustrated in FIGS. 13 and 16-20 are not discussed separately, and the discussion hereinafter will focus merely on differences therefrom in the alternate process. In this alternate process, creation of a wrap profile begins with operator input directed to the axial load variability of the load. In this embodiment, axial load variability is specified based upon a combination of load irregularity and the degree to which a load is inboard of a pallet.

Figure 38:
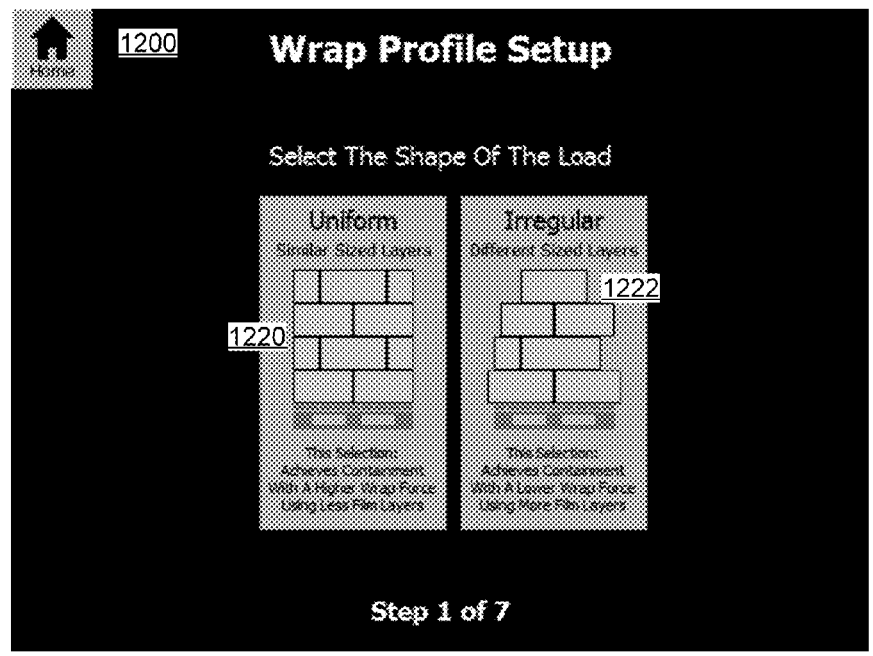

As such, creation of the wrap profile begins with the display of display 1200 of FIG. 38. Display 1200 may be used to enable an operator to the shapes of the vertical sides of the load, e.g., whether the load is uniform (with similar-sized layers and thus low axial load variability) or irregular (with different-sized layers and thus greater axial load variability), using buttons 1220 and 1222. With an irregular load, for example, it may be desirable to reduce the wrap force relative to that of a uniform load to reduce the risk of packaging material breakages due to the presence of non-uniform layers and axial load variability, and then increase the number of layers to still meet a similar load containment force requirement.

Figure 39:
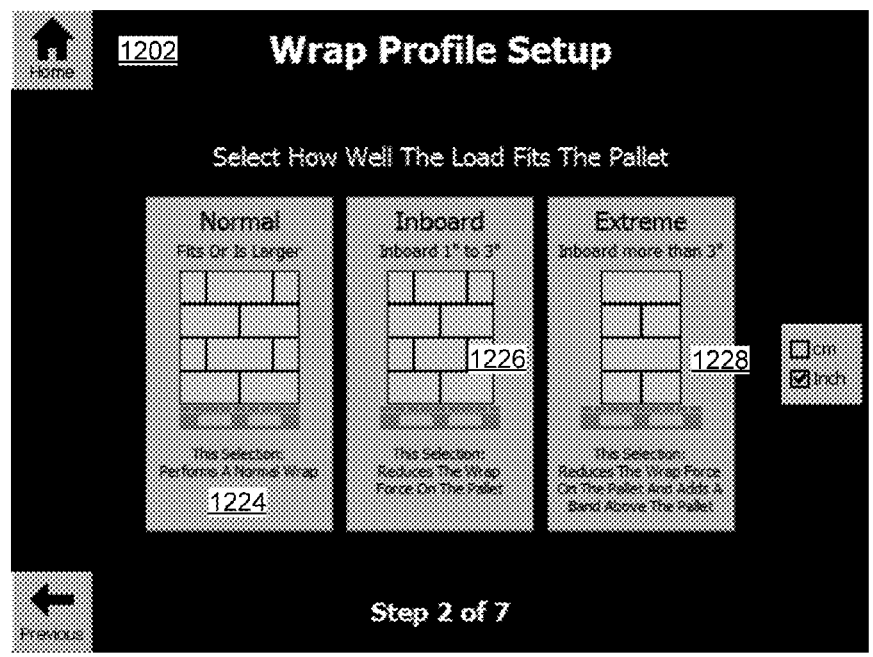
Figure 40:
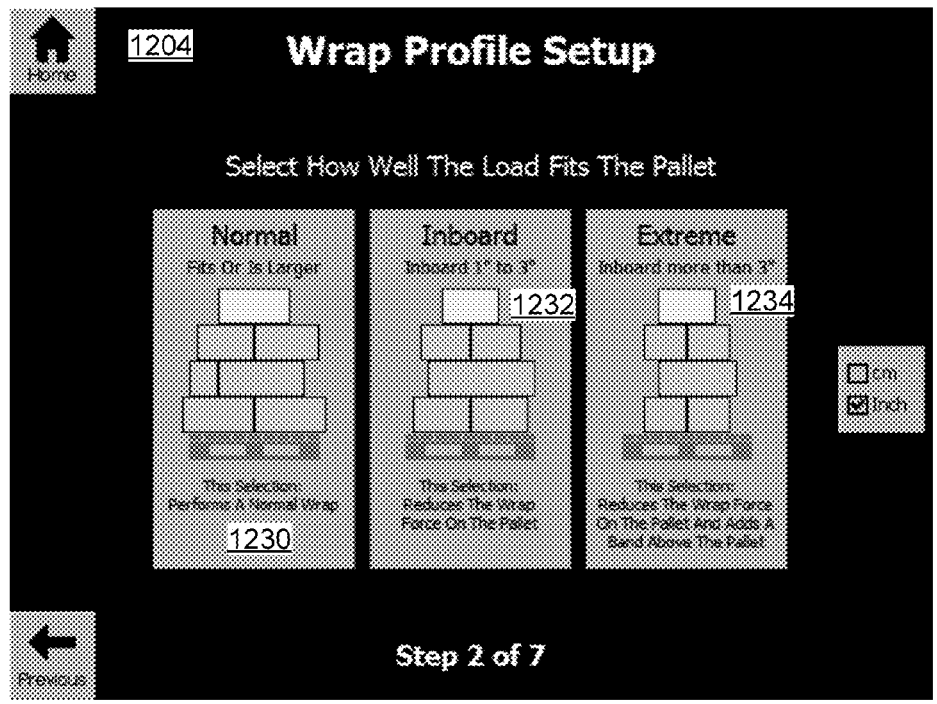

Next, depending upon whether button 1220 or button 1222 is selected, the operator is presented with either display 1202 of FIG. 39 (upon selection of button 1220) or display 1204 of FIG. 40 (upon selection of button 1222) to enable an operator to select the degree to which the load is inboard of the pallet. Display 1202 of FIG. 39, for example, includes buttons 1224, 1226 and 1228 to enable an operator to select from among normal, inboard and extreme inboard settings. With the inboard setting associated with button 1226, wrap force may be reduced relative to that of a normal (non-inboard) load to reduce the risk of packaging material breakages when wrapping around the corners of a pallet. With the extreme inboard setting associated with button 1228, wrap force may be reduced even further, but also an additional band of packaging material may also be added around the pallet (either at a reduced wrap force, or alternatively at a higher wrap force) to increase the containment force securing the load to the pallet. Display 1204 of FIG. 40, which is similar to display 1202 of FIG. 39, includes buttons 1230, 1232 and 1234 that are operate in the same manner as buttons 1224, 1226 and 1228, but that include graphical depictions of irregular loads rather than uniform loads.

Figure 41:
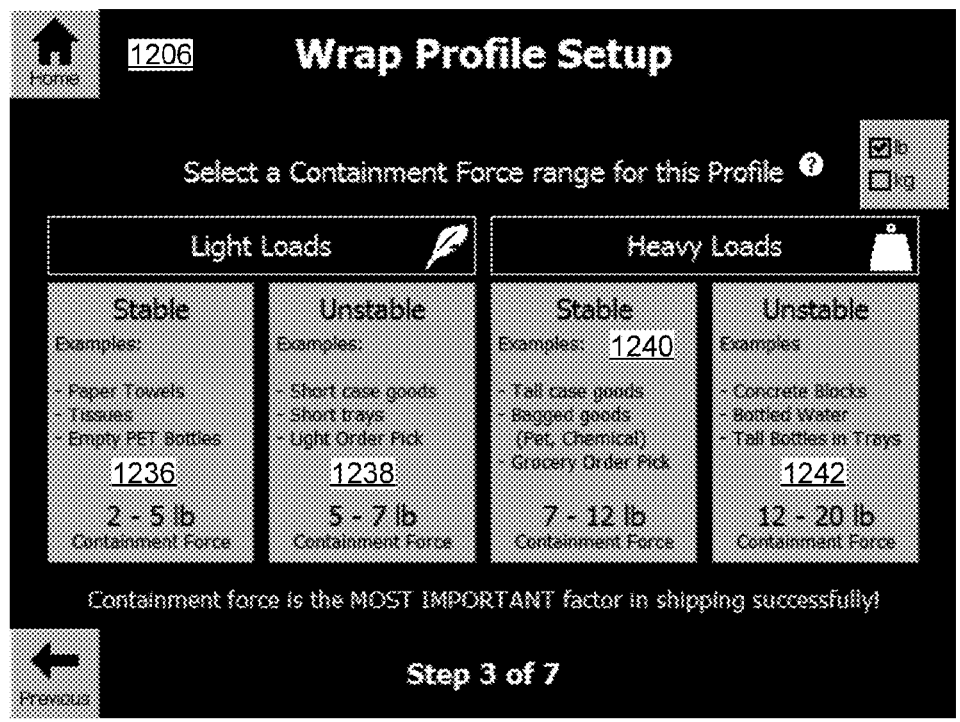
Figure 42:
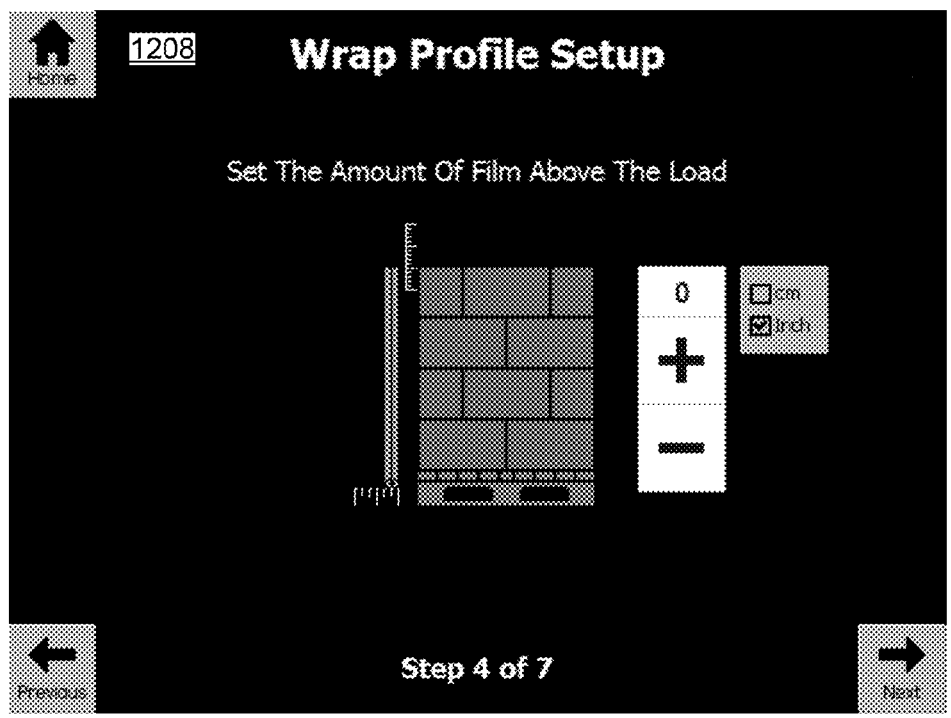
Figure 43:
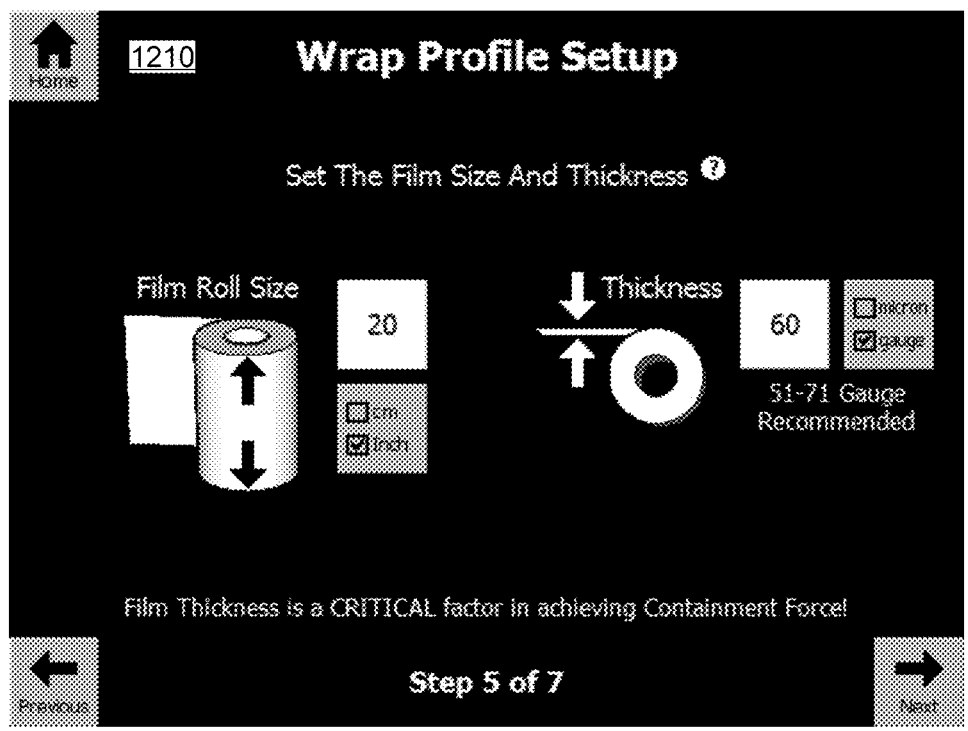

Once the axial load variability is specified for the load, display 1206 of FIG. 41 is displayed to present the operator with buttons 1236-1242 suitable for selecting of a load stability type for the load, e.g., similar to buttons 862-868 of display 860 (FIG. 17) or buttons 862'-868' of display 860' (FIG. 37). As such, an operator is permitted to select, via a non-force selection associated with an indirect control parameter, a load stability type that characterizes the overall stability of the load, and from which a load containment force requirement may be determined.

Each of the four buttons 1236-1242 may, similar to buttons 862-868 or 862'-868', be associated with a particular containment force or range of containment forces. As such, an operator's selection of a load stability type effectively selects a containment force requirement for the load based upon a non-force, indirect control parameter.

Next, as illustrated by display 1208 of FIG. 41, an operator may be prompted to input an overwrap parameter, similar to display 880 of FIG. 19. Likewise, as illustrated by display 1210 of FIG. 42, an operator may be prompted to input packaging material attributes such as film width/size and thickness, similar to display 840 of FIG. 16. At this point, a determination may be made of direct control parameters corresponding to the selected containment force requirement for the load, in a similar manner to that described above, with adjustments made to account for any axial load variability previously specified by the operator.

Figure 44:
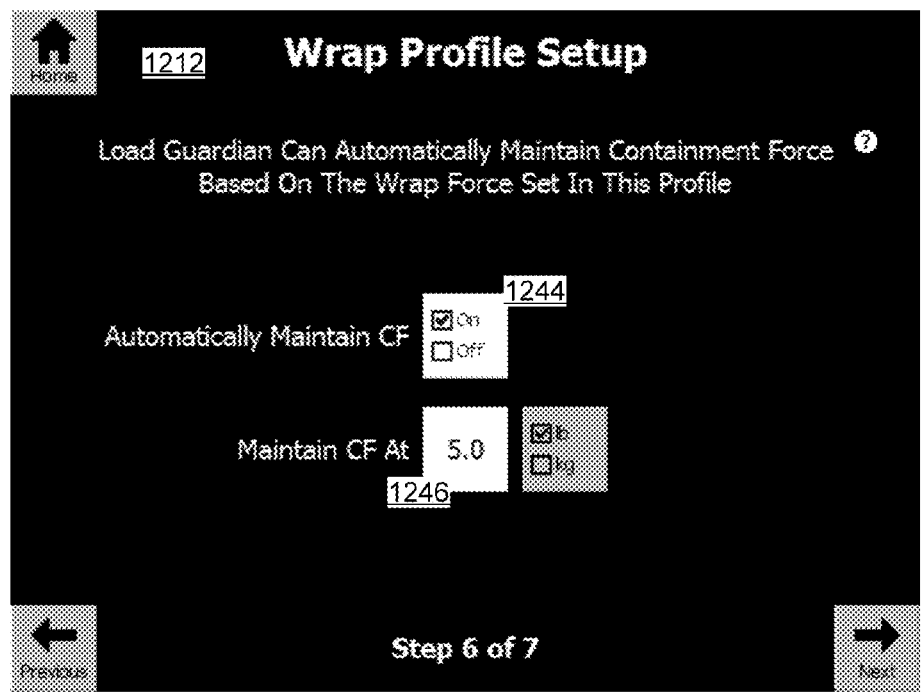
Figure 45:
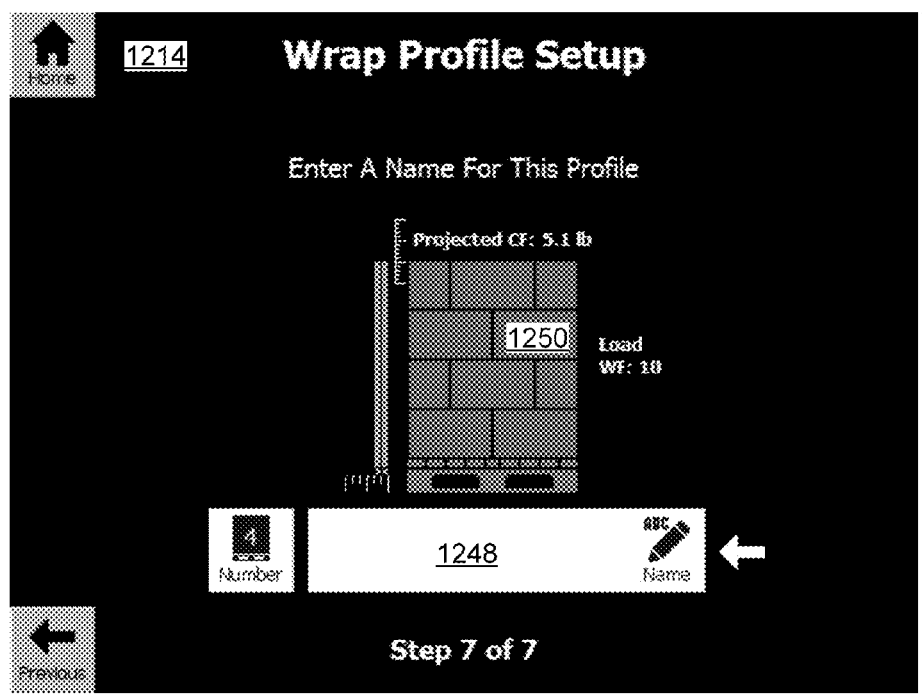
Figure 46:

Next, as illustrated in display 1212 of FIG. 44, the operator may then be prompted to activate containment force monitoring using a button 1244, as well as to specify a containment force criteria for loads wrapped with the wrap profile. For example, input of a containment force criteria may be made via a control 1246 that is similar to control 1082 of FIG. 34. Next, in display 1214 of FIG. 45, a name may be entered in control 1248, with a graphical depiction of the load displayed as illustrated at 1250. Upon entry of the name as illustrated by display 1216 of FIG. 46, setup of the wrap profile is complete, and the operator may save or cancel the wrap profile creation at this point.

Among other benefits, the herein described embodiments may simplify operator control of a wrapping apparatus by guiding an operator through set up while requiring only minimum understanding of wrap parameters, and ensuring loads are wrapped with suitable containment force with minimum operator understanding of packaging material or wrap parameters. The herein described embodiments may also reduce load and product damage by maintaining more consistent load wrap quality.

Projecting Containment Force

In some embodiments of the invention, it may also be desirable to project (i.e., to predict) the containment force (e.g., a minimum containment force or an average containment force) that will be applied to a load by a wrapping operation prior to the actual wrapping operation to enable an operator to properly configure a wrapping apparatus to meet a desired containment force requirement. In some embodiments, for example, the projection of containment force may be performed for a particular wrap profile, and may be used to present to an operator a projected containment force associated with that wrap profile based upon the current configuration of the wrap profile and the packaging material with which the wrap profile will be used when performing a wrap operation based upon that wrap profile. Furthermore, in some embodiments, the projection of containment force may be used to effectively link the wrap profile parameters that contribute to the projected containment force such that parameters may be automatically adjusted to compensate for changes to other parameters to achieve a desired containment force requirement.

Figure 47:
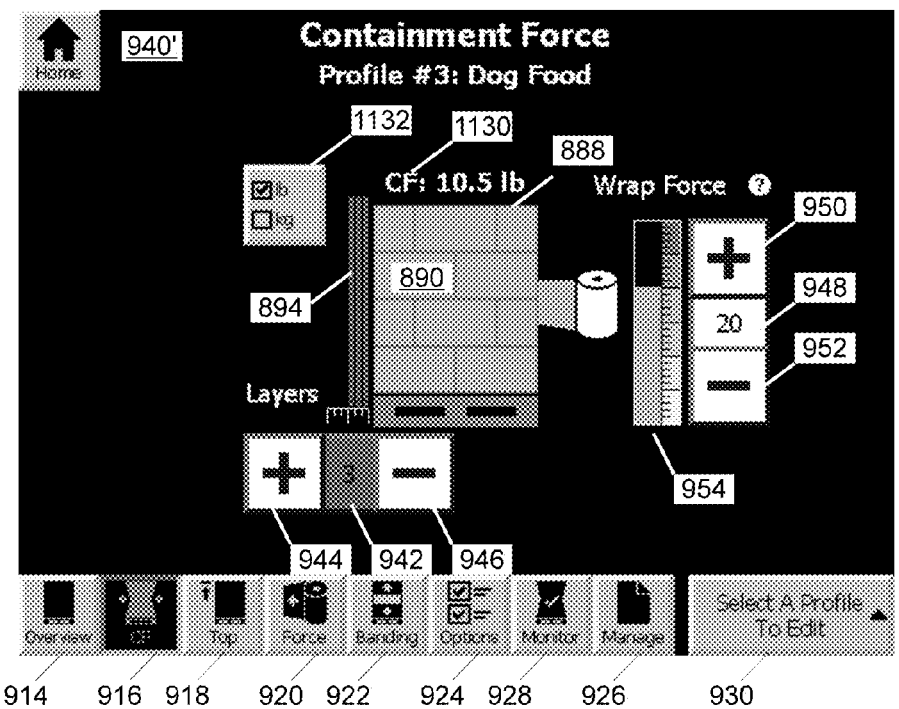

For example, as illustrated by display 940' of FIG. 47, which is similar to display 940 of FIG. 22, whenever containment force monitoring is enabled, it may be desirable to display a projected containment force 1130 based upon the currently selected number of layers and wrap force, and given the currently-selected packaging material and ICF therefor. A control 1132 may also be provided to switch between imperial and metric. Changing the number of layers and/or the wrap force results in a recalculation of the projected containment force and an updated display. In some embodiments, the containment force requirement or criteria selected by an operator (e.g., when selected based upon load stability type or based upon a numerical input) may also be displayed in display 940 to provide an indication of whether the projected containment force meets this criteria.

Figure 48:
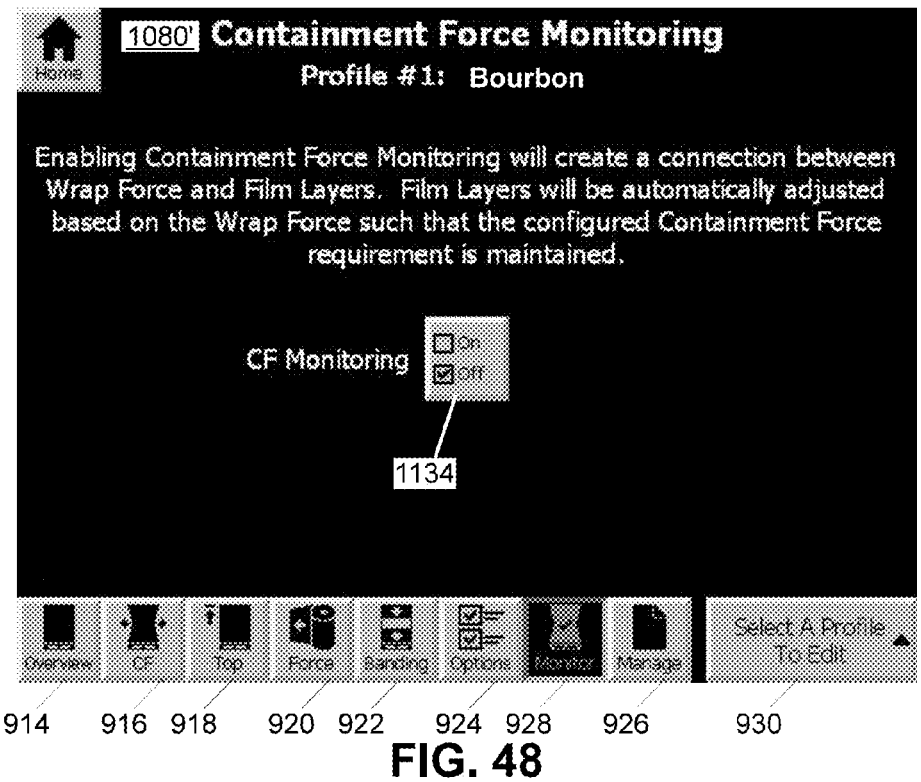

FIGS. 48-53 next illustrate another sequence of displays suitable for utilizing a projected containment force in a manner consistent with the invention, and implementing containment force monitoring in an alternate manner to that described above in connection with FIGS. 32-35. FIG. 48, for example, illustrates a containment force monitoring display 1080' similar to display 1080 of FIG. 35, and which may be displayed in response to selection of button 928. Display 1080 includes a button 1134 that indicates that containment force monitoring is currently disabled.

Figure 49:
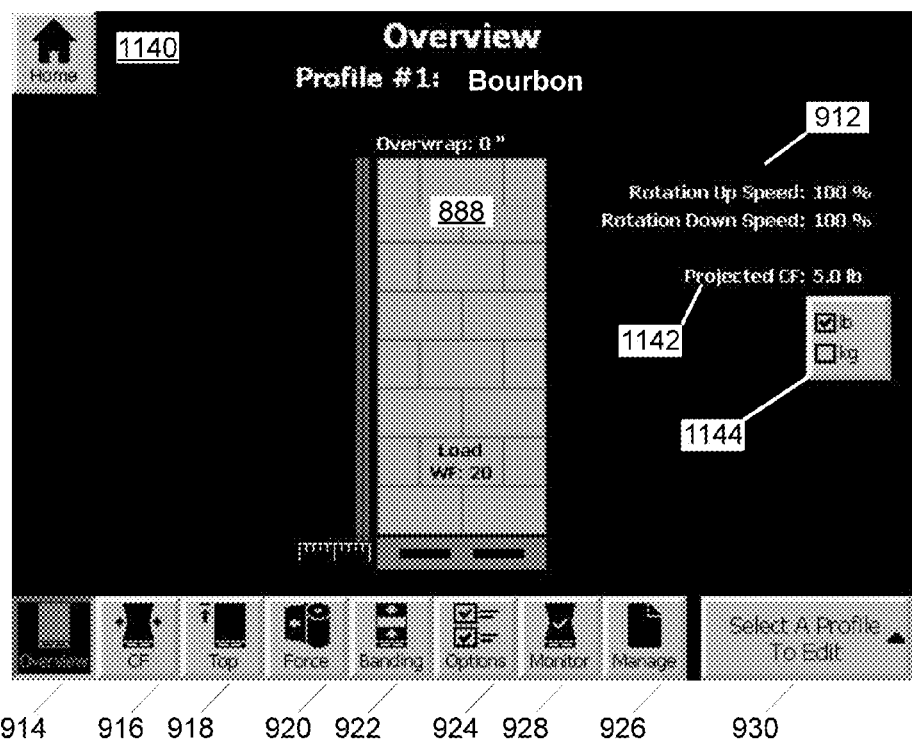

FIG. 49 illustrates an example overview display 1140, similar to display 910 of FIG. 21, that may be presented in response to selection of button 914 and when containment force monitoring is disabled. A graphical depiction 888 of the wrap profile may be used to graphically represent the manner in which a load will be wrapped using the wrap profile, including the number of layers, the wrap force and overwrap used (e.g., including via graphical and/or text overlays), and any additional parameters 912 (e.g., rotation up/down speed). In addition, display 1140 may also include an indication of the current projected containment force 1142, with units selectable using control 1144. In other embodiments, however, when containment force monitoring is disabled, projected containment force may not be calculated and/or displayed.

Figure 50:
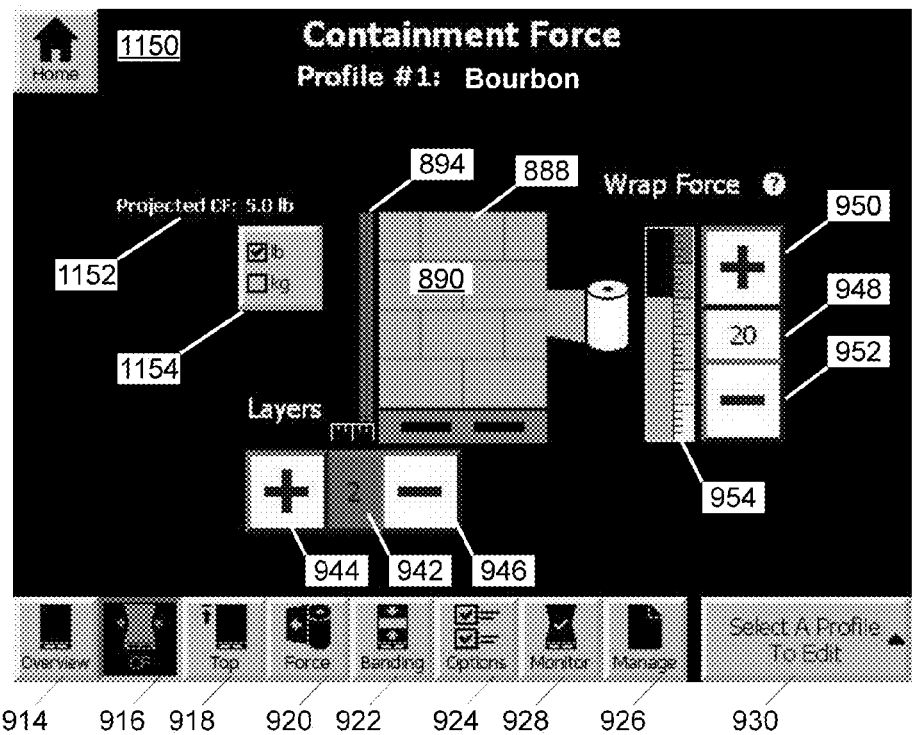

Likewise, when containment force monitoring is disabled, a containment force display 1150, similar to display 940 of FIG. 22, may be configured as shown in FIG. 50, where a number of layers may be displayed at 942 and modified using buttons 944, 946, and from which a wrap force may be displayed at 948 and modified using buttons 950, 952. Updates to the number of layers may be reflected at 894 in graphical depiction 888, while updates to the wrap force may be represented by varying a display characteristic of load 890, e.g., by changing a color, a shading, a pattern, or other characteristic, with a legend 954 illustrating the current selected wrap force and different values of the display characteristic corresponding to different wrap forces (e.g., where darker shading represents higher wrap forces). However, given containment force monitoring is disabled, wrap force and number of layers are independently controllable. In some embodiments, a current projected containment force, based on the currently selected wrap force and number of layers, may also be displayed as shown at 1152, with units selectable via control 1154. In other embodiments, however, projected containment force may not be calculated and/or displayed in display 1150 when containment force monitoring is disabled.

Figure 51:
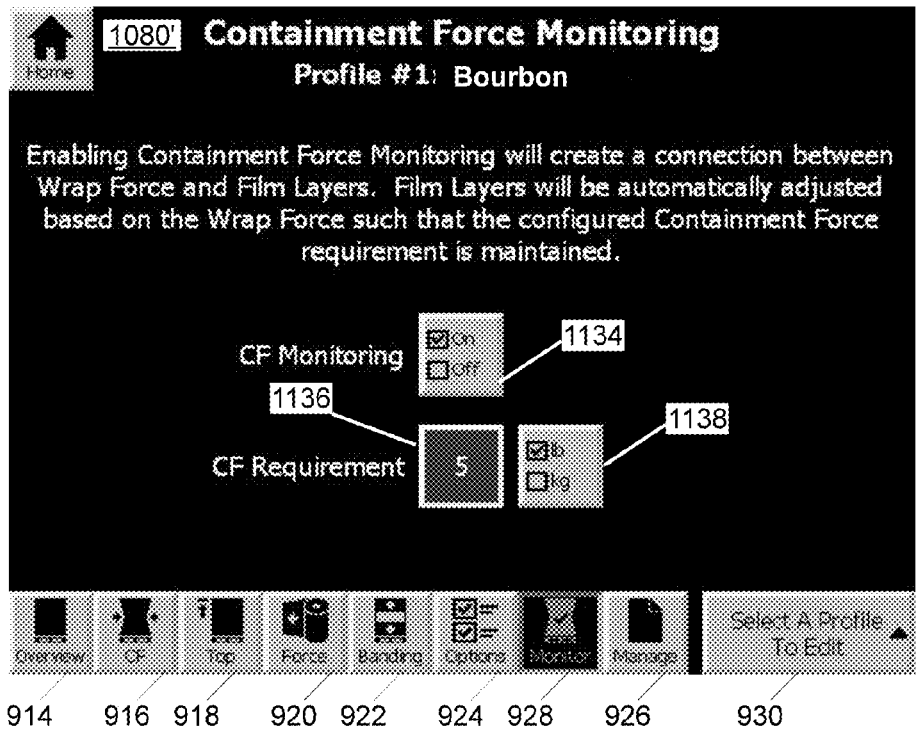

Turning now to FIG. 51, containment force monitoring display 1080' of FIG. 39 is illustrated after enabling containment force monitoring using control 1134. Upon enabling of containment force monitoring, a control 1136 displays and enables input of the selected containment force requirement or criteria for loads wrapped with the wrap profile (e.g., a minimum containment force), with units selection via control 1138. It will be appreciated that in some embodiments, containment force monitoring may not be enabled if the current packaging material has not yet been calibrated. An operator may be prompted, for example, in the manner described above in connection with FIG. 32, and may perform calibration in the manner discussed above in connection with FIG. 33.

Figure 52:
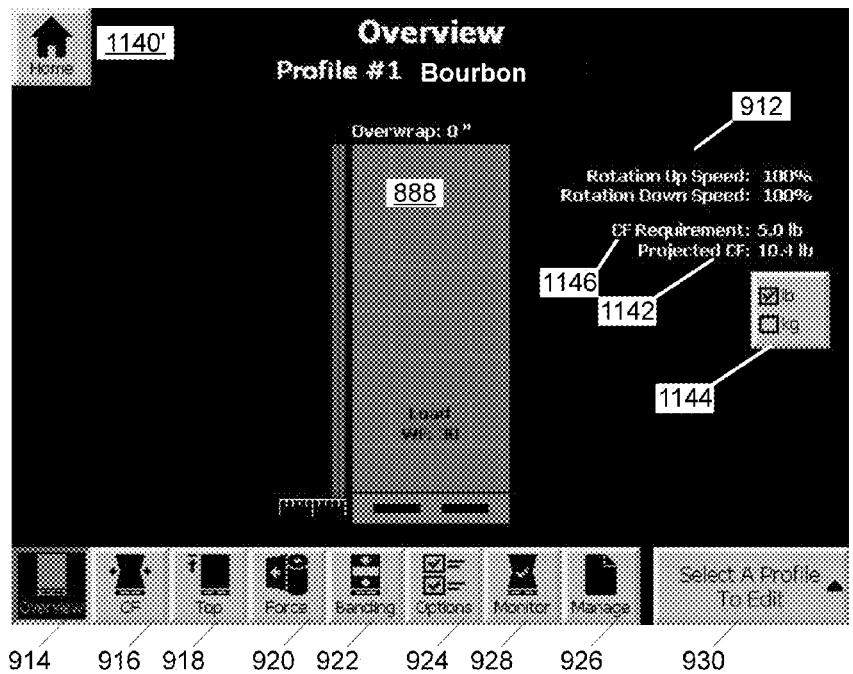

Enabling containment force monitoring modifies both the overview and containment force displays 1140, 1150 of FIGS. 49-50. Specifically, as illustrated in FIG. 52, an overview display 1140' displays, in addition to the graphical depiction 888 of the wrap profile and additional parameters 912, the current projected containment force 1142 as well as the containment force requirement 1146, with units of both selectable using control 1144. In addition, in some embodiments, it may be desirable to display an indication when the projected containment force does not meet the containment force requirement, e.g., via a textual and/or graphical indication, via a change in color, background or pattern, via an animation, via an audio signal, etc. The projected containment force may be considered to not meet the containment force requirement in some embodiments based upon the projected containment force being above and/or below the containment force requirement by a given threshold, e.g., an absolute difference, a percentage difference, or in other manners that will be appreciated by one of ordinary skill in the art having the benefit of the instant disclosure.

Figure 53:
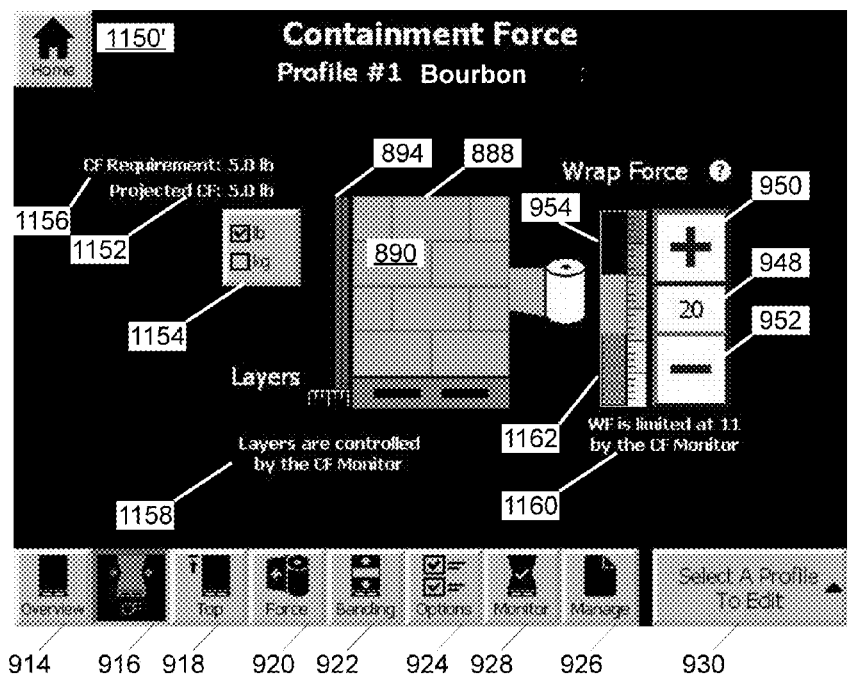

In addition, as illustrated in FIG. 53, containment force display 1150' is similar to display 1150 of FIG. 50; however, a containment force requirement 1156 is displayed along with the projected containment force 1152 (along with units control 1154), with the containment force requirement controlled via display 1080' of FIG. 48, and with the projected containment force calculated based upon the current wrap profile settings, including the wrap force displayed at 948 and controlled via buttons 940 and 952. In addition, in this embodiment, when containment force monitoring is enabled, control over the number of layers is disabled, and as such, an indication 1158 is displayed to alert the user that the number of layers are controlled via containment force monitoring, e.g., in the various manners discussed above. As such, modification of the wrap force using buttons 950, 952 results in recalculation of the projected containment force, and when appropriate, an automatic increase or decrease in the number of layers to maintain a projected containment force that is compatible with the containment force requirement for the wrap profile.

In addition, in some embodiments, and as illustrated by text indication 1160 and region 1162 of legend 954, it may be desirable to limit wrap force settings to prevent an operator from selecting a wrap force that is insufficient to meet the containment force requirement (in this case, a wrap force of 11). This lower wrap force limit may be determined, for example, by determining the wrap force required to meet the containment force requirement using a maximum number of layers. Optionally, a positive or negative offset from the containment force requirement may also be factored into the calculation.

As such, in some embodiments consistent with the invention, the specified number of layers and wrap force for a wrap profile, along with a calibrated incremental containment force, may be used to project the minimum containment force that will be on a load when wrapped using the wrap profile. A projected containment force indication may be displayed to an operator, in some instances only when the packaging material has been calibrated or otherwise set up. Furthermore, providing a projected containment force enables an operator to dynamically adjust layer/wrap force settings and immediately view the impact of the adjustments on the containment force that will be applied to a load.

It will also be appreciated that in various embodiments of the invention, the characteristics of a packaging material, e.g., the incremental containment force (ICF) (which itself may be a single value, or a range of values based on a function, table, etc.) may be determined in various manners. For example, in some embodiments, ICF may be determined based upon an observation on a generic packaging material, at a gauge suitable for the application, and at a baseline wrap force (e.g., a payout percentage). This value may then be used to generate an "estimated" ICF by using a correction multiplier from the gauge actually used, thereby effectively defining ICF as a linear function. Put another way, the ICF may be determined in some embodiments by applying a correction multiplier associated with a thickness of the packaging material to a baseline ICF associated with a default thickness.

In other embodiments, a calibration process may be used to measure actual containment force at one or more points on a wrapped load (e.g., using a containment force measuring tool), where the number of layers is known. ICF may then be calculated by dividing the measured containment force by the known number of layers.

In still other embodiments, an ICF function may be defined using a table including data empirically gathered from actual film testing. The table may be based, for example, on a common scalable wrap force, at some predefined prestretch percentage and at some midrange gauge. In some embodiments, the table may be more complex, e.g., with an ICF for various models and makes of packaging materials at common gauges and prestretch percentages. It will be appreciated that rather than one or more tables, the data in the tables may be represented in some embodiments by functions, e.g., linear, quadratic or more complex functions, as well as functions derived via regression analysis or in other manners that would be apparent to one of ordinary skill in the art having the benefit of the instant disclosure. In addition, in some instances, separate tables or functions may be defined for different makes and models of packaging materials. Thus, in some embodiments, the ICF may be determined by accessing a table of empirical test measurements.

In other embodiments, ICF may be determined via direct measurements during a wrapping operation, e.g., using the output of a load cell to derive the ICF independently of any other input. Thus, in some embodiments, the ICF may be determined based upon a wrap force measured during a wrapping operation on a load.

Other manners of determining ICF, disclosed above and/or in any of the aforementioned applications and/or patents referenced herein, may also be used in various embodiments of the invention.

Other embodiments will be apparent to those skilled in the art from consideration of the specification and practice of the present invention. It is intended that the specification and examples be considered as exemplary only, with a true scope and spirit of the disclosure being indicated by the following claims.

What is claimed is:

1. A method of setting up a wrap profile prior to wrapping a load on a load support with packaging material dispensed from a packaging material dispenser through relative rotation between the packaging material dispenser and the load support, the method comprising:
causing a graphical depiction of at least a portion of a load to be wrapped to be displayed on an operator interface;
causing a number of layers of packaging material specified by the wrap profile to be displayed graphically in the graphical depiction; and
modifying the graphical depiction in response to user input that modifies the wrap profile.

2. The method of claim 1, wherein causing the number of layers of packaging material to be displayed graphically includes displaying a number of parallel bars corresponding to the number of layers of packaging material to be displayed adjacent to the graphical depiction of the load, wherein modifying the graphical depiction includes changing the number of parallel bars displayed adjacent to the graphical depiction of the load in response to modifying the number of layers of packaging material specified by the wrap profile.

3. The method of claim 2, wherein the parallel bars extend substantially along a height of the graphical depiction of the load, the method further comprising, in response to user input to add a band to the wrap profile, modifying the graphical depiction of the load to display a parallel bar corresponding to the band adjacent the number of parallel bars and disposed at an elevation associated with the band.

4. The method of claim 1, further comprising causing a wrap force specified by the wrap profile to be displayed graphically in the graphical depiction.

5. The method of claim 4, wherein causing the wrap force to be displayed graphically includes controlling a display characteristic of the load in the graphical depiction based upon the wrap force specified by the wrap profile, wherein modifying the graphical depiction includes varying the display characteristic of the load in response to modifying the wrap force specified by the wrap profile.

6. The method of claim 5, wherein the display characteristic includes one or more of a color, a shading, or a pattern.

7. The method of claim 5, further comprising, in response to user input to vary a wrap force proximate a top or bottom of the load, modifying the graphical depiction of the load by varying the display characteristic in a top or bottom portion of the load in the graphical depiction.

8. The method of claim 5, further comprising causing a legend to be displayed, wherein the legend displays a plurality of values of the display characteristic corresponding respectively to a plurality of wrap forces.

9. The method of claim 4, wherein modifying the graphical depiction in response to user input that modifies the wrap profile includes, in response to user input that modifies the wrap force specified by the wrap profile:
modifying the number of layers of packaging material specified by the wrap profile; and
modifying the display of the number of layers of packaging material in response to modifying the number of layers specified by the wrap profile.

10. The method of claim 9, wherein modifying the number of layers includes determining the modified number of layers based upon a load containment force requirement specified in the wrap profile and the modified wrap force.

11. The method of claim 4, wherein modifying the graphical depiction in response to user input that modifies the wrap profile includes, in response to user input that modifies the number of layers specified by the wrap profile:
modifying the wrap force specified by the wrap profile; and
modifying the display of the wrap force in response to modifying the wrap force specified by the wrap profile.

12. The method of claim 11, wherein modifying the wrap force includes determining the modified wrap force based upon a load containment force requirement specified in the wrap profile and the modified number of layers.

13. The method of claim 1, further comprising, after modifying the graphical depiction, initiating a wrapping operation to wrap the load with packaging material based upon the wrap profile.

14. An apparatus, comprising:
a processor; and
program code configured upon execution by the processor to control a load wrapping apparatus of the type configured to wrap a load on a load support with packaging material dispensed from a packaging material dispenser through relative rotation between the packaging material dispenser and the load support by:
causing a graphical depiction of at least a portion of a load to be wrapped to be displayed on an operator interface;
causing a number of layers of packaging material specified by the wrap profile to be displayed graphically in the graphical depiction; and
modifying the graphical depiction in response to user input that modifies the wrap profile.

15. The apparatus of claim 14, wherein the processor is in a controller of the load wrapping apparatus, and wherein the apparatus further comprises a packaging material dispenser for dispensing packaging material to the load.

16. The apparatus of claim 14, wherein the processor is in a device external to the load wrapping apparatus.

17. The apparatus of claim 16, wherein the device is a mobile device, a single-user computer or a multi-user computer.

18. A program product, comprising:
a non-transitory computer readable medium; and
program code stored on the non-transitory computer readable medium and configured to control a load wrapping apparatus of the type configured to wrap a load on a load support with packaging material dispensed from a packaging material dispenser through relative rotation between the packaging material dispenser and the load support, wherein the program code is configured to control the load wrapping apparatus by:
  causing a graphical depiction of at least a portion of a load to be wrapped to be displayed on an operator interface;
  causing a number of layers of packaging material specified by the wrap profile to be displayed graphically in the graphical depiction; and
  modifying the graphical depiction in response to user input that modifies the wrap profile.

19. A method of configuring a wrap profile prior to wrapping a load on a load support with packaging material dispensed from a packaging material dispenser through relative rotation between the packaging material dispenser and the load support, the method comprising:
  causing a graphical depiction of at least a portion of a load to be wrapped to be displayed on an operator interface;
  causing a combined thickness of packaging material specified by the wrap profile to be displayed graphically in the graphical depiction; and
  modifying the graphical depiction in response to user input that modifies the wrap profile.

20. The method of claim 19, wherein the combined thickness is specified in the wrap profile as a minimum number of layers of packaging material to apply throughout a contiguous region of the load.

21. An apparatus, comprising:
  a processor; and
  program code configured upon execution by the processor to control a load wrapping apparatus of the type configured to wrap a load on a load support with packaging material dispensed from a packaging material dispenser through relative rotation between the packaging material dispenser and the load support, wherein the program code is configured to cause a graphical depiction of at least a portion of a load to be wrapped to be displayed on an operator interface, cause a combined thickness of packaging material specified by the wrap profile to be displayed graphically in the graphical depiction, and modify the graphical depiction in response to user input that modifies the wrap profile.

22. The apparatus of claim 21, wherein the combined thickness is specified in the wrap profile as a minimum number of layers of packaging material to apply throughout a contiguous region of the load.

23. The apparatus of claim 22, wherein the program code is configured to cause the number of layers of packaging material to be displayed graphically by displaying a number of parallel bars corresponding to the number of layers of packaging material to be displayed adjacent to the graphical depiction of the load, wherein the program code is configured to modify the graphical depiction by changing the number of parallel bars displayed adjacent to the graphical depiction of the load in response to modifying the number of layers of packaging material specified by the wrap profile.

24. The apparatus of claim 23, wherein the parallel bars extend substantially along a height of the graphical depiction of the load, and wherein the program code is further configured to, in response to user input to add a band to the wrap profile, modify the graphical depiction of the load to display a parallel bar corresponding to the band adjacent the number of parallel bars and disposed at an elevation associated with the band.

25. The apparatus of claim 22, wherein the program code is further configured to cause a wrap force specified by the wrap profile to be displayed graphically in the graphical depiction by controlling a display characteristic of the load in the graphical depiction based upon the wrap force specified by the wrap profile, and wherein the program code is configured to modify the graphical depiction by varying the display characteristic of the load in response to modifying the wrap force specified by the wrap profile.

26. The apparatus of claim 25, wherein the program code is further configured to, in response to user input to vary a wrap force proximate a top or bottom of the load, modify the graphical depiction of the load by varying the display characteristic in a top or bottom portion of the load in the graphical depiction.

27. The apparatus of claim 25, wherein the program code is configured to modify the graphical depiction in response to user input that modifies the wrap profile by, in response to user input that modifies the wrap force specified by the wrap profile:
  modifying the number of layers of packaging material specified by the wrap profile; and
  modifying the display of the number of layers of packaging material in response to modifying the number of layers specified by the wrap profile.

28. The apparatus of claim 27, wherein the program code is configured to modify the number of layers by determining the modified number of layers based upon a load containment force requirement specified in the wrap profile and the modified wrap force.

29. The apparatus of claim 25, wherein the program code is configured to modify the graphical depiction in response to user input that modifies the wrap profile by, in response to user input that modifies the number of layers specified by the wrap profile:
  modifying the wrap force specified by the wrap profile; and
  modifying the display of the wrap force in response to modifying the wrap force specified by the wrap profile.

30. The apparatus of claim 21, wherein the program code is configured to modify the wrap force by determining the modified wrap force based upon a load containment force requirement specified in the wrap profile and the modified number of layers.

31. The apparatus of claim 21, wherein the program code is further configured to, after modifying the graphical depiction, initiate a wrapping operation to wrap the load with packaging material based upon the wrap profile.

* * * * *